United States Patent [19]

Mabey et al.

[11] Patent Number: 4,885,632

[45] Date of Patent: Dec. 5, 1989

[54] SYSTEM AND METHODS FOR MONITORING TV VIEWING SYSTEM INCLUDING A VCR AND/OR A CABLE CONVERTER

[75] Inventors: Kent W. Mabey, West Jordan, Utah; Joseph M. Boska, Columbia, Md.; Stephen L. Richards, Gallatin, Mo.

[73] Assignee: AGB Television Research, Columbia, Md.

[21] Appl. No.: 168,651

[22] Filed: Mar. 16, 1988

Related U.S. Application Data

[63] Continuation-in-part of Ser. No. 162,220, Feb. 29, 1988, abandoned.

[51] Int. Cl.[4] .......................... H04N 9/00; H04N 17/06

[52] U.S. Cl. .......................................... 358/84; 358/335; 455/2

[58] Field of Search ................. 358/84, 335; 360/37.1; 379/92; 455/2

[56] References Cited

U.S. PATENT DOCUMENTS

| | | | |
|---|---|---|---|
| 3,534,265 | 10/1970 | Mixsell et al. . | |
| 3,973,206 | 8/1976 | Haselwood et al. . | |
| 4,025,851 | 5/1977 | Haselwood et al. | 358/84 |
| 4,044,376 | 7/1977 | Porter | 358/84 |
| 4,048,562 | 9/1977 | Haselwood et al. | 455/2 |
| 4,058,829 | 11/1977 | Thompson | 358/84 |
| 4,230,990 | 10/1980 | Lert, Jr. et al. | 358/84 X |
| 4,258,386 | 3/1981 | Cheung | 358/84 |
| 4,361,851 | 11/1982 | Asip et al. | 358/84 |
| 4,388,644 | 6/1983 | Ishman et al. | 358/84 |
| 4,425,578 | 1/1984 | Haselwood et al. | 358/84 |
| 4,528,588 | 7/1985 | Lofberg . | |
| 4,546,382 | 10/1985 | McKenna et al. | 358/84 |
| 4,566,030 | 1/1986 | Nickerson et al. | 358/84 |
| 4,567,511 | 1/1986 | Smith et al. | 358/84 |
| 4,574,304 | 3/1986 | Watanabe et al. | 358/84 |
| 4,577,220 | 3/1986 | Laxton et al. | 358/84 |
| 4,578,700 | 3/1986 | Roberts et al. | 358/84 |
| 4,599,644 | 7/1986 | Fischer | 358/84 |
| 4,605,958 | 8/1986 | Machnik et al. | 358/84 |
| 4,622,583 | 11/1986 | Watanabe et al. | 358/84 |
| 4,626,904 | 12/1986 | Lurie | 358/84 |
| 4,633,302 | 12/1986 | Damoci | 358/84 |
| 4,636,858 | 1/1987 | Hague et al. . | |
| 4,642,685 | 2/1987 | Roberts et al. | 358/84 |
| 4,644,393 | 2/1987 | Smith et al. | 358/84 |
| 4,658,290 | 4/1987 | McKenna et al. | 358/84 |
| 4,723,302 | 2/1988 | Fulmer et al. | 455/2 |
| 4,750,034 | 6/1988 | Lem | 358/84 |
| 4,779,198 | 10/1988 | Lurie | 358/84 X |
| 4,792,864 | 12/1988 | Watanabe et al. | 358/84 X |

FOREIGN PATENT DOCUMENTS

| | | | |
|---|---|---|---|
| 0195639 | 9/1986 | European Pat. Off. | 358/84 |
| 3401762 | 8/1985 | Fed. Rep. of Germany . | |
| 2138642 | 10/1984 | United Kingdom . | |

*Primary Examiner*—Keith E. George

*Attorney, Agent, or Firm*—Rosen, Dainow & Jacobs

[57] ABSTRACT

A system and methods are disclosed for monitoring a home TV viewing system which may include a TV, a VCR and one or more cable converters. The system obtains information for identifying the source of video displayed or being recorded, i.e., off-air antenna, satellite antenna, cable converter tuner, VCR, personal computer, video game, etc. The system also obtains information identifying the video path of the video being displayed and/or recorded. The system "fingerprints" video recorded by the VCR so that the played back video may be identified as having been previously recorded. The system may record the date and time of recording and the video source of the video being recorded. The system includes probe/detector devices which obtain signals related to the frequency to which the TV, VCR, and cable converter are tuned, and a higher level processor which receives and processes those signals to identify channel tuning of the TV, VCR, and cable converter. The probe/detector monitoring the VCR includes a lower level processor and circuitry which fingerprint a video signal being recorded by the VCR. The system generates timing signals to record and detect fingerprints in the vertical blanking interval of the TV signal. The system has multi-level processing, and may be programmed to include a number of down-loadable and up-loadable parameters. The system also includes an alphanumeric display and data entry unit for each TV being monitored, and provides for interactive information entry by TV viewers including guests and by an installer.

30 Claims, 45 Drawing Sheets

DIRECT CONNECT PROBE 350
PRESCALER (TTL OR ECL)
362
366
368
372
373
3.2V
1/2 74HC 4020
370
364
6N139
360
+5V
205c
205d
CABLE 210d
TO MDU "PHONE" CONN.
DIGITAL 1
PRESCALED LO÷2^14
ANALOG 2
DIGITAL 2
ANALOG 1
+5V
GND
206c
206d
203d
202d
204d
201d
IDENT. CIRCUIT 203c
ID VOLTAGE 2.5-3.5 VDC 202c
388
389
352
386
IN4118
204c
201c
382
384
380
374
375
376
377
378
379
HORIZONTAL SWEEP DETECTOR 354
TV PROBE/ DETECTOR 128
356
DC TO DC CONVERTER

CDSU BLOCK DIAGRAM

VCRCO
C
IS IT VCR PROBE TYPE I ?
YES
D
1418
NO
VCR PROBE II COMMUNICATION FAILURE ?
NO
D
1419
YES
SET VCR PROBE II COMMS FAILURE PERSISTENCE
1420
RESUME
1421
1422
VCR PROBE CONNECTED ?
NO
B
YES
1423
VCR PROBE COMMS. RESTORED ?
YES
D
NO
1424
NO
PERSISTENCE DONE ?
YES
E

MDU-VCR PROBE/
DETECTOR TYPE I

MDU-VCR PROBE/DETECTOR II

SYSTEM AND METHODS FOR MONITORING TV VIEWING SYSTEM INCLUDING A VCR AND/OR A CABLE CONVERTER

This application is a continuation in part of Ser. No. (162,220) filed Feb. 29, 1988 titled "T.V. Monitoring System", now abandoned

BACKGROUND OF THE INVENTION

The present invention relates to a monitoring system, devices forming part thereof, and methods for monitoring a television viewing system which includes a television and a video recorder/player and/or a cable converter, for obtaining information from the television viewing system relating to programs and/or other video received, tuned, recorded and/or displayed by the television viewing system and for obtaining information relating to the television system viewing audience.

In addition to (or in lieu of) antennas functioning traditionally as off-air video sources, many home television viewing systems now include a video recorder/player, for example, a video cassette recorder ("VCR") or a video cassette player ("VCP"), and/or a cable converter which also function as video sources for video displayed by the TV. Some home viewing systems include still other video sources such as a personal computer, video game, satellite antenna, etc. Due to widespread use of video recorder/players and an increase in the number and types of video sources, it has become increasingly difficult to monitor home television viewing systems for the purpose of obtaining information relating to programs viewed by the home audience at any given time. It is also difficult to obtain accurate information of the composition of the viewing audience at any given time. Such information may be collected to formulate ratings for television programs and to obtain information concerning the viewing audience for specific programs and commercials, among other possible uses.

To fully monitor a television viewing system for collecting information to be used, for example, in the formulation of program ratings, it is necessary to identify the channel tuned by each tuner in the system, i.e., the TV tuner, a video recorder/player, if one is present, and a cable converter tuner, if one is present, and to identify the source of the video ultimately displayed by the TV, i.e., an off-air antenna, a cable converter tuner, a video recorder/player tuner, the TV tuner, or a tape played back by the video recorder/player, or some other source such as a personal computer or video game.

Specifically, there is a need to provide video recorder/player monitoring including playback program identification in order: (a) to establish a total audience to a particular program or commercial, i.e., live viewing together with playback viewing; (b) to understand better the characteristics of playback in relation to recording—e.g., the proportion of programs of different types which having been recorded are in fact played back, the elapsed time between recording and playback, the characteristics of the viewing audience for a program in playback compared to live transmission; and (c) to establish the detailed method of playback particularly with reference to exposure to commercials in breaks preceding, during, or following a program being played back. From an advertiser's point of view, the addition of 10% to the audience to a program through playback is largely negated if, on most occasions, the fast forward or picture search facility of the video recorder/player are used to skip commercial breaks.

The invention disclosed herein seeks to monitor more fully than heretofore television viewing systems which may include different combinations of video equipment such as video recorder/players, cable converters, personal computers, etc. The invention also seeks to obtain information relating to the television viewing system, its video equipment and the video programs tuned, recorded, played back and/or displayed by the television viewing system, and information relating to the viewing audience, with more accuracy and/or more reliably and consistency than heretofore, or information which was not obtained at all heretofore.

OBJECTS AND SUMMARY OF THE INVENTION

It is an object of the invention disclosed herein to provide a monitoring system, devices forming part thereof, and methods for monitoring a television viewing system which includes a video recorder/player, and which is capable of one or more of the following: determining when the program displayed on the TV is being played back by the video recorder/player; determining whether that program being displayed was previously recorded by the video recorder/player; and obtaining other information from a program being played back by a video recorder/player such as the original video source of the program, the date and time it was recorded.

It is an object of the invention disclosed herein to provide a monitoring system, devices forming part thereof, and methods for monitoring a television viewing system which includes a video recorder/player, and which is capable of determining various, and preferably all, operating modes of the video recorder/player, for example, in the case of a VCR, on/off, record, playback, scan (forward or reverse), pause, and the state of the TV/VCR switch.

It is an object of the invention disclosed herein to provide a monitoring system, devices forming part thereof, and methods capable of monitoring television viewing systems comprised of different combinations of off-air antennas, satellite antennas, video recorder/players, cable converters, direct cable (cable ready), and other video sources.

It is an object of the invention disclosed herein to provide devices capable of obtaining a signal related to the frequency of the particular channel to which a TV tuner, video recorder/player tuner, or cable converter tuner is tuned without physically connecting the device to a circuit point in the TV, video recorder/player, or cable converter.

It is an object of the invention disclosed herein to provide a monitoring system for a television viewing system which is capable of operating with different types of devices which obtain such channel frequency related signals, including devices of the type referred to in the previous object of the invention, as well as with devices which are physically connected to a circuit point in the TV, video recorder/player, or cable converter.

It is an object of the invention disclosed herein to provide a monitoring system and methods for monitoring a television viewing system in which information entered into the system by viewers is facilitated.

It is an object of the invention disclosed herein to provide a monitoring system and methods for monitoring a television viewing system in which demographic and other information may be entered into the system by or on behalf of a guest viewer.

It is an object of the invention disclosed herein to provide a monitoring system and methods for monitoring a television viewing system in which information relating to the equipment comprising the monitoring system and the manner in which it is connected in the system may be entered into the system.

It is an object of the invention disclosed herein to provide a monitoring system which permits changes in the video equipment composition and configuration of the television viewing system, such as removal or disconnection of a video recorder/player or cable converter from the system, and/or which permits moving a viewing system from one location to another within the same household, by a household member, without requiring trained personnel such as technician, and without requiring an on-site reconfiguration, start up or setup by trained personnel.

It is an object of the invention disclosed herein to provide a monitoring system and methods for monitoring a television viewing system in which system parameters, which in some way control or affect operation of the system, or control information gathering, storing or transmission, may be entered, changed or restored automatically, locally and/or remotely.

It is an object of the invention disclosed herein to provide a monitoring system and methods for monitoring a television viewing system which obtain more accurate and/or more reliable and/or consistent information relating to video tuned, recorded, played back and/or displayed by the television viewing system and information relating to the viewing audience.

It is an object of the invention disclosed herein to provide improved monitoring devices, particularly for monitoring a video recorder/player for a monitoring system of the types described above.

According to the invention disclosed herein, which achieves the above and other objects, a monitoring system is provided for monitoring a television viewing system which includes a television and a video recorder/player, and which determines: the operating mode of the video recorder/player; "fingerprints" video recorded by the video recorder/player so as to enable such video to be identified upon playback as having been recorded by the video recorder/player and preferably also enables other information to be obtained relating to the recorded video; and obtains, stores and transmits information relating to the video recorder/player.

The term "video recorder/player" is used broadly and is meant to encompass various types of video recorders, video players, and combined video recorders and players; and video recorders, video players, and combined video recorders and players including a TV tuner. One example of a video recorder/player in wide use today is the VCR. Where appropriate, the term VCR is also applicable to other video recorder/players, and where appropriate, the term VCR is not meant in limiting sense.

In a specific embodiment, the TV viewing system includes a VCR, and the monitoring system receives TV signals being supplied to the VCR for recording. The monitoring system generates timing signals and fingerprinting signals from the TV signals supplied to the VCR and supplies the fingerprinting signals to the VCR to be recorded with the TV signals in the vertical blanking interval thereof. Thus, such fingerprinting signals are transparent upon playback of the recorded TV signals in so far as the viewing audience is concerned. Such timing signals are also used by the system to determine the scan (forward or reverse) and pause modes of the VCR. The monitoring system also detects when the VCR is in record and when it is in playback, when the VCR is on or off, and the state of the TV/VCR switch. Thus, the monitoring system is capable of detecting all VCR modes. The monitoring system also detects the channel to which the TV is tuned, the channel to which the VCR is tuned, and the channel to which the cable converter is tuned. The monitoring system may further include switches for coupling video sources such as antennas, cable converters, satellite antennas, video games, etc., to the VCR and/or TV, and video switches for switching cable trunks to the cable converter (if the cable converter does not already incorporate an electronic trunk switch). Such switches expand the number of video sources which the TV viewing system can accommodate and are monitored by the monitoring system to detect the switch positions thereof. The monitoring system is thus capable of fully monitoring the equipment in a TV viewing system.

The monitoring system also includes means for entering information relating to viewers, both resident or household viewers and guest viewers, and means for storing and processing such information. The means for entering information may also be used by a technician such as an installer when installing or testing the monitoring system. The monitoring system includes an alphanumeric display, and the monitoring system is interactive with the information entering means and the display.

In accordance with one aspect of the invention, multilevel and multi-task processing capabilities are provided which facilitate VCR monitoring while permitting other monitoring and information gathering functions to be carried out simultaneously. A separate processing means, including read only and random access memory, is provided dedicated to monitoring the VCR. This processing means may be referred to as a first level processing means. In a specific embodiment, the first level processing means forms part of a VCR probe/detector which is coupled to the VCR and to a second level processing means.

The second level processing means coordinates operations of the first level processing means and provides data to the first level processing means to be used in fingerprinting video recorded by the VCR. The second level processing means also includes read only and random access memory, and preferably also includes a real-time clock. The second level processing means receives data from the first level processing means and from a higher level processing means, and stores it, processes it and/or transmits it to the first level processing means or to the higher level processing means. The second level processing means also includes a battery backup and stores operating parameters used by the first level processing means which may be loaded or reloaded into the first level processing means.

Preferably, the second level processing means includes the alphanumeric display and is coupled by wire or radiation to the information entry means, which may be a key pad device or keyboard, for the purpose of interactively receiving viewer information and/or equipment and/or parameter information. One such second level processing means is preferably provided for each TV to be monitored. A specific embodiment of a second level processing means described herein is referred to as a monitor display unit ("MDU").

A third level processing means receives data and information from one or more second level processing means, and stores that data for transmittal to a next higher level processing means or as a backup to the second and/or first level processing means. The third level processing means also receives data from the next higher level processing means for transmittal to the second level processing means and/or to the first level processing means through the second level processing means. A specific embodiment of a third level processing means described herein is referred to as a central data sending unit ("CDSU").

The next higher or fourth level processing means may be a central computer coupled to a number of third level processing means by, for example, modems and a telephone network.

The first level processing means generates the "fingerprinting" signals which are supplied to a VCR for recording with the video being recorded by the VCR. The first level processing means is also supplied with video played back by the VCR and detects fingerprinting signals previously recorded by the VCR. The first level processing means is coupled to the VCR such that fingerprinting signals generated by the first level processing means are mixed with the normal video being recorded by the VCR, but timed to be recorded in the vertical blanking interval of the TV video signals, and are therefore transparent to the television viewing audience, as indicated above. In a specific embodiment, the first level processing means detects a vertical synchronization pulse of TV video signals and generates timing signals (e.g., TV field synchronization pulses) related thereto for generating the fingerprinting signals so that they will be recorded in the vertical blanking interval of a TV video signal being recorded by the VCR. The timing signals generated by the first level processing means are also used for detecting recorded fingerprinting signals in a TV video signal being played back by the VCR. In a specific embodiment, the first level processing means is coupled to the VIDEO OUT jack of the VCR and receives TV signals being recorded by the VCR. The first level processing means is also coupled to a point upstream of the recording heads of the VCR at which point the fingerprinting signals generated by the first level processing means may be mixed with the TV signals being recorded by the VCR. One such point is the VIDEO IN jack of the VCR. In VCRs having a switching VIDEO IN jack, that jack is prevented from switching when the first level processing means is coupled thereto. Other arrangements are made for VCRs having electronically switched VIDEO IN inputs.

In accordance with another aspect of the invention, the monitoring system encodes the fingerprinting signals it generates with data identifying the date and time that the TV signal was recorded, the video source, and/or the channel of the video signal. Such data, which in part may be gathered by the first level processing means, is provided to the first level processing means by the second level processing means which may generate such data and/or receive it from a higher level processing means. While in the embodiment described above, a first level processing means is provided for (and which may be dedicated to) fingerprinting and VCR monitoring, the processing described above carried out by the first level processing means and processing provided by another level processing means may be combined, although that is not presently preferred.

In accordance with an aspect of the invention, a device is provided which obtains a signal related to the frequency of the channel tuned by a tuner in the television viewing system without being physically connected to that tuner or any circuitry in the video equipment of which that tuner forms part. In specific embodiments, the device includes a pickup or probe which picks up a signal radiated by the tuner or circuitry (such as a prescaler) in the video equipment of which the tuner forms part. Such a device obtains a signal directly related to the frequency of the tuned channel, for example, the tuner local oscillator ("LO") frequency. Such a device provides the advantage of not requiring a physical connection of the device to a circuit or other point in the tuner or video equipment, which avoids possible loading problems, the possibility that the device will be connected to the wrong point, and the possibility of adversely affecting operation of the tuner or the particular piece of video equipment.

The monitoring system disclosed herein has the capability of functioning with different types of devices which obtain signals related to the frequency of a tuned channel, including devices which pick up a radiated signal and devices which are physically connected to a tuner or the video equipment of which it forms part.

In accordance with another aspect of the invention, the system disclosed herein may operate with and monitor cable converters of different manufacturers which may have different intermediate frequencies. The system determines the intermediate frequency (or a parameter related thereto) of a particular cable converter during an installer interactive setup procedure, and stores it for use in determining the channel to which the converter is tuned. This setup procedure is operative with any of the devices described above for obtaining a signal related to the frequency of the tuned channel.

According to another aspect of the invention, monitoring devices of which the system is formed are provided with circuitry which alone or in cooperation with downstream processing uniquely identifies a particular device vis a vis other devices in the monitoring system. Accordingly, the monitoring system itself may automatically determine whether a particular device is connected in the system at any given time.

A monitoring system is provided in accordance with the invention for monitoring a plurality of home television viewing systems which may comprise in different combinations a TV, a VCR, a cable converter, and a video switch coupling video source inputs to said TV, VCR, or cable converter. The monitoring system comprises in each viewing system: first means (e.g., MDU) including programmed processing means for generating information identifying the channel to which each tuner in the respective viewing system is tuned and information identifying the video source of video displayed by the TV; second means (e.g., probe/detectors) coupled to each tuner in the respective system for obtaining therefrom and providing to the first means a signal related to the frequency to which the respective tuner is tuned; third means (e.g., in the VCR probe/detector) coupled to the VCR for providing to the first means signals indicative of operating modes of the VCR; fourth means (e.g., in the TV probe/detector) coupled to the video switch for obtaining and providing to the first means signals indicative of the switch position of the switch; and fifth means (e.g., in the VCR probe/detector) including programmed processing means coupled to the first means to receive the information therefrom. The monitoring system also includes central processing means coupled to each fifth means for obtaining the information therefrom and/or supplying thereto.

In a preferred embodiment, the programmed processing means in the fifth means is dedicated to obtaining and providing the signals indicative of operating modes of the VCR; and a first and second means are provided for each of a plurality of TVs in a household, and a third and a fourth means are provided for each VCR and video switch, respectively, with each of the first means being coupled to a common fifth means disposed in the same household. Also in the preferred embodiment, the system includes means for receiving data from the central processing means, the first means being provided with at least one down-loadable and/or up-loadable parameter, and the first and fifth means including means for replacing the at least one parameter in the first means. The at least one down-loadable parameter may be a persistence value which sets the minimum time that a given event must persist before it is reported by the monitoring system as an event, and the at least one up-loadable parameter may be information obtained during setup such as equipment configuration.

In accordance with another aspect of the invention, the monitoring system provides information relating to the TV viewing audience and information regarding equipment and parameters, and includes: a data entry unit for entering information by the viewing audience relating to household members and guests and/or for entering equipment and parameter information by a technician; programmed processing means which receives data from the data entry unit and processes it; and an alphanumeric display coupled to the processing means for displaying alphanumeric messages generated by the processing means. The processing means is programmed to be interactive with the data entry unit and the alphanumeric display to cause displaying by the display of prompts and messages which may be used by a guest to enter demographic information of that guest or by a technician to enter setup information or to test the system.

The system disclosed herein is capable of obtaining more accurate and more reliable information relating to the television viewing system, the monitoring system and the viewing audience. One of the reasons for this is the distribution within the system of processing, for example, into four levels, three of which are in the household. Another reason is the capability of the system to require that any reportable event persist for a given minimum time before it is in fact reported, and the capability of the system to require different persistence times for different events. A further reason is the capability of the system to alter or reload down-loadable parameters such as persistence values remotely, either from a local (e.g., household) location or from a central location, and to upload parameters determined by lower level processors with the capability of reloading those parameters into lower level processors.

Other aspects of the invention relate to various combinations of aspects and features, including but not limited to arrangement, disposition, and assignment of processors and processing tasks, and to methods for carrying out various monitoring, detecting, and fingerprinting features and tasks.

For example, a method is provided for identifying a TV signal displayed by a TV which TV signal is being played back by a VCR, comprising the steps of: generating a fingerprinting signal; supplying the fingerprinting signal to the VCR at a point suitable for mixing with a TV signal being recorded by the VCR during the vertical blanking interval of that TV signal; an detecting the fingerprinting signal in the TV signal when played back by the VCR.

A method is also provided for identifying a TV signal displayed by a TV in a TV viewing system as being played back by a VCR and for identifying the video source of the recorded TV signal, comprising the steps of: generating a fingerprinting signal; encoding the fingerprinting signal with information identifying the video source of a TV signal being recorded by the VCR; supplying the fingerprinting signal to the VCR at a point suitable for mixing with the TV signal being recorded by the VCR in the vertical blanking interval of the TV signal; detecting the fingerprinting signal in the TV signal when subsequently played back by the VCR; and decoding the video source information.

A method is also provided for determining the scan/-pause operating modes of a VCR comprising the steps of: generating timing signals having variable pulse widths related and in response to vertical synchronization pulses in TV signals supplied to the VCR and in response to noise; measuring the pulse widths; and processing the pulse widths and data relating the pulse widths to scan/pause operating modes of the VCR to identify VCR scan/pause modes.

Another method is provided for determining the intermediate frequency (or a number related thereto) of any of a plurality of cable converters having different intermediate frequencies lying within a given range of frequencies, comprising the steps of: tuning the cable converter to a given channel; obtaining the frequency to which the local oscillator of the cable converter is tuned; calculating the broadcast signal frequency for the tuned channel using an assumed intermediate frequency and the frequency of the local oscillator signal; obtaining a frequency difference between the calculated broadcast signal and that of a given channel; and obtaining and storing a frequency offset related to the cable converter intermediate frequency by subtracting the frequency difference from the local oscillator frequency.

Still another method is provided for identifying the channel to which a cable converter, which may have any of a limited number of intermediate frequencies, is tuned, comprising the steps of: tuning the cable converter to a given channel; obtaining the frequency to which the local oscillator of the cable converter is tuned; calculating broadcast signal frequency for the tuned channel using an assumed intermediate frequency and the frequency of the local oscillator signal; obtaining a frequency difference between the calculated broadcast signal and that of a given channel; obtaining and storing a frequency offset related to the cable converter intermediate frequency by subtracting the difference from the local oscillator frequency; obtaining the local oscillator frequency of any channel tuned by the converter; subtracting the frequency offset from the local oscillator frequency obtained in the previous step to obtain another frequency difference; and comparing the frequency difference obtained in the previous step with a table of frequency differences to identify the tuned channel.

The above and other objects, aspects, features and advantages of the invention disclosed herein will be more readily perceived from the following description of the preferred embodiments thereof taken with the accompanying drawings and appended claims.

BRIEF DESCRIPTION OF THE DRAWINGS

The present invention is illustrated by way of example and not limitation in the figures of the accompanying drawings in which like references denote like parts, and in which:

FIGS. 10, 11, 12, 13, 13A, 14–14B, and 15 are flow charts of the FMCO, CODISPLAY, COPERSIST, COMONITOR, VCRCO, and VCRCOMCO co-routines of the resume loop of FIG. 9.

DESCRIPTION OF THE PREFERRED EMBODIMENTS

GENERAL SYSTEM AND SUBSYSTEM DESCRIPTION

Figure 1:
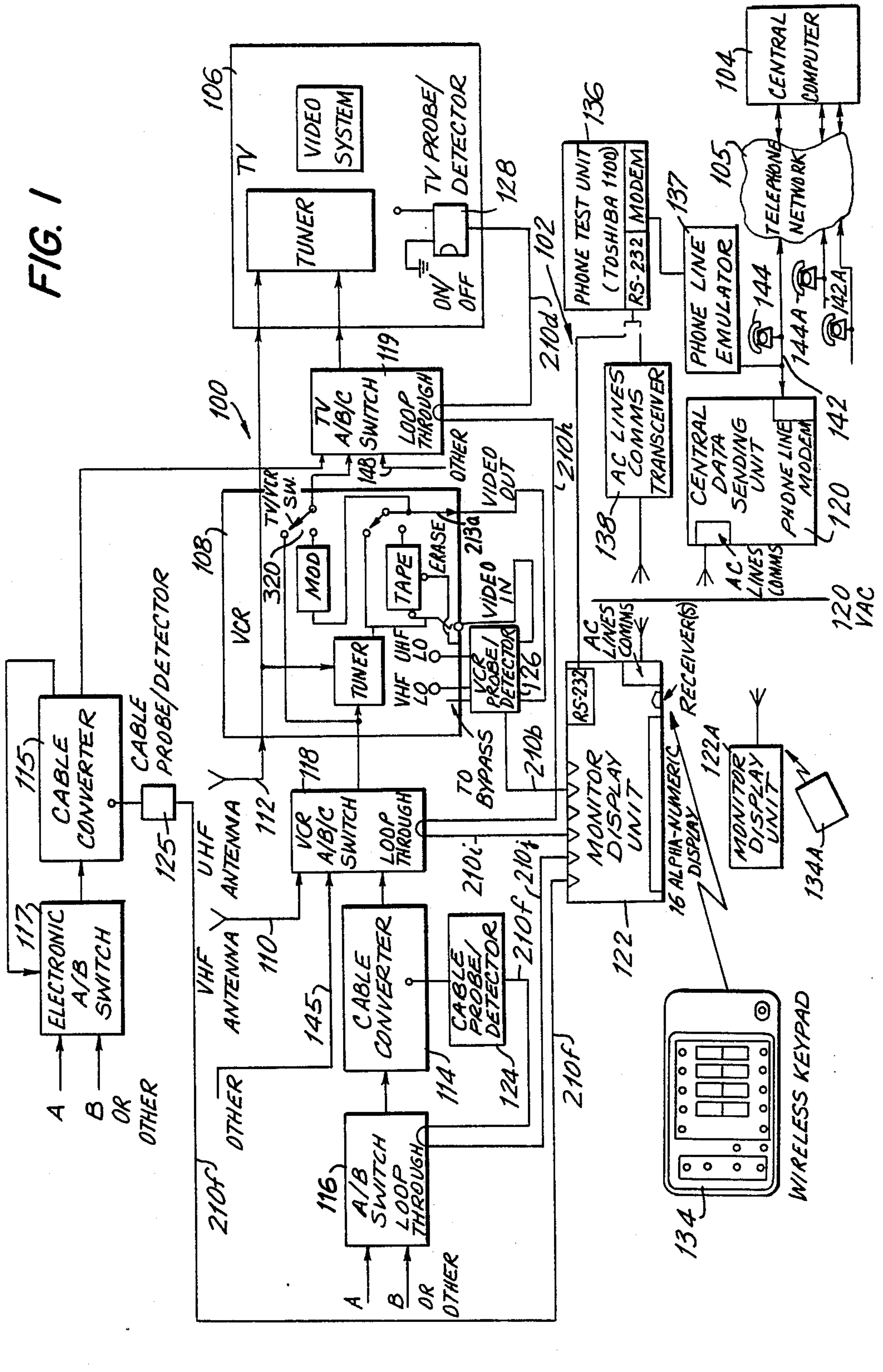
FIG. 1 is a block diagram of a monitoring system for monitoring and obtaining TV viewing information from a home TV viewing system according to the invention.

FIG. 1 depicts a home television viewing system 100 and a monitoring system 102 which monitors, records and transmits television viewing and audience information or data (information and data are typically used interchangeably herein) to a central computer 104 via a telephone network 105 such as a telephone public switch dial network or value added network (e.g., TYMNET). Home television viewing system 100 includes television 106, video cassette recorder ("VCR") 108, off-air VHF antenna 110, off-air UHF antenna 112, cable converters 114 and 115, and portions of external cable converter trunk switch ("cable trunk switch") 116 and an electronic cable trunk switch 117 (typically supplied internally, but may be supplied externally, with the associated cable converter 115), VCR video switch 118 and TV video switch 119. Monitoring system 102 includes central data storage unit ("CDSU") 120, monitor display unit ("MDU") 122, cable converter probe and detectors ("cable probe/detector") 124 and 125, VCR probe and detector ("VCR probe/detector") 126, TV probe and detector ("TV probe/detector") 128, remote handset 134 and portions of cable trunk switch 116, VCR video switch 118 and TV video switch 119. The specific equipment of which monitoring system 102 is comprised depends on the specific equipment present in the particular home viewing system being monitored. Less or more equipment than that shown in FIG. 1 may constitute a particular viewing system 100/monitoring system 102 combination. For example, a cable probe/detector 124 and/or 125 will not be used in a viewing system which does not include a cable converter 114, 115, respectively, etc. In addition, a particular monitoring system 102 may have different versions of a TV, VCR (or other video recorder/player), or cable probe/detector. Versions of probe/detectors may differ based on the circuitry and frequency detecting probe used, and type I and type II versions of the VCR probe/detector may differ, particularly with respect to how they communicate with MDU 122. In the presently preferred embodiment, all monitoring systems include an MDU 122, a CDSU 120, a wireless keypad input device 134, sometimes referred to herein simply as "handset", and one combination or another of a TV probe/detector 128, a VCR probe/detector 126 and a cable probe/detector 124, 125. System 100 may also e provided with test and setup equipment such as a phone test unit ("PTU") 136, a phone line emulator ("PLE") 137, and an AC lines transceiver 138, and may also operate with different versions of MDUs and CDSUs.

A CDSU 120 may be coupled to a number, for example 16, of MDUs 122, 122A, there being one MDU 122, 122A and one handset 134, 134A required for each TV to be monitored. In the presently preferred embodiment, a CDSU 120 is disposed in a respective viewer defined group, e.g., a household, and communicates with the MDUs in that viewer-defined group via the domestic AC power supply lines. Alternatively, a CDSU may be coupled, preferably by AC power lines, to a number of MDUs in a viewer-defined group encompassing more than one household. (For convenience, "household" will be referred to hereafter as a specific example of a viewer-defined group.) Thus, each TV in a household or other viewer defined group may be monitored using a single CDSU 120.

In the presently preferred embodiment, CDSU 120 communicates with central computer 104 over telephone line 142 and telephone network 105. Use of a household telephone 142 by monitoring system 102 is not required. Central computer 104 is selectively coupled to a number of monitoring systems 102, 102A . . . in different households via telephone lines 142, 142A . . . , and telephone network 105 to form an overall television monitoring system which may be used in a TV ratings system or to determine audience viewing for specific TV programs, or to collect data on buying or other activity related to viewing patterns.

Monitoring system 102 monitors, records and transmits to central computer !04 television viewing information (data) including: (a) the video source of the program being displayed on TV 106, i.e., whether the program source is an off-air antenna, satellite antenna, cable converter 114 or 115, direct cable (cable ready), or tape playback from VCR 108; (b) the equipment connected in television viewing system 100 and in monitoring system 102 including the interconnection, or setup, of the equipment in systems 100 and 102, which defines the video path from a particular video source such as an antenna or cable trunk to TV 106 or VCR 108; (c) channel information including that of the tuners in TV 106, VCR 108 and cable converters 114, 115 or frequency information relating to the channel tuned by such tuners (e.g., the frequency of the LO in the respective tuner); (d) the mode of VCR 108; (f) date and time of day information; and (g) viewing audience information. Much of the information is "down-loadable" or "up-loadable" and may be changed if desired, or replaced if lost due to a power failure.

Processing capability is provided in CDSU 120, MDU 122 and VCR probe/detector 126 of system 102, in addition to central computer 104. Thus, processing is distributed over a number of stages or levels to provide flexibility and enhance raw and processed data collection, and data and parameter backup.

Monitor Display Unit (MDU) 122

Functions performed by MDU 122 include: receiving information from the probe/detectors 124, 125, 126 and 128; controlling data transfer between probe/detectors 124, 125, 126, 128 and MDU 122; receiving (e.g., via handset communications) and storing information related to the viewing audience; storing in MDU 122 and/or for transfer to CDSU 120, channel tuning information from TV 106, VCR 108 and cable converters 114, 115, video source information, MDU status information, VCR mode information, equipment setup configuration information, and information relative to test parameters; transmitting data (e.g., fingerprinting data) to VCR probe/detector 126; maintaining stored data (information) in the event of an AC power failure; displaying data for and messages for TV viewers and installers; receiving data from CDSU 120; and transmitting data to CDSU 120 when polled by CDSU 120 via the domestic AC power lines in the household.

The information collected from probe/detectors 124 and 125 includes information indicating the particular channel to which the respective converter is tuned. MDU 122 also receives information via cables coupled to cable probe/detectors 124, 125, and from TV probe/detector 128 as to the switch configuration of cable trunk switches 116, 117, and VCR and TV video switches 118, 119, respectively. The information collected from probe/detectors 126 and 128 indicates whether the VCR and TV are on or off, and the particular channel to which the VCR and TV tuner are tuned. MDU 122 and VCR probe/detector 126, which includes a microprocessor, cooperate to identify or "fingerprint" programs recorded by VCR 108 so that upon playback of the recorded program by VCR 108, the program may be identified as having been recorded by VCR 108, the video source from which the program was recorded identified and the date and time of recording obtained. This allows central computer 104 to identify the recorded program as to broadcaster, station, and date and time of broadcast, and ultimately program title and/or episode. Date and time information is also used by MDU 122 to detect discontinuities in programming played back by VCR 108. VCR probe/detector 126 also supplies information to MDU 122 as to the mode status of VCR 108.

Information in respect of the viewing audience is transmitted to MDU 122 by a TV viewer via hand-held remote wireless keypad input device or handset 134.

MDU 122 includes an alphanumeric readout on which the status of the information collected by MDU 122 is displayed. Where more than one MDU 122 is installed, each MDU 122 is identified in a unique manner and is supplied with its own handset 134. Handset 134 communicates with a respective MDU 122 via an ultrasonic or infrared signal. Further details regarding handset 134 may be found in U.S. Pat. No. 4,644,393 (Smith et al., assigned to AGB Research PLC). The '393 Smith et al. Patent discloses a monitoring system for a TV in which information relating to the viewing audience is entered by a handset. That monitoring system includes a channel detection unit, a communication unit linked by the AC power lines to the channel detection unit, and a central processor linked to the communication unit by a telephone network. The disclosure of the '393 Smith et al. Patent is incorporated herein by reference.

MDU 122 is polled approximately every eight seconds by CDSU 120 and responds via the domestic AC power supply lines. Communication between MDU 122 and CDSU 120 in response to a poll may be intermittent and continues until completion. After completion of such communication, MDU 122 is polled again, on average, in about eight seconds.

Central Data Storage Unit (CDSU) 120

Functions performed by CDSU 120 include the following: (a) transmitting to and receiving data from MDUs 122 via the domestic AC power lines; (b) transmitting to and receiving data from central computer 104 via a modem link which uses ordinary telephone lines 142; (c) storing data received from MDUs 122 and central computer 104; (d) maintaining stored data and a telephone dialing capability in the event of an AC power failure; (e) supplying MDU 122 with backup data to replace data lost by MDU 122 and new data to replace data stored by MDU 122 which controls, in some way, operation of MDU 122 or other parts of system 102; (f) maintaining real time synchronized with that in central computer 104 (time base synchronization); (g) using the synchronized real time to compute local time; and performing other processing such as setting the start of the research day, next day processing, etc.

System 102 synchronizes CDSU real time clocks once each day and loads a local time offset from EST into each CDSU so that all CDSUs, although synchronized with the real time clock in central computer 104, will also have the appropriate local time. As a result, all CDSUs will have the correct local time. End of research day (e.g., 2:00 a.m.) may then be done on a local time basis, and system 102 insures that a CDSU is called only once in a processing day regardless of call records (referred to as next day processing).

Cable Converter Probe/Detectors 124, 125

Each of cable probe/detectors 124, 125, which are essentially the same: (a) outputs an identification signal unique to a cable probe/detector to MDU 122 for identifying the cable probe/detector; (b) outputs a signal to MDU 122 which is indicative of the frequency to which the respective cable converter 114, 115 is tuned; and (c) in cooperation with circuitry in cable trunk switches 116, 117 provides MDU 122 with signals from which the switch position of external cable trunk switch 116 may be determined, and provides MDU 122 with signals from which the switch position of electronic trunk switch 117 may be determined.

Each of cable probe/detectors 124, 125 obtains the frequency representative signal referred to above in one of three ways: (1) by means of a pickup (e.g., a loop) electromagnetically coupled to the local oscillator ("LO") of the cable converter; (2) by means of a pickup (e.g., a stub) electromagnetically coupled to an internal LO prescaler; or (3) by direct connection of the probe to a circuit point in the respective cable converter 114, 115, for example before or after an internal LO prescaler. A probe which includes a pickup for receiving a radiated electromagnetic field signal from the LO is referred to herein as a "loop connect" probe; a probe which includes a pickup for receiving a radiated electromagnetic field signal from a circuit point is referred to herein as a "close connect" probe; and a probe which receives a signal from a direct electrical connection to a circuit point is referred to herein as a "direct connect" probe.

The "loop connect" probe is relatively broadband and is inserted into the tuner section of the cable converter in relatively close proximity to the LO in order to pickup the strongest LO signal. The "close connect" probe preferably includes a narrow band filter (e.g., 1–4 MHz and is therefore frequency selective and may be placed in a number of locations in the cable converter unit, not necessarily relying on picking up the strongest signal but rather relying on picking up a signal in the frequency band of the prescaler output.

As depicted in FIG. 1, cable probe/detector 124 is coupled to MDU 122 through cable trunk switch 116, cable probe/detector 124 and cable trunk switch 116 cooperating to provide MDU 122 with information of the switch position of cable trunk switch 116. Cable probe/detector 125 is coupled to electronic cable trunk switch 117 and provides MDU 122 with information of the switch position of electronic cable trunk switch 117.

TV Probe/Detector 128

TV probe/detector 128: (a) outputs an identification signal unique to a TV probe detector to MDU 122 for identifying TV probe/detector 128; (b) outputs either a signal to MDU 122 which is representative of the frequency to which the VHF tuner in TV 106 is tuned or a signal representative of the frequency to which the UHF tuner in TV 106 is tuned; and (c) outputs a signal which indicates whether TV 106 is on or off. TV probe/detector 128 includes a direct connect probe for connection either to the internal prescaler in TV 106, or to a non-prescaled circuit point before the prescaler, or alternatively, a close connect probe, or a VHF band loop connect probe (for picking up both off-air broadcast and all cable channels) and a UHF band loop connect probe (not shown).

As depicted in FIG. 1, TV probe/detector 128 is coupled to MDU 122 through TV video switch 119 and VCR video switch 118. TV probe/detector 128, TV video switch 119 and VCR video switch 118 cooperate to provide MDU 122 with information of the switch positions of TV video switch 119 and VCR video switch 118.

VCR Probe/Detector 126

VCR probe/detector 126: (a) outputs an identification signal unique to a VCR probe/detector to MDU 122 for identifying VCR probe/detector 126; (b) outputs a signal to MDU 122 which is representative of the frequency to which the tuner in VCR 108 is tuned; (c) during recording, encodes identification or finger-printing data onto the tape on which VCR 108 is recording; (d) during playback, detects and decodes identification or finger-printing data previously recorded by VCR 108 on the tape being played, and provides the decoded data to MDU 122 or alternatively detects the absence of such identification data and provides a statement to MDU 122 that VCR 108 is playing back an unencoded tape, e.g., a tape not recorded by VCR 108 such as a rented or purchased video, or a tape recorded by another VCR; (e) automatically determines when VCR 108 is in the playback mode and outputs a signal indicating same to MDU 122; (f) detects on/off of VCR 108, the record mode of VCR 108, scan/pause modes of the VCR (i.e., VCR scan forward, scan reverse, and pause modes), and provides signals indicative of same to MDU 122; (g) determines when VCR 108 is being bypassed (program displayed on TV 106 is tuned by TV 106) and provides a signal indicative of same to MDU 122; and (h) cooperates with MDU 122 for two-way communication between MDU 122 and VCR probe/detector 126.

VCR probe/detector 126 is provided with processing and memory circuitry which enables many of the functions described above to be performed by probe/detector 126 alone or in cooperation with MDU 122. VCR probe/detector 126 includes a VHF band loop connect probe and a UHF band loop connect probe, but may include other types of probes.

Cable Converter Trunk Switches 116. 117

Cable trunk switch 116 is a two-position (A/B) manually operable RF switch used to select between cable trunk A and cable trunk B (or another RF input from another source) feeding cable converter 114. A switch 116 is used with a cable converter having a mechanical trunk switch (or no trunk switch) associated therewith, but is not used with a cable converter having an electronic trunk switch 117 which electronically switches between cable trunks A and B. The switch position of switches 116, 117 is determined by MDU 122 via a respective cable converter probe/detector 124, 125, as described below.

VCR Video Switch 118

VCR video switch 118 is a three-position (A/B/C) manually operable RF switch used to select a TV signal from VHF antenna 110, cable converter 114 or an RF input from another source (line 145) such as a video game, a computer, a direct cable feed, etc. The switch position of switch 118 is determined by MDU 122 via TV probe/detector 128, as described below.

TV Switch 119

TV video switch 119 is a three-position (A/B/C) manually operable RF switch used to select a TV signal from a second cable converter 146, VCR 108 or an RF input from another source (line 148) such as a video game, a computer, or direct cable feed, etc. The switch position of switch 119 is determined by MDU 122 via T probe/detector 128, as described below.

DETAILED SYSTEM AND SUBSYSTEM DESCRIPTION

Figures 1, 2:
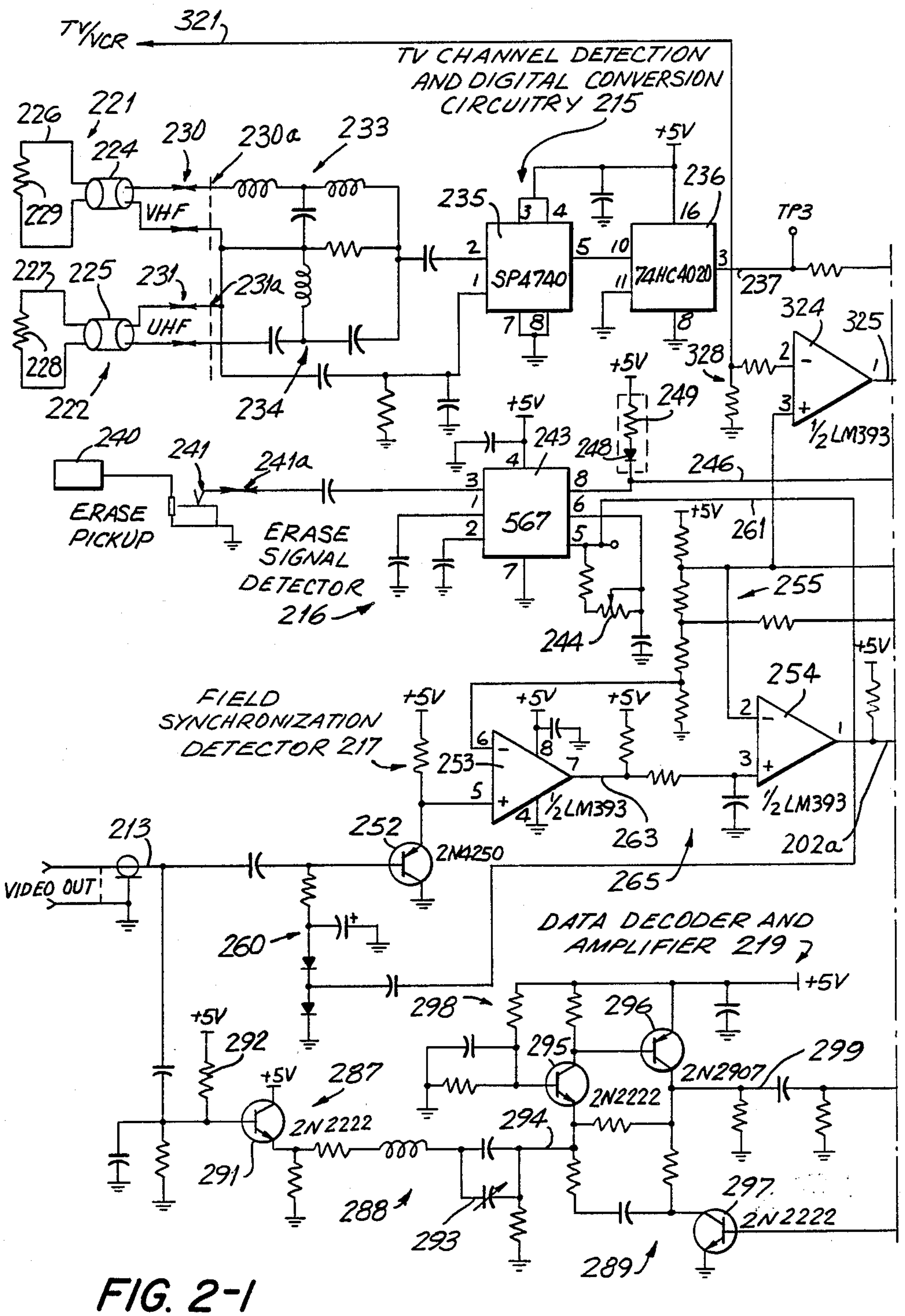
FIG. 2, which consists of FIGS. 2-1 and 2-2, is a schematic circuit diagram of one embodiment of the VCR probe/detector of the system depicted in FIG. 1.
Figure 2:
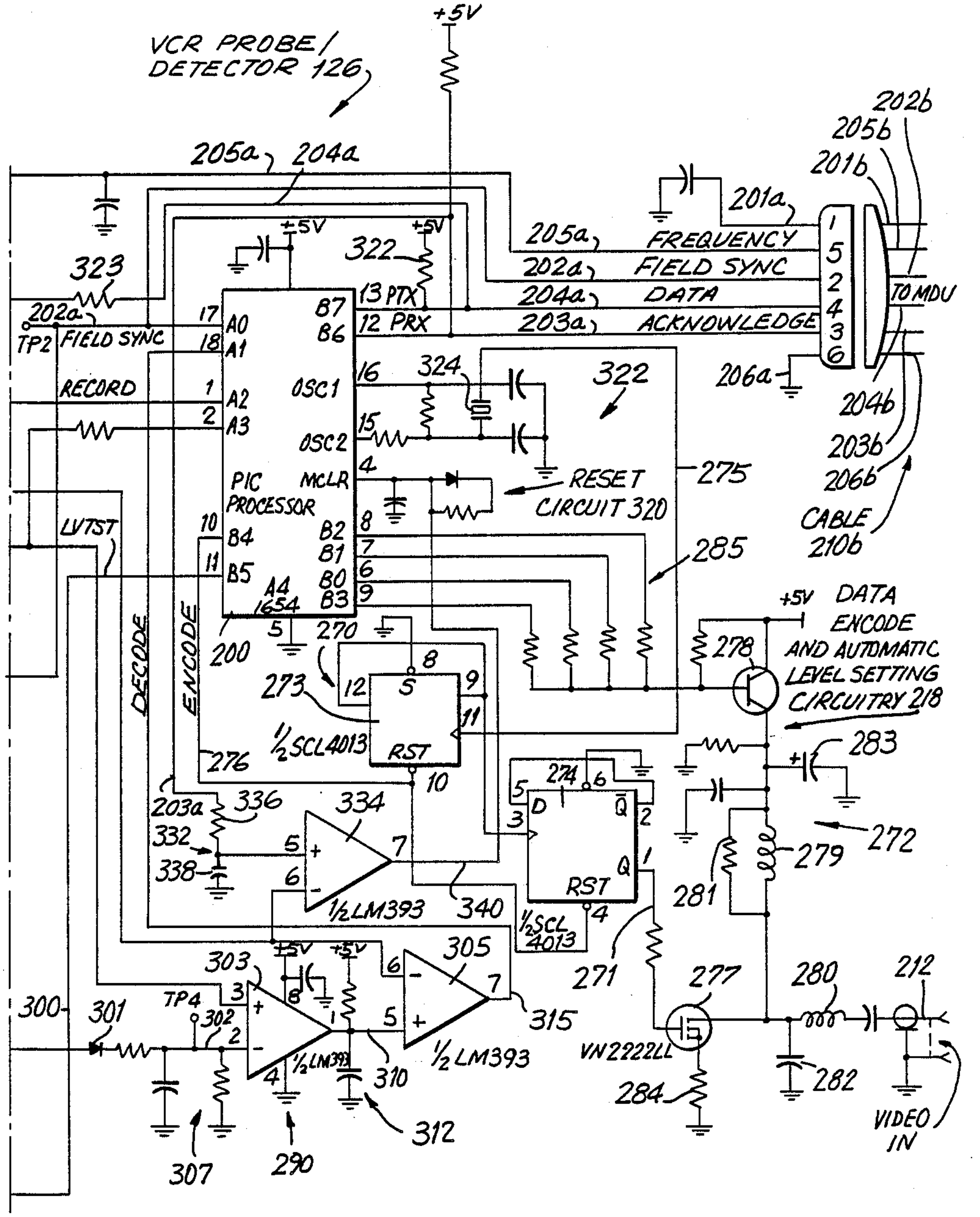

VCR Probe/Detector 126 (FIG. 2)

As mentioned above, VCR probe/detector 126 includes processing circuitry which enables the processing capability of monitoring system 102 to be distributed among four stages or levels, i.e., central computer 104, CDSU 120, MDU 122 and VCR probe/detector 126. As depicted in FIG. 2, VCR probe/detector 126 includes PIC processor 200 containing processing and memory circuitry utilized by VCR probe/detector 126 to carry out the first level of the distributed processing capability of system 102. VCR probe/detector 126 is connected to MDU 122 by a six-conductor cable **210*b*, which includes lines 201*b*, 205*b*, 202*b*, 204*b*, 203*b*, and 206*b* connected, respectively, by means of mating connectors to a +5 volt line 201*a* (power is input to VCR probe/detector 126 from MDU 122 on line 201*b*), a FREQUENCY line 205*a*, a FIELD SYNC line 202*a*, a DATA line 204*a*, an "ACKNOWLEDGE" line 203*a*, and a ground line 206*a*. (Lines of interconnected cables are designated by the same reference numeral throughout but with different letter references. For example, the +5 volt line is designated by "201" throughout followed by a different letter for the different cables and circuits. Table I, discussed further below, summarizes the signals which conductors 201–206 may carry depending on the particular cable of which the conductor is part.) VCR probe/detector 126 further includes an output line 212 ("VIDEO IN") connected by a cable to VCR 108 "VIDEO IN" jack 212*a* (FIG. 1), and an input line 213 ("VIDEO OUT") connected by a cable with VCR 108 "VIDEO OUT" jack 213*a* (FIG. 1**).

PIC processor 200 (available from, for example, General Instrument Corporation as PIC 1654) controls operation of probe/detector 126 to provide data to MDU 122 on DATA line **204*a* indicative of whether VCR 108 is on or off and the particular mode that VCR 116 is in, i.e., record, playback, scan/pause, and whether the VCR tuner is being bypassed. PIC processor 200 also controls VCR probe/detector 126 to provide an encoded signal on VIDEO IN line 212 to VCR 108 to be recorded by VCR 108 with a TV program then being recorded on tape by VCR 108. The encoded signal includes the time and date that the program was recorded and its video source. PIC processor 200 also detects from a TV signal played back by VCR 108 (received on VIDEO OUT line 213) whether the program being played back was previously being recorded by VCR 108. PIC processor 200 receives data from MDU 122 on the "ACKNOWLEDGE" line 203*a*. The FREQUENCY line 205*a* outputs a signal to MDU 122** which is counted down from the detected LO frequency of the VCR tuner (loop detect probe) or a signal obtained from VCR prescaler in a VCR having same (direct connect probe).

VCR probe/detector 126 includes the following functional circuit blocks: TV channel detection and digital conversion circuitry 215; erase signal detector 216; field synchronization detector 217; data encode and automatic level setting circuitry 218; data detector and amplifier 219; and PIC processor 200.

VCR probe/detector 126 includes two probes 221, 222 which are positioned inside the tuner in VCR 108 to sense the frequency to which the LO of the tuner is tuned. Probe 221 is a radio frequency (RF) probe suitable for the UHF band and probe 222 is an RF probe suitable for the VHF band. Each probe 221, 222 includes a relatively short length of coaxial cable 224, 225, e.g., 35 cm, to one end of which is connected a pickup loop 226, 227, respectively, and a resistor 228, 229, respectively, (e.g., 5.6 ohm or 27 ohm) in series with the respective loop. The other end of each length of coaxial cable 224, 225 terminates in a connector 230, 231, e.g., a miniature jack connector, which is plugged into a mating connector **230*a*, 231*a*, respectively, of VCR probe/detector 126. VCR probe/detector 126** preferably comprises a single printed circuit board (not shown), which is housed in a metal box to reduce interference.

TV channel detection and digital conversion circuitry 215 includes a low pass VHF filter 233 and a high pass filter 234 coupled to connectors **230*a*, 231*a*, respectively, which pass the LO frequency signal obtained by the respective probe to an amplifier/divider 235 Amplifier/divider 235 is preferably a single integrated circuit (available from, for example, Plessey as SP4740) including an amplifier which provides amplification in the VHF and UHF bands up to about 1 GHz., an internal prescaler which divides the amplified signal by 256 and circuitry which provides a logic level output signal. The output of amplifier/divider 235 is coupled to a 14-stage binary divider 236 which divides the signal from amplifier/divider 235 by 16,384 and provides an output signal on line 237 having a maximum frequency of about 222 Hz. for the VHF and UHF frequencies involved. The output from binary divider 236 on line 237 is coupled to the FREQUENCY line 205*a* via a series resistor and shunt capacitor. The prescaler in amplifier/divider 235 and the binary divider 236 are provided so that MDU 122** does not have to operate at radio frequencies.

Erase signal detector 216 includes an erase pickup 240 which in use is positioned close to the erase head of VCR 108 to detect an erase bias signal of from about 60 KHz. to about 100 KHz. which is present during recording in the erase magnetic heads in VCR 108 (a tape passes the VCR erase heads during recording immediately before it passes the record heads). Erase pickup 240 is connected in VCR probe/detector 126 by mating connectors 241, **241*a* which couple pickup head 240 to tone decoder circuit 243 via a coupling capacitor. Tone decoder circuit 243 preferably is a single chip integrated circuit (available from, for example, Signetics as SN567) including a phase-locked loop circuit whose frequency may be set by potentiometer 244 to provide a low output signal on line 246 (RECORD.) ( indicates the inverse of the identified signal) when pickup 240** senses an erase bias signal in the frequency range of 60 KHz. to 100 KHz. A low on RECORD* line 246 causes tone decoder circuit 243 to sink current through light emitting diode (LED) 248 and resistor 24 from the +5 volt supply so as to illuminate LED 248. A low on RECORD line 246 is taken as detection of the bias signal sensed by pick-up 240. The RECORD line 246 output from tone decoder circuit 243 is coupled to port $A_2$ of PIC processor 200. When erase pickup 240 is not connected to connector **241*a*, connector 241*a* AC grounds the input to tone decoder circuit 243** (via the coupling capacitor).

Field synchronization detector 217 detects the vertical synchronization pulse (see FIG. 2A-1) in each field of the TV signal output from VCR 108. Detection of the vertical synchronization pulse of each field is used to provide timing for encoding the time, date, and channel information on and decoding such information from the TV signals recorded and played back, respectively, by VCR 108. Detection (and non-detection) of vertical synchronization pulses is also used in making determinations of the particular mode that VCR 108 is in and whether VCR 108 is on or off, as described below. "VIDEO OUT" line 213 is coupled via a jack and a coaxial cable hardwired thereto (not shown in FIG. 2)

and a connector to the "VIDEO OUT" jack 213*a* of VCR 108 (see FIG. 1).

Field synchronization detector 217 includes transistor 252, comparators 253 and 254, voltage divider circuit 255, and associated resistors and capacitors. Voltage divider circuit 255 includes a number of resistors which define voltage points for providing voltage references to a number of circuits in VCR probe/detector 126 including comparators 253 and 254. Comparator 253 receives a reference voltage (e.g., 0.16 volt) on its inverting input and a signal from the emitter of transistor 252 on its non-inverting input which normally has a DC value less than that of the inverting input reference voltage but which rises above that reference voltage when a vertical synchronization pulse is received on VIDEO OUT line 213. The base of transistor 252 is coupled to VIDEO OUT line 213 via a coupling capacitor and receives vertical synchronization pulses present on the TV signal from VCR 108. The base of transistor 252 also receives a negative voltage (e.g., −2.7 volts) derived by circuit 260 coupled to output 261 of tone decoder circuit 243 via a coupling capacitor. That negative voltage forward biases transistor 252 to provide a essentially ground voltage at the emitter of turned-on transistor 252 (equal to the voltage across collector-emitter junction of transistor 252), which is coupled to the non-inverting input of comparator 253. Thus, in the absence of a vertical synchronization pulse, the voltage at the inverting input of comparator 253 exceeds that at the non-inverting input, and the output 263 of comparator 253 is low. When a vertical synchronization pulse (a positive pulse) is present at VIDEO OUT line 213, the forward bias of transistor 252 is reduced which raises the voltage at the emitter of transistor 252 to a value above that of the inverting input reference voltage, which causes comparator output 263 to go high (e.g., +3 volts). Output 263 is coupled to the non-inverting input of comparator 254 via an integrating circuit 265. The inverting input of comparator 254 receives a reference voltage (e.g., +3 volts) from voltage divider circuit 255, which maintains the output (FIELD SYNC line 202*a*) of comparator 254 low.

Figures 1, 2A:
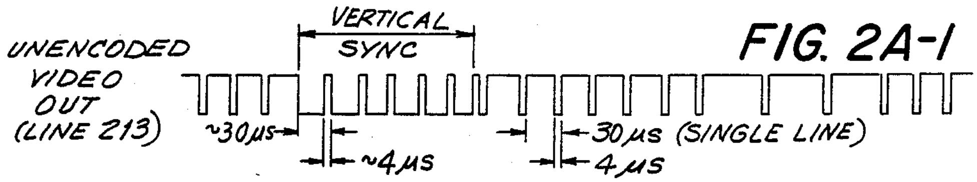
FIG. 2A is a diagram of waveforms at selected points in the circuit of FIG. 2.
Figures 2, 2A:
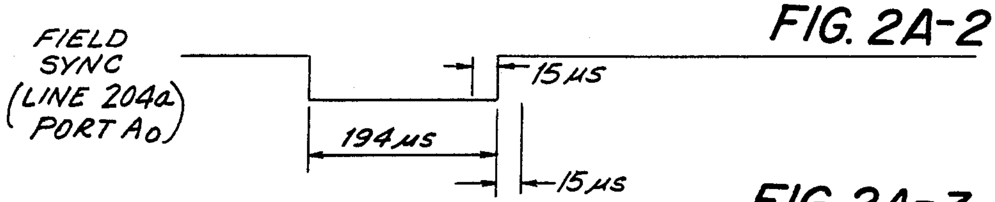

Upon detection of a vertical synchronization pulse at output 263 of comparator 253, the voltage at the non-inverting input of comparator 254 approaches that at the inverting input to produce a negative pulse on FIELD SYNC line 202*a* of about 194 microseconds duration. The output of comparator 254 (FIELD SYNC line 202*a*) is coupled to port $A_0$ of PIC processor 200. A typical vertical synchronization pulse and a typical FIELD SYNC pulse are depicted in FIG. 2A (waveforms 1 and 2). PIC processor 200 compares field sync pulse widths with parameters supplied by MDU 122 to determine VCR modes, as described more fully below.

Data encode and automatic level setting circuitry 218 encodes a 1 MHz. signal which is supplied to the VCR 108 VIDEO IN jack via the VCR probe/detector VIDEO IN line 212. That 1 MHz. signal is recorded by VCR 108 together with, and on the same tape as, a TV program being recorded by VCR 108. The recorded 1 MHz. signal may later be detected by data detector and amplifier 219 when the tape is subsequently played back on VCR 108, thereby allowing system 102 to identify the program being played back by VCR 108 as having been previously recorded by VCR 108, rather than as a TV program being received from an antenna or from a cable converter.

Most VCRs have a switching connector at the VIDEO IN jack 212*a* (see FIG. 1) which passes a TV signal output by the VCR tuner to the VCR record heads when a plug is not connected in the jack, and which switches when a plug is inserted therein to pass the signal from the plug to the VCR record heads instead of the TV signal from the VCR tuner. In order to input both the 1 MHz. signal and the TV signal from the VCR tuner to the record heads of VCR 108 at the same time, the switching connector at the VCR VIDEO IN input must be prevented from switching when a connector plug is inserted therein. This is accomplished by providing a cable having one end hardwired to the VIDEO IN line 212 and the other end fitted with a modified plug having a spring contact which, when inserted in the VCR VIDEO IN 212*a* jack, itself moves, rather than moving the spring in the jack switching connector which would otherwise cause it to switch. Alternatively, the cable may have a clip-on type connector (or hard-wired) for connecting to the VCR at a circuit point beyond the VIDEO IN jack 212*a*. That circuit point is not critical and may be any point at which the 1 MHz. signal and the TV signal from the VCR tuner may be summed without adversely affecting the TV signal, for example, by loading. Connection to an internal circuit point is used with VCRs having an electronically-switched VIDEO IN connector (or path). In those VCRs, insertion of a plug into the VIDEO IN jack is detected by logic, and a solid state switch is used to accomplish switching of the TV signal tuned by the VCR tuner and the signal input on the VIDEO IN jack.

Timing for coding the 1 MHz. signal is taken from detection of the vertical synchronization pulse. Specifically, as depicted in FIG. 2A, a start bit (FIG. 2A-4) for encoding timing commences approximately 15 microseconds (depending on the VCR probe/detector type and jitter) after generation (from the rising edge) of a negative-going FIELD SYNC pulse (FIG. 2A-2) on FIELD SYNC line 202*a;* and encoding starts at about line 8 and ceases at about line 13 of the vertical blanking interval. That timing insures that the 1 MHz. signal is recorded only in the vertical blanking interval of the TV signal of the program being recorded so as not to interfere with the normal TV picture. The particular lines of the vertical blanking interval on which the 1 MHz. signal is recorded are not critical, except that the 1 MHz. signal should not be recorded on lines already having data encoded thereon (e.g., the so-called source identification or SID signal recorded on line 20, field 1). Typically, the 1 MHz. signal is recorded on six lines in each field in the vertical blanking interval (e.g., lines 8–13 inclusive).

Data encode and automatic level setting circuitry 218 includes a 1 MHz. clock generator 270 which outputs a coded 1 MHz. clock signal on line 271 (see FIG. 2A-4), and a circuit 272 which converts the coded 1 MHz. clock signal to a sinusoidal signal that is output to VCR 108 on the VIDEO IN line 212 (FIG. 2A-5). As mentioned above, VCR 108 then combines the 1 MHz. sinusoidal signal with a TV signal during recording of the TV signal. Clock generator 270 includes frequency dividers 273, 274 which count down a 4 MHz. clock signal from PIC processor 200 on line 275 to 1 MHz. (line 271) (FIG. 2A-4). PIC processor 200 provides an ENCODE signal on line 276 (port $B_4$) (FIG. 2A-3) which is coupled to the reset input of both frequency dividers 273, 274, so that a 1 MHz. clock signal is provided by clock generator 270 only when an encode signal (low) is present on line 276. PIC processor 200 controls ENCODE line 276 so as to cause circuit 272 to encode the current time and date and the channel number on the 1 MHz. clock signal output on line 271 (FIG. 2A-4), and the encoded 1 MHz. clock signal on line 271 is converted by circuit 272 to an encoded sinusoidal signal (FIG. 2A-5).

Circuit 272 includes field effect transistor (FET) 277, transistor 278 and AC shaping components comprising inductors 279, 280, resistor 281 and capacitors 282, 283. The 1 MHz. clock signal on line 271 is supplied to FET 277 via a resistor when ENCODE line 276 is low to turn FET 277 on and off. When FET 277 is on, capacitor 283 is discharged into inductor 279, which develops a voltage across resistor 281 proportional to the decreasing charge of capacitor 283. When FET 277 is switched off, capacitors 282 and 283 charge via transistor 278, and a voltage is developed across resistor 281 which is proportional to the voltage across capacitor 282 as it is charged. Charging of capacitors 282 and 283 is controlled by the conduction level of transistor 278 as well as the value of resistor 284 connected between the drain of FET 277 and ground. Conduction of transistor 278 is in turn controlled by the values of resistors 285 and the voltage levels output by PIC processor 200 to resistors 285, which is automatically set by PIC processor 200 to insure that the encoded value is high enough to permit subsequent decoding. The increasing and decreasing voltage at the junction of capacitor 282 and inductor 280 produces a 1 MHz. sine wave (e.g., about 0.8 volt peak-to-peak) which is coupled to VIDEO IN line 212. The very high impedance of FET 277 and the value of resistor 284 approximate a 50 ohm termination for VIDEO IN line 212.

Data detector and amplifier 219 detects the 1 MHz. signal from a TV signal, previously recorded by VCR 108, being played back from VCR 108, and detects time, date and channel identity data encoded on the 1 MHz. signal. FIG. 2A, waveforms 6-8, depicts waveforms of signals in data detector and amplifier 219. Data detector and amplifier 219 includes a buffer amplifier 287, a 1 MHz. modulation detector circuit 288, an amplifier 289 and a data detector 290. Buffer amplifier 287 includes transistor 291 which is coupled to receive the TV signal from VCR 108 on VIDEO OUT line 213 and couple it to modulation detector circuit 288 while preventing any of the 1 MHz. signal detected by modulation detector circuit 288 from being fed back to the video signal on VIDEO OUT line 213. Resistor 292 is selected to provide a bias voltage (e.g., +2 volts) to the base of transistor 291 which will keep it forward biased at all times. Modulation detection circuit 288 is a tuned circuit resonating at about 1 MHz. comprising resistors, an inductor and capacitors including variable capacitor 293 which is used to fine tune the resonant frequency of circuit 288. Those components are selected to provide circuit 288 with narrow band characteristics and thereby provide a sinusoidal modulation-detected 1 MHz. signal on line 294. Amplifier 289 includes amplification transistors 295, 296, and gain control transistor 297. Voltage divider circuit 298 provides a bias voltage (e.g., +2 volts) that keeps transistor 295 forward biased at all times. The 1 MHz. modulation-detected signal is fed to the emitter of transistor 295 which causes the collector of transistor 295 to vary in sympathy with its emitter but with a higher voltage swing. Transistor 296 provides further amplification and provides an amplified modulation-detected 1 MHz. signal on line 299 (FIG. 2A-6). Gain control transistor 297 has its base coupled to PIC processor 200 via LVTST line 300 and its collector coupled to the emitter circuits of transistors 29 and 296. With a low on LVTST line 300 (port $B_5$ of PIC processor 200), transistor 297 is off and presents a high impedance to transistors 295 and 296. A high on LVTST line 300 turns on transistor 297 reducing the impedance to transistors 295 and 296 and consequently increasing the gain of transistors 295 and 296.

Data detector 290 includes rectifier diode 301 and comparators 303, 305. The 1 MHz. signal on line 299 (FIG. 2A-6) is rectified by diode 301 (FIG. 2A-7) to provide positive-going pulses representing the time, date and channel number which are coupled to line 302 (inverting input of comparator 303) via an integrating circuit 307 having a time constant of about 2.5 microseconds. Voltage divider circuit 255 provides a reference voltage (e.g., +0.61 volt) to the non-inverting input of comparator 303. When a rectified positive pulse appears at the noninverting input of comparator 303, the output 310 of comparator 303 is switched low. Output 310 of comparator 303 is coupled to the non-inverting input of comparator 305 via integrating circuit 312 having a time constant of about 4.5 microseconds. The inverting input of comparator 305 is provided with a reference voltage (e.g., +3 volts) from voltage divider circuit 255. When output 310 of comparator 303 is switched low, output 315 (FIG. 2A-8) (DECODE line to port A of PIC processor 200) is switched high (about +1.4 volts). Integrating circuits 307, 312 stretch pulses produced by comparators 303, 305 so that data pulses presented to PIC processor 200 on DECODE line 315 (FIG. 2A-8) are of about 80 microseconds duration.

PIC processor 200 receives and outputs the following:

| Inputs | Outputs |
|---|---|
| $A_0$: FIELD SYNC | $B_0$-$B_3$: encoded data level adjust |
| $A_1$: DECODE | $B_4$: ENCODE |
| $A_2$: RECORD | $B_5$: LVTST |
| $A_3$: reference voltage | $B_7$: DATA |
| $B_6$: ACKNOWLEDGE | |
| MCLR: Reset | |
| OSC 1; OSC 2: 4 MHz. Osc. | |

Ports $A_o$–$A_3$ and $B_o$–$B_7$ are input/output ports.

PIC processor 200 monitors the activity of VCR 108 via: field sync pulses supplied to port $A_o$ on FIELD SYNC line 202a by field synchronization detector 217 (from vertical synchronization pulses received from VCR 108 on VIDEO OUT line 213); decoded data supplied to port $A_1$ on DECODE line 315 by data detector and amplifier 219 (from the 1 MHz. signal encoded on the TV signal recorded by VCR 108 and extracted from the TV signal output by VCR 108 to VIDEO OUT line 213); and a record signal supplied to port $A_2$ on RECORD line 246 by erase signal detector 216 (from the record bias signal sensed by erase pickup 240 from VCR 108). Data to be encoded on tape being recorded by VCR 108 is output by MDU 122 on serial ACKNOWLEDGE line 203a to port $B_6$ of PIC processor 200 after PIC processor 200 has informed MDU 122 on serial DATA line 203a (port $B_7$), that VCR 108 is in the record mode. The time, date, and channel number data input to PIC processor 200 by MDU 122 comprises twenty 4-bit words which are output by PIC processor 200 on port $B_4$ (ENCODE line 275) to clock generator 270 after detection of the first field synchronization pulse, with PIC processor 200 adjusting the level of the encoded data via ports $B_o$–$B_3$ to data encoding and automatic level setting circuitry 218.

Current VCRs have a TV/VCR ("bypass") switch 320 (see FIG. 1) which allows the VCR tuner to be bypassed when the VCR is on so that the program being displayed by TV 106 is tuned by TV 106. With the TV/VCR 320 switch switched to bypass the VCR tuner, the VCR may record one program tuned by the VCR tuner while another program tuned by TV 106 is viewed on TV 106. The TV/VCR switch 320 is monitored via TV/VCR line 321 to determine when the TV is bypassing (not using) the VCR. TV/VCR line 321 is connected (by a clip-on type connector or hard-wired) to a relay or switch logic associated with the TV/VCR switch 320 so as to provide an appropriate logic level on TV/VCR line 321 when the TV bypasses the VCR. Coupled to DATA line 204a is a voltage divider circuit comprised of +5 volts, resistor 322, resistor 323, and a comparator 324. When the output of comparator 324 is high, DATA line 204a is pulled up to +5 V by resistor 322. When output 325 of comparator 324 is low, a voltage division of the +5 V occurs on DATA line 204a pulling it down to less than about 4.7 volts. TV/VCR line 321 is coupled in VCR probe/detector 126 to the inverting input of comparator 324 via resistive divider 328. A reference voltage (e.g., +3 volts) is supplied to the non-inverting input of comparator 324 by resistive divider 255. When the signal on TV/VCR line 321 is low (VCR tuner not bypassed), output 325 of comparator 324 is switched high so that the voltage on DATA line 204a is pulled up to +5 volts by resistor 322.

However, when the signal on TV/VCR line 321 is high (TV bypassing VCR), output 325 of comparator 324 is switched low and DATA line 204a is pulled down to less than about 4.7 volts by the voltage division ratio of resistors 322 and 323. MDU 122 is conditioned to detect the lower voltage on DATA line 204a and attribute the lower voltage to bypassing of the VCR 108. This information is needed to determine the TV video source whenever VCR 108 is not in the playback mode (absence of a record signal on RECORD line 246 to port $A_2$ of PIC processor 200).

VCR probe/detector 126 also includes a reset circuit 320 which holds the MCLR input 322 to PIC processor 200 low for approximately 20 milliseconds upon power-up to automatically reset PIC processor 200 at each power-up. The frequency of an internal clock in PIC processor 200 is set by a circuit 322, which includes crystal 324 coupled to the OSC 1 and OSC 2 inputs of PIC processor 200.

PIC processor 200 may be externally reset by MDU 122 via a circuit 332 and ACKNOWLEDGE line 203a. Circuit 332 includes comparator 334 having its non-inverting input coupled to the ACKNOWLEDGE line 203a via resistor 336. Also coupled to the non-inverting input is capacitor 338. The inverting input of comparator 334 receives a reference voltage (e.g., +3 volts) from voltage divider 255. The output 340 of comparator 334 is coupled to reset MCLR input of PIC processor 200. When the ACKNOWLEDGE line 203a is momentarily pulled low by MDU 122, capacitor 338 discharges causing output 340 to be switched low, which in turn is coupled to the reset input MCLR of PIC processor 200 to reset PIC processor 200.

Figures 2, 2A, 3:
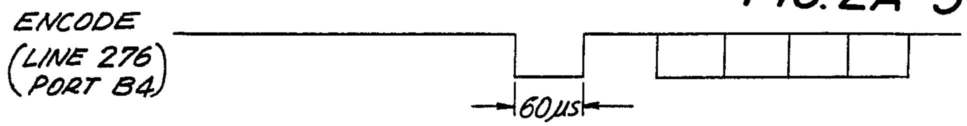
FIG. 3 is a schematic circuit diagram of one embodiment of the TV probe/detector of the system depicted in FIG. 1.

TV Probe/Detector 128 (FIG. 3)

As described above, TV probe/detector 128 outputs to MDU 122 signals representative of the frequency to which the VHF tuner in TV 106 is tuned and of the frequency to which the UHF tuner in TV 106 is tuned, a signal indicating whether the TV is on or off, and a signal uniquely identifying TV probe/detector 128.

FIG. 3 depicts an embodiment of TV probe/detector 128 which includes a direct connect probe 350 that provides a single output signal (on DIGITAL 1 line 205c) representative of the frequency to which either the VHF or UHF tuner is tuned. TV probe/detector 128 includes: identification circuit 352 which outputs the signal to MDU 122 on ANALOG 2 line 203c that uniquely identifies TV probe/detector 128 a the source of signals output to MDU 122 by TV probe/detector 128; horizontal sweep detector 354 which outputs the signal to MDU 122 on ANALOG 1 line 204c that indicates whether TV 106 is on or off; and DC to DC converter 356 which converts +5 volts DC to +3 volts DC for use within TV probe/detector 128. A six-conductor cable 210d couples TV probe/detector 126 with MDU 122 (via TV video switch 119 and VCR video switch 118, see FIG. 1 and Table I).

TV probe/detector 128 is positioned entirely within TV 106 with only the six-conductor cable 210d extending therefrom to MDU 122. Since direct connect probe 350 is directly electrically and mechanically connected to TV 106, direct connect probe 350 includes an isolating phototransistor 360 which is disposed within TV 106 to isolate voltages and RF frequencies in TV 106 from monitoring system 102.

Direct connect probe 350 includes a plug-in type connector 362, which in use is attached to the TV prescaler circuit, and frequency division circuitry 364 for counting down the frequency signal obtained by connector 352 from the TV prescaler circuit. The signal obtained from the TV prescaler circuit is a digitized signal which is a division of the RF signals, specifically the LO signals, in the TV tuner. NAND gates 366, 368 which are powered by +3.2 volts from converter 356, function as a free-running oscillator which locks on to the preselected signal from TV 106 providing a TTL signal to 14-stage binary divider 370. Resistor 372 and capacitor 373 set the free-running oscillator frequency. Divider 370 is connected as a divide by $2^{14}$ and provides, including the pre-scaling function of the TV prescaler, a signal divided down by $2^{20}$, $2^{21}$, or $2^{22}$ depending on the particular prescaler in the TV. The output signal from divider 370, which has a maximum frequency of about 888 Hz. for TV tuner LO frequencies used in the UHF band and a maximum frequency of 245 Hz. for TV tuner LO frequencies in the VHF band, is applied to phototransistor 360. When the output of divider 370 is positive, phototransistor 360 conducts providing the DIGITAL 1 line 205c with a negative-going digitized signal.

Horizontal sweep detector 354 includes a tuned circuit 374 having a coil 375 and capacitor 376 which sense the electromagnetic field created by a horizontal sweep circuit in TV 106. Although TV probe/detector 128 is placed entirely within TV 106, coil 375 may be connected to tuned circuit 374 by a two-conductor cable 377 so that the coil may be placed nearer the TV horizontal sweep circuit if necessary. The frequency of the electromagnetic field signal radiated by the horizontal sweep circuit in TV 106 is 15.7 KHz., which is the resonant frequency of tuned circuit 374. Resistors 378 and 379, coupled to +5 volts, form a voltage divider circuit which provides a bias voltage (e.g., 1.4 volts) to tuned circuit 374. Tuned circuit 374 is coupled to the non-inverting input of operational amplifier 380, the output of which is coupled to its inverting input by a feed back circuit 384 which peaks the gain of operational amplifier 380 to 15.7 MHz. The amplified 15.7 KHz. signal at the output of operational amplifier 380 is rectified by diode 386 and provided as an analog signal to MDU 122 via the ANALOG 1 line 204*c*.

Identification circuit 352 comprises a voltage divider circuit including resistors 388 and 389 coupled to +5 volts. Resistors 388 and 389 are selected to provide a voltage of about 2.75 volts to the ANALOG 2 line 203*c*. MDU 122 decodes that voltage level from a probe/detector to identify the probe/detector as TV probe/detector 128.

While TV probe/detector 128 as described above includes a direct connect probe, it may alternatively have close connect or loop connect probes for detecting the tuner frequency.

Figures 2, 2A, 3, 4:
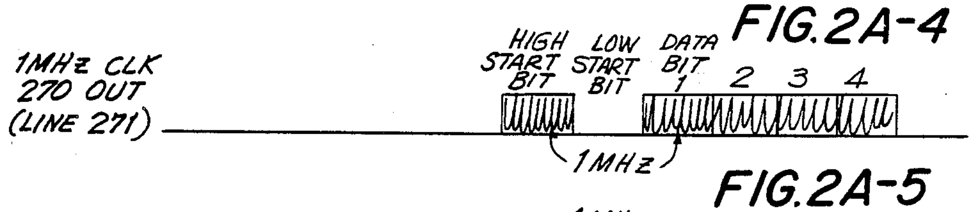
FIG. 4 is a schematic circuit diagram of one embodiment of the cable probe/detector of the system depicted in FIG. 1.

Cable Converter Probe/Detectors 124, 125 (FIG. 4)

Cable probe/detectors 124 and 125 are essentially the same. Therefore, only cable probe/detector 124 is described with the understanding that that description applies to cable probe/detector 125.

As described above, one of the signals output by cable converter probe/detector 124 to MDU 122 is a signal which is representative of the frequency to which the tuner in cable converter 114 is tuned. The embodiment of cable converter probe/detector 124 depicted in FIG. 4 includes a loop connect probe 470 for detecting LO frequencies in the cable converter tuner in the frequency range of 300 MHz. to 1.26 GHz. and provides a digitized output signal (on DIGITAL 1 line 205*e*) representative of the frequency to which the cable converter tuner is tuned. Cable converter probe/detector 124 also includes identification circuit 402, which outputs a unique identification signal to MDU 122 (on ANALOG 2 line 203*e*) for identifying cable converter probe/detector 124 as the source of signals output to MDU 122 by cable converter probe/detector 124. Cable probe/detector 124 further includes cable trunk detector circuit 408 which couples a signal to MDU 122 (on ANALOG 1 line 204*e*) that indicates the switch position of an electronic cable converter trunk switch. A six-conductor cable 210*f* couples cable converter probe/detector 124 with MDU 122 (via an external cable trunk switch 116, if one is used).

Loop connect probe 400 includes a loop connect connector 412 to which is connected a loop probe (not shown) similar to probes 221,222, which is positioned inside the tuner in cable converter 114 to sense the frequency to which the LO of the converter tuner is tuned. The loop probe (not shown of cable probe/detector 124 is an RF probe suitable for receiving signals in the frequency range of 300 MHz. to 1.26 GHz. Loop connect probe 400 includes amplifier/divider 420 similar to amplifier/divider 235 in VCR probe/detector 126 but which provides amplification in the 100 MHz. to 1.3 GHz. frequency range. The prescaler in amplifier/divider 420 divides the frequency of the input signal thereto by 256. The output of amplifier/divider 420 is coupled to a 14-stage binary divider 422, similar to divider 236 in VCR probe/detector 126, which divides the signal from amplifier/detector 420 by $2^{14}$. The output from binary divider 422, which is in the frequency range of about 24 Hz. to 300 Hz., is coupled to the DIGITAL 1 line 205*e* via noise suppressor 424. The prescaler in amplifier/divider 420 and binary divider 422 are provided so that MDU 122 does not have to operate at radio frequencies. Further noise suppressors 424 are provided in the power feed line to divider 422.

Identification circuit 402 comprises a voltage divider circuit including resistors 430 and 432 coupled to +5 volts. Resistors 430 and 432 are selected to provide a unique voltage of about 1.5 V to the ANALOG 2 line 203*e*. MDU 122 will decode that unique voltage from converter probe/detector 126 as identifying converter probe/detector 126.

Cable trunk detector 408 includes plug connector 436 which is received in a mating connector of an electronic converter switch 117 used with cable converter 115 and cable probe/detector 125 (not used with cable probe/detector 116). When one cable trunk (A or B) of the electronic trunk switch is selected, a control signal is applied to connector 436, and when the opposite cable trunk is selected, ground is applied to connector 436. Those logic levels are passed to the ANALOG 1 line 204*e* by a logic circuit comprised of resistor 438, diode 440 coupled to +5 volts, and capacitor 442. Referring to FIG. 1, when the cable converter includes an electronic trunk switch 117 (e.g., converter 115), cable 210*f* is connected directly to MDU 122. If the cable converter for a two-trunk system does not include an electronic trunk switch 117, cable 210*f* is connected to external A/B trunk switch 116.

While converter probe/detector 124 as described above includes a loop connect probe, it may alternatively have a direct connect probe, similar to direct connect probe 350 of TV probe/detector 128, or a close connect probe for detecting the cable tuner frequency.

Figures 2, 2A, 3, 4, 5:
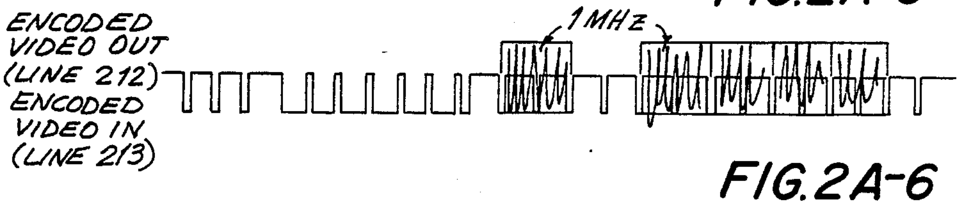
FIG. 5 is a schematic circuit diagram of one embodiment of the VCR video switch of the system depicted in FIG. 1.

TV Video Switch 119 (FIG. 5)

Referring to FIG. 1, TV video switch 119 is a three position RF switch coupled to receive inputs from cable converter 115, VCR 108, and auxiliary input 148 and pass one of those inputs to TV 106 in accordance with the switch position selected. TV video switch 119 is to a degree coupled in parallel with VCR video switch 118 and TV probe/detector 124, all of which are connected to MDU 122 via six-conductor cables 210*d*, 210*h*, and 210*i*. The six-conductor cables 210*d*, 210*h*, and 210*i* may be thought of as a bus which is looped through TV video switch 119 and VCR video switch 118 (see Table I further below).

Referring to FIG. 5, TV video switch 119 includes input connectors A, B and C referenced by 500–502, respectively, which are respectively coupled to cable converter 115, VCR 108, and left open or coupled to an auxiliary device such as a video game. The output connector 504 of TV video switch 119 is coupled to the VHF input of TV 106. TV video switch 119 includes an RF switch circuit 506 and a detection circuit 508 which detects the switch position of switch circuit 506 and provides that and other information to MDU 122. RF switch circuit 506 includes three switches 510–512, each comprised of four stages 510*a*–510*d*, 511*a*–511*d*, 512*a*–512*d*, respectively. First stages 510*a*, 511*a*, and 512*a* couple the respective A, B, C input 500, 510, 502 to either a respective resistive termination circuit comprised of respective resistor 514, 515, 516 (e.g., 75 ohms) coupled to RF ground, or to the respective second stage 510*b*, 511*b*, 512*b*. In the configuration of VCR switch 116 depicted in FIG. 5, the A input 500 is coupled to second switch stage 510*b* while the B and C inputs 501 and 502, respectively, are coupled to resistors 515 and 516, respectively. The second switch stage couples the first switch stage to or isolates the first switch stage from the third switch stage. In the switch configuration depicted in FIG. 5, second switch stage 510*b* couples first switch stage 510*a* to third switch stage 510*c*, and in switches 511 and 512 the first switch stage is isolated from the third switch stage. The third switch stages of switches 510, 511 and 512 cooperate to couple only one switch input to switch output 504. In the configuration depicted in FIG. 5, the third switch stage of switches 510, 511 and 512 couple the A input 500 to switch output 504.

The fourth switch stages 510*d*, 511*d*, 512*d* of the respective switches are coupled to detection circuit 508 which includes analog gates 520–523, comparator 525, inverter 527, resistive divider circuit 529 and associated components. Each fourth switch stage 510*d*, 511*d* and 512*d* is coupled to the control input 531, 532 and 533 of a respective analog gate 520, 521 and 522, and via a respective resistor 535, 536 and 537 to the output 538 of comparator 525. When enabled, analog gates 520–523 couple through a low impedance, the analog inputs 540, 542, and 544 and the analog outputs 541, 543, and 545 of the respective gate. When disabled, analog gates 520–523 provide a high impedance between their respective analog input and output. A different and unique voltage point of resistive divider circuit 52 is coupled to a respective analog input 540, 542 and 544 of analog gates 520–522, and the analog outputs 541, 543 and 545 of analog gates 520–522 are coupled together to form node 547 at the analog output of analog gate 523. Each of the unique voltage points of resistive divider 529 represents a specific configuration of TV video switch 119. Depending on the state of output 538 of comparator 525, and the configuration of switch 506, only one of the analog gate control inputs 531–533 will be high so as to enable only the corresponding analog gate.

In the configuration of switch 506 depicted in FIG. 5, with comparator output 538 high, only analog gate control input 533 is high which causes only analog gate 522 to be enabled and the unique voltage at analog input 540 of gate 522 to be coupled to node 547.

The state of analog gate 523, which is controlled by comparator 525 and inverter 527, determines whether conductor 204*d* (carrying TV on-off information) is connected to node 547, and from there to conductor 204*h* (ANALOG 2) of cable 210*h* for transmission to MDU 122. When the output of inverter 527 goes low, this indicates to the MDU via diode 560 the presence of either a VCR or TV A/B/C switch. Depending on the state of gate 523, either the switch position voltage at node 547 or the TV on-off voltage on line 204*d* will be coupled to conductor 204*h*, and, as described below, that voltage will identify to MDU 122 whether TV 106 is on or off, or the switch position of TV video switch 119.

The state of analog gate 523 is controlled by the voltage level on conductor 204*h,gg* (ANALOG 1) from MDU 122 and the connection of jumpers 551, 552, and 553. When MDU 122 outputs a given voltage to conductor 203*h*, that causes comparator 525 to switch, which enables analog gate 523. Jumpers 551, 552, and 553 are selectively positioned to cause switch 119 to be configured as TV video switch 119, or alternatively, as a VCR video switch 118. Jumpers 551–553 are connected in FIG. 5 to configure switch 119 as a TV video switch. Jumper 551 as connected in FIG. 5 connects the noninverting input of comparator 525 to ID line 203*h,g* (ANALOG 2), and jumper 552, as connected in FIG. 5, connects the inverting input of comparator 525 to jumper 553. Jumper 553 selects one of two voltage points in resistive divider 557 depending on whether the switch is a TV or VCR video switch, a higher voltage being selected by jumper 553 in FIG. 5.

In the jumper configuration of FIG. 5, a high voltage on conductor 203*h,g* (ANALOG 2) from MDU 122 disables analog switch 523 and allows the voltage on node 547 indicative of the switch position of TV video switch 119 to be passed to MDU 122 via conductor 204*gg,h* (ANALOG 1). A low voltage on conductor 203*h,g* (ANALOG 2) from MDU 122 (which is the default state of ANALOG 2 line) enables analog switch 523 and passes the TV on-off signal on conductor 204*d,g* to conductor 204*gg,h* for transmission to MDU 122 on ANALOG 1 line.

TV video switch 119 depicted in FIG. 5 includes three RF switches 500–501 and a detection circuit 508 for indicating to MDU 122 which of the three inputs of TV video switch 119 is connected to the output thereof. Switches similar to TV video switch 119 may be constructed having more or fewer than three inputs. For example, a video switch with only two inputs is described below, and a video switch with up to eight inputs may be constructed by providing an RF switch circuit having eight RF switches, and a detection circuit having eight analog gates and a resistive divider having eight different voltage points connected in a manner similar to that depicted in FIG. 5 for RF switch circuit 506 and detection circuit 508.

VCR Video Switch 118 (FIG. 5)

A VCR video switch 118 is constructed as depicted in FIG. 5 except that jumpers 551–553 are connected to the respective jumper terminals designated by "VCR" instead of to the respective jumper terminals designated by "TV" Operation of such a VCR video switch 118 is as described above for TV video switch 119, with the understanding that jumpers 551–553 allowing the inputs to comparator 525 and thereby change operation of both the TV and VCR A/B/C switches on the same "bus". VCR video switch 118 is connected to TV video switch 119. Therefore, when the switch depicted in FIG. 5 is configured as a VCR video switch 118, conductor 204*h* (replaces conductor 204*d* in FIG. 5) coming from TV video switch 119 carries either A/B/C switch position information for switch 119 or TV on-off information.

Cable Converter Trunk Switch 116 (FIG. 5)

Referring to FIG. 1, cable trunk switch 116 is a two position RF switch coupled to receive inputs from cable trunks A and B (or other input) and pass one of those inputs to cable converter 114 in accordance with the switch position selected. Cable trunk switch 116 is to a degree coupled in parallel with cable converter probe/detector 124 to MDU 122 via six-conductor cables 210*f*, 210*j* (see Table I).

Referring to FIG. 5, cable trunk switch 116 may be constructed from the same basic switch as TV switch 119, except that cable trunk switch 116 need only be a two position switch instead of a three position switch and includes jumpers 560 and 561 (represented by broken lines in FIG. 5) connected as described below to convert the switch position detection circuit 508 of VCR video switch 118 from a three position switch detector to a two position switch detector. Additionally, it may be desirable to prevent the switch depicted in FIG. 5 from being switched to the C input. Jumper 560 is connected between the control input 531 and the output 541 of analog gate 520 (unstuffed) to connect switch logic voltage to node 547. Jumper 561 connects +5 volts to the output 538 of comparator 525 (unstuffed) and switch logic. Thus, at default, conductor **204*j* (replaces 204*h* in FIG. 5) to MDU 122 carries switch position information from cable trunk switch 116. DIGITAL 2 line is coupled to gate 523 by diode 560.**

Cable and Probe/Detector - MDU Connections

Table I below describes the signal/information relationship of the conductors of cables **210*a*, 210*b*, . . . , and the manner in which information relating to cable probe/detector 124, cable trunk switch 116, VCR video switch 118 and TV video switch 119 transmit information to MDU via common conductors. Lines 203 and 204 may be used as analog or digital lines. Lines CH1 and CH2 in MDU 122 (FIG. 6B), coupled to lines 203 and 204 via multiplexers, may be sampled as digital lines, at the inputs to analog to digital converter 634, or as analog lines at the output of analog to digital converter 634**.

TABLE I

| LINE NO. | LINE DESC. | DEVICE: PROBE TV | PROBE CONV. | PROBE VCR | SWITCH CABLE | SWITCH VCR VID. | SWITCH TV VID. |
|---|---|---|---|---|---|---|---|
| 201 | +5 v | +5 v | +5 v | +5 v | +5 v | +5 v | +5 v |
| 202 | DIG 2 | N/C | N/C | F'ld | N/C | N/C | N/C |
| 203 | ANALOG 2 | ID | ID | — | N/C | Low Out(MDU) | High Out(MDU) |
| 203 | DIG | — | — | ID/ACK Out(MDU) | — | — | — |
| 204 | ANALOG 1 | OFF ON | A/B-Cable | — | A/B-Cable | A/B-Cable A/B/C-VCR | A/B-Cable A/B/C-TV |
| 204 | DIG | — | — | DATA | — | — | — |
| 205 | DIG 1 | LO | LO | LO | N/C | N/C | N/C |
| 206 | GND. | GND. | GND. | GND. | GND. | GND. | GND. |

Figures 1, 6A:
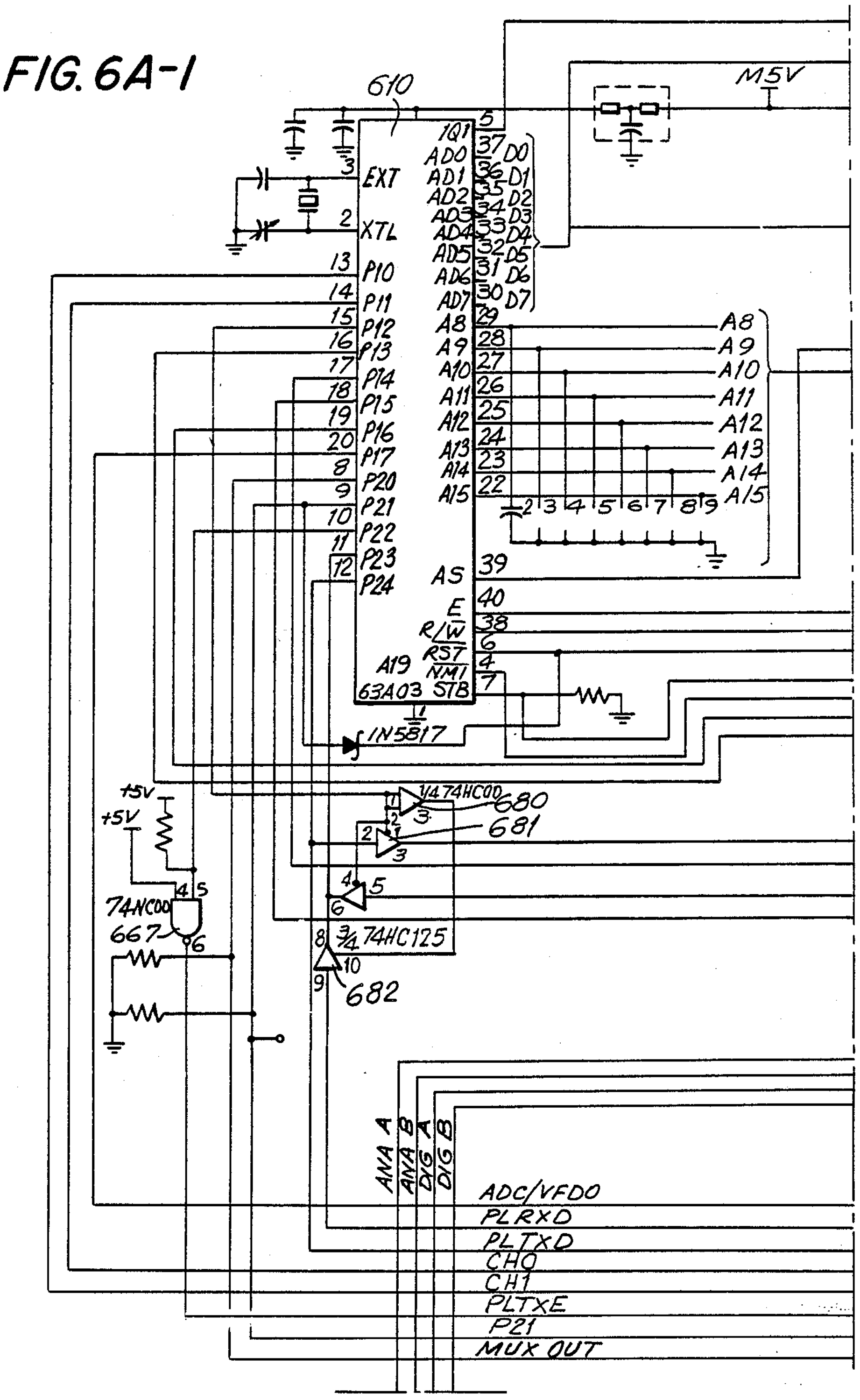
Figures 2, 6A:
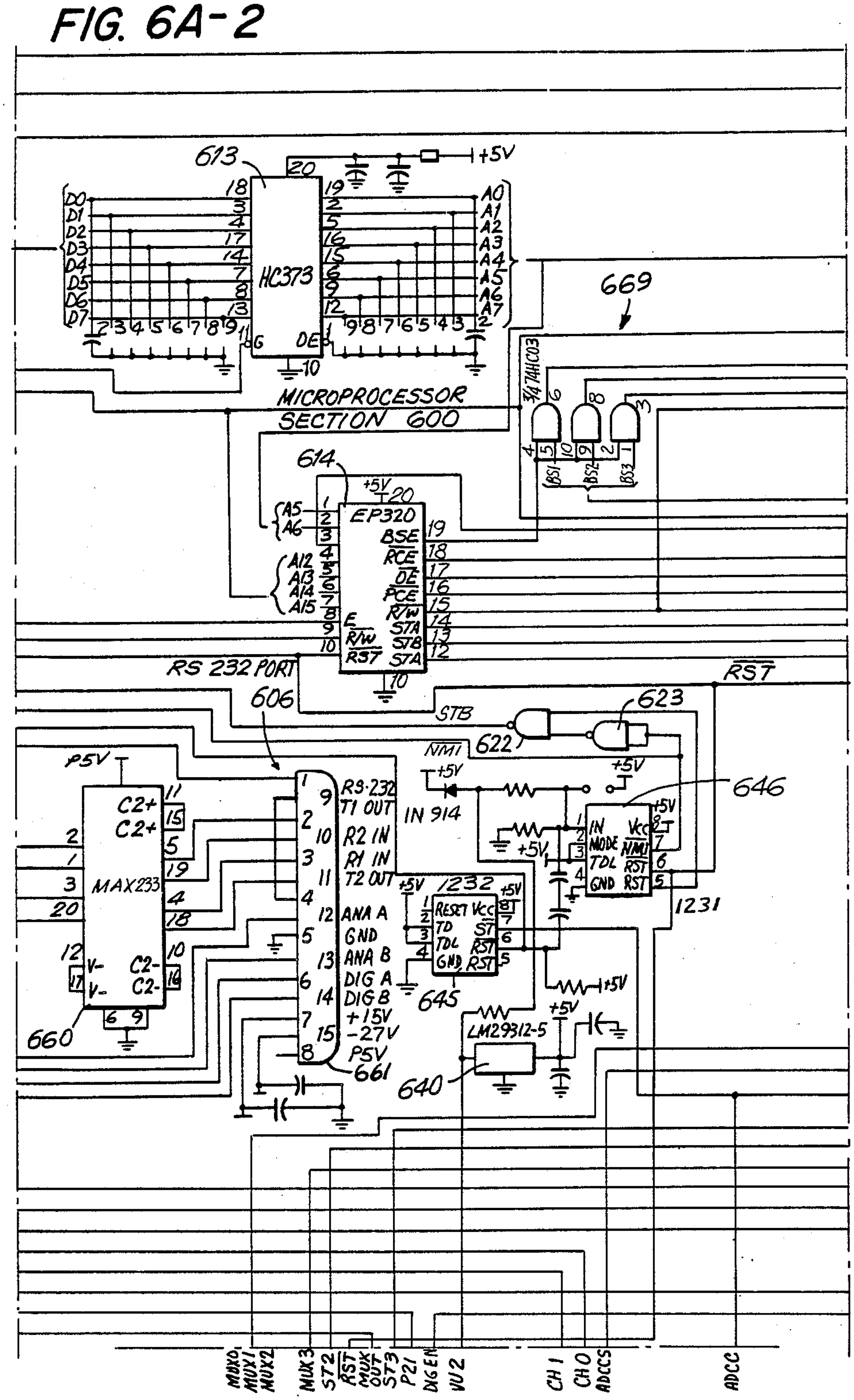
Figures 3, 6A:
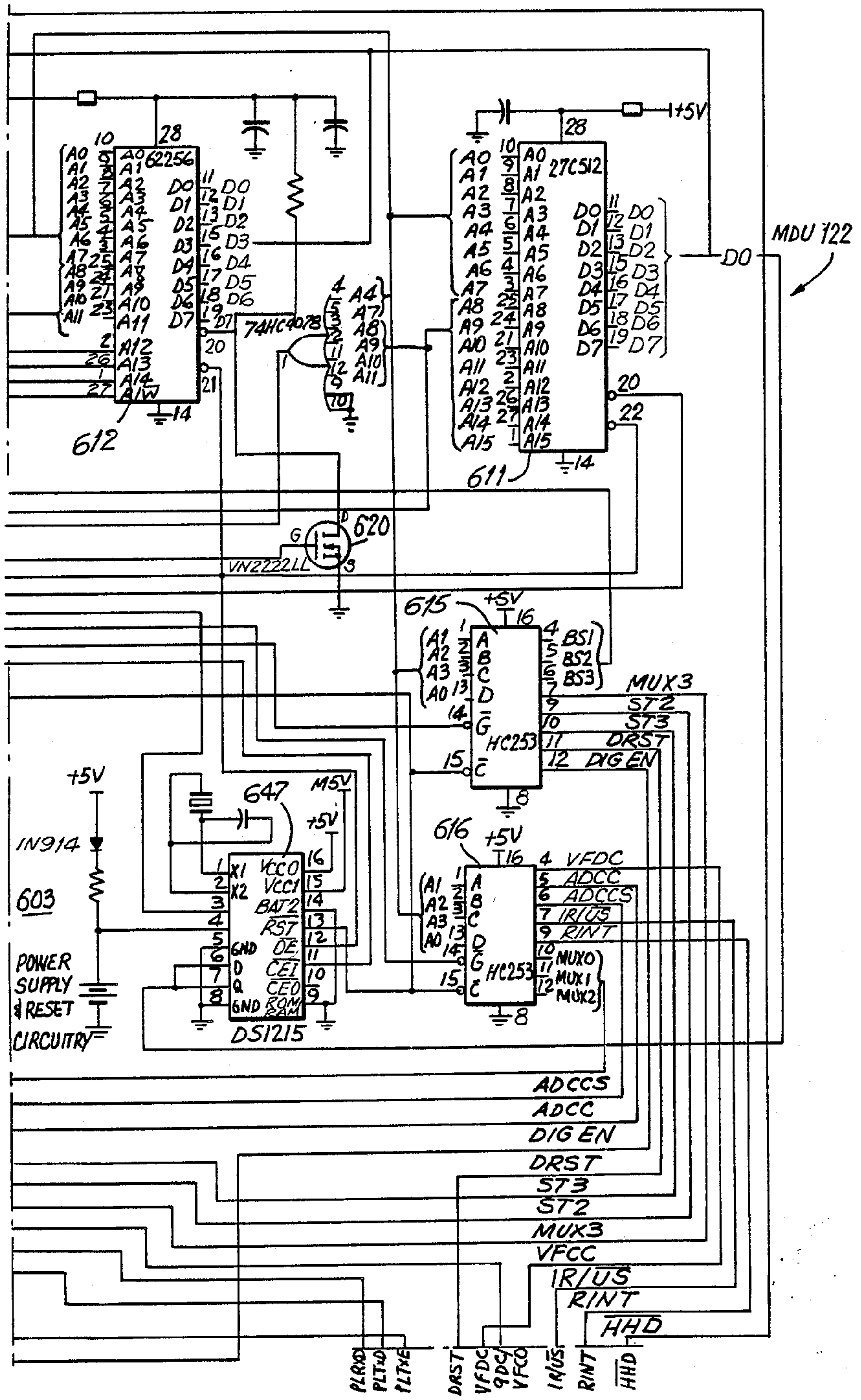

Microprocessor section 600 (FIG. 6*a*) includes 8-bit microprocessor 610, erasable programmable read only memory (EPROM) 611, random access memory (RAM) 612, 8-bit latch 613, erasable programmable logic device (EPLD) 614, 8-bit addressable latches 615, 616 and related components, logic circuits, and pullup circuits.

Probe/detector interface 601 (FIG. 6*b*) includes connectors 620–625, analog multiplexers 626–629, latches 630, 631 (may be formed by flip-flops), switch 632, resistive divider circuit 633 and analog to digital converter ("ADC") 634 and related components and circuits such as filters and pullup circuits.

AC to DC converter and power supply 602 (FIG. 6*b*) includes AC filtering and protection circuitry 635, transformer 636, rectifiers 637, 638, +5 volt DC regulators 639, 640 (FIG. 6*a*), +15 volt DC regulator 641 (FIG. 6*b*) and a −27 volts AC supply 642 for display and driver circuitry 604.

Reset and power backup circuitry 603 (FIG. 6*a*) includes watch dog circuit 645, powershift detector 646, timekeeper/memory controller circuit 647 and related components and circuits.

Display and drive circuitry 604 (FIG. 6*b*) includes vacuum fluorescent display 650, display driver 651, resistive array 652, transistor 653 and related components and circuitry.

Power line transceiver 605 (FIG. 6*b*) includes integrated circuit modem device 655, transformer 656 and related protection, filtering and coupling components and circuitry.

RS 232 port 606 (FIG. 6*a*) includes RS 232 driver circuit 60, connector 661 and related components and circuitry.

Infrared and ultrasonic receiver 607 (FIG. 6*b*) includes an infrared detector 665, an ultrasonic sound transducer 666, amplification and detection circuitry 67, and clocking circuitry 668.

The following circuits are preferably integrated circuits which are available, for example, as indicated below:

Microprocessor 610: Hitachi HD 6303;

EPLD 614: ALTERA EP230;

Watchdog circuit 645: Dallas Semiconductor DS 1232;

Powershift detector 646: Dallas Semiconductor DS 1231;

Timekeeper/memory controller 647: Dallas Semiconductor DS 1215;

Integrated circuit modem device 655: National Semiconductor LM1893;

RS 232 Driver 660: Maxim Max 230.

Monitor and Display Unit (MDU) 122

As mentioned above, MDU 122 (see FIG. 1) receives and stores (with battery backup): data relating to TV, VCR and cable converter channel tuning and VCR and cable converter video switch positions from probe/detectors 124, 125, 126 and 128; VCR mode information from VCR probe/detector 126; and equipment setup and viewing audience information from handset 134. MDU 122 also controls data transfer between probe/detectors 124, 125, 126, 128 and MDU 122, and transmits data to and receives data from CDSU 120 when polled by CDSU 120 via the domestic AC power lines in the household.

Figures 2, 2A, 3, 4, 5, 6:
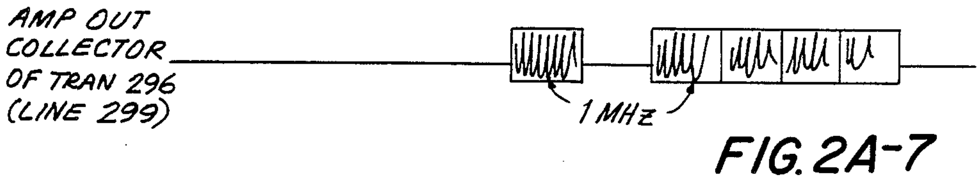
FIG. 6 which consists of FIGS. 6A and 6B, which in turn consist of FIGS. 6A1–6A3 and 6B1–6B4, respectively, is a schematic circuit diagram of one embodiment of the monitor display unit (MDU) of the system depicted in FIG. 1.
Figures 1, 6B:
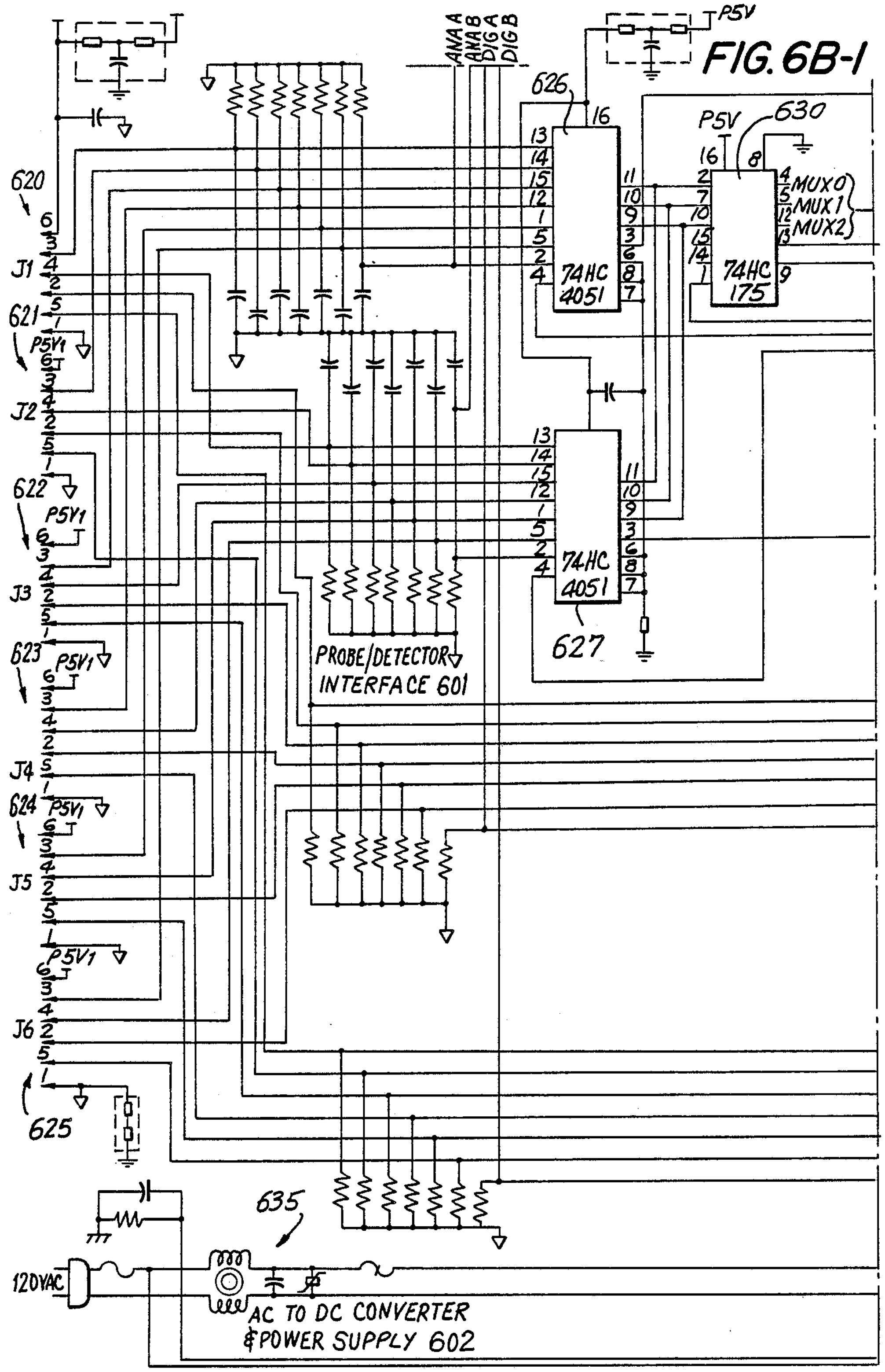
Figures 2, 6B:
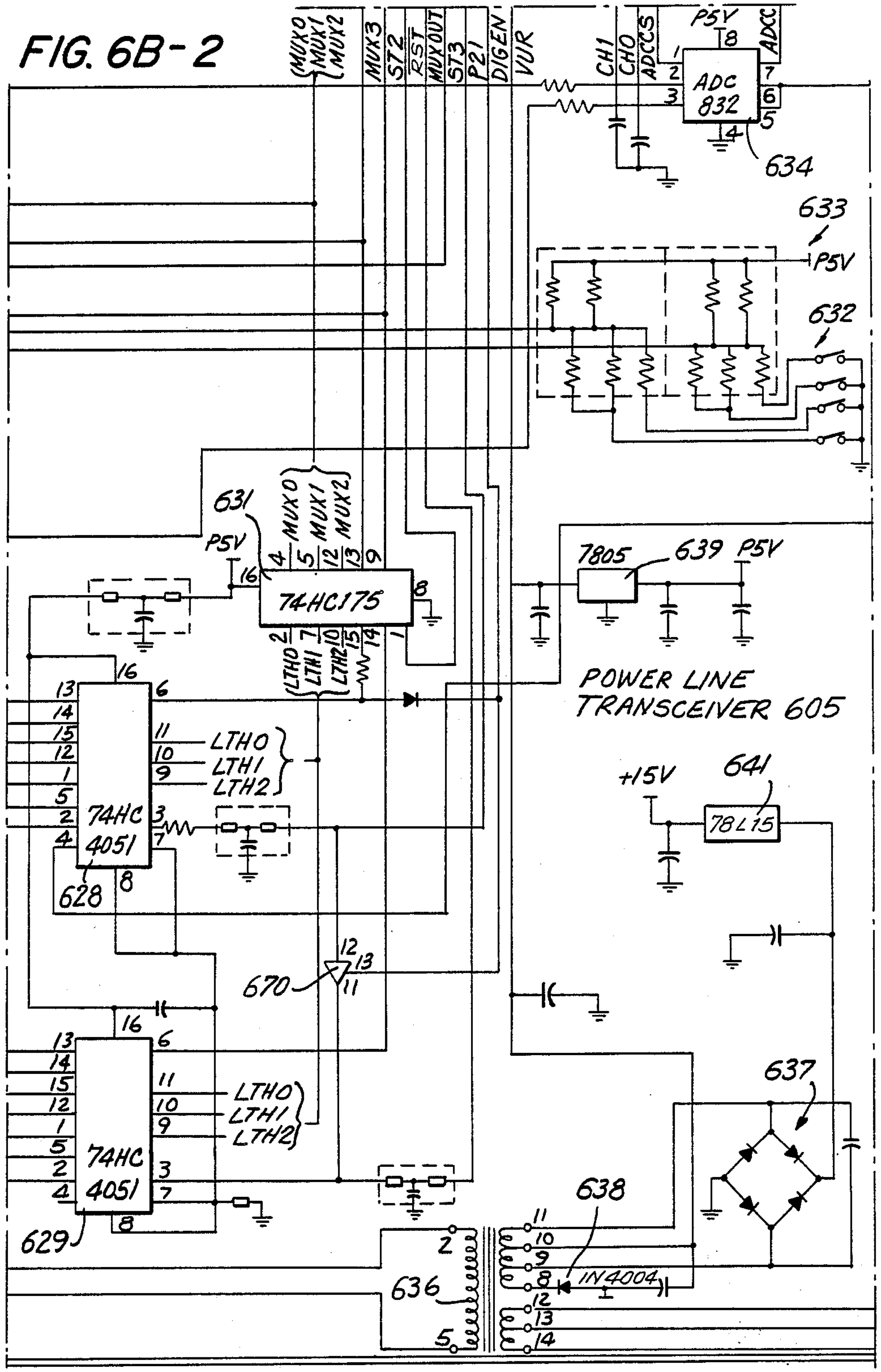
Figures 3, 6B:
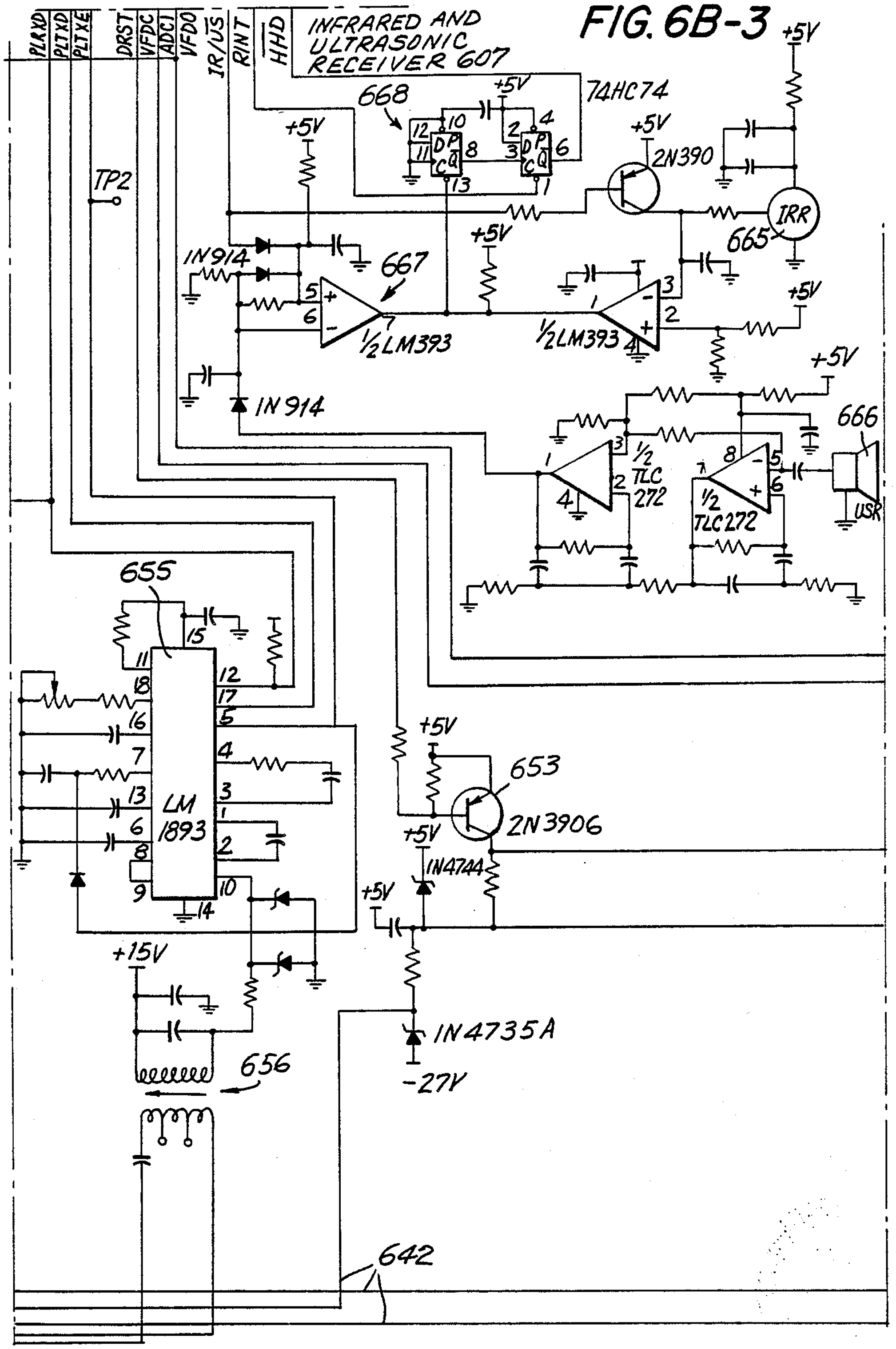
Figures 4, 6B:
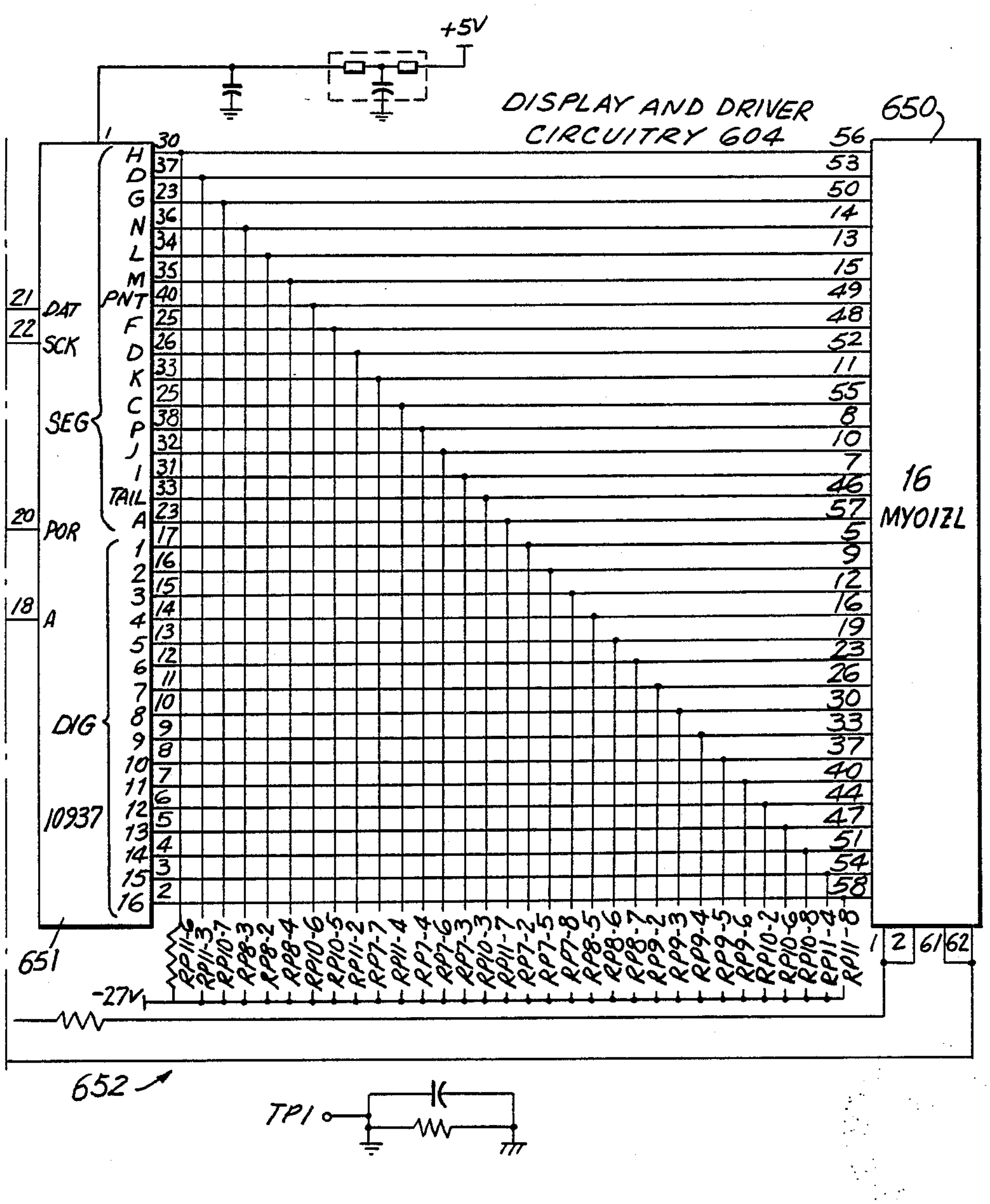
Figure 7:
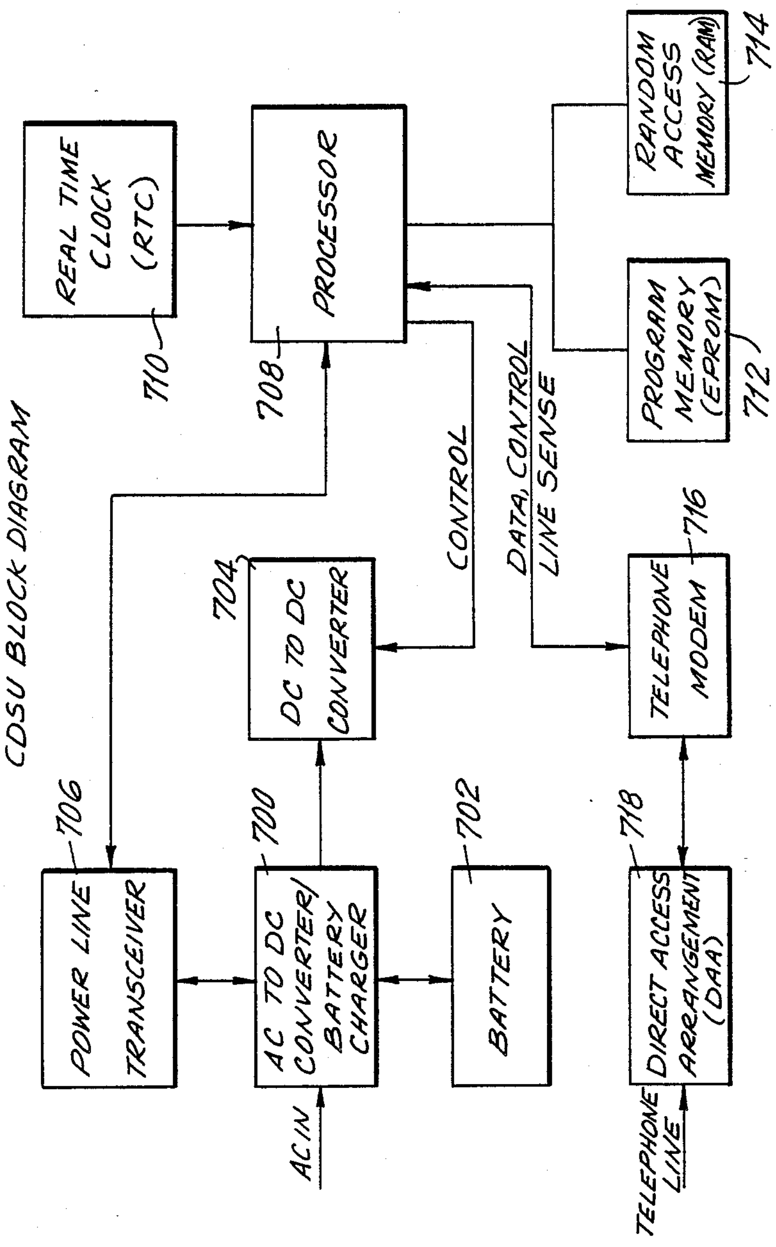
Figure 8:
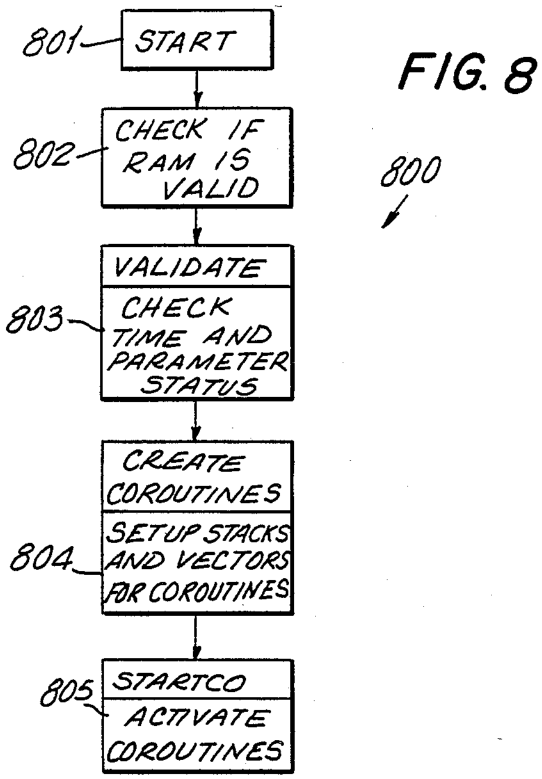

Referring to FIG. 6 (FIGS. 6*a* and 6*b*), MDU 122 includes the following functional circuit blocks: microprocessor section 600 (FIG. 6*a*), probe/detector interface section 601 (FIG. 6*b*), AC to DC converter and power supply 602 (FIG. 6*b*), reset and power backup circuitry 603 (FIG. 6*a*), display and driver circuitry 604 (FIG. 6*b*), power line transceiver 605 (FIG. 6*b*), RS 232 port 606 (FIG. 6*a*) and infrared and ultrasonic receiver 607 (FIG. 6*b*).

Microprocessor 610 of microprocessor section 600 (FIG. *6a*) includes eight bi-directional ports (AD0–AD7), eight address ports (A8–A15), programmable input/output ports P10–P17 and P20–P24, and control ports IQI, AS, E, R/W., RST., NIMI. and STB. (The symbol indicates the inverse of the identified signal.) Microprocessor 610 receives and/or outputs the following signals on its control and "P" input/output ports:

1Q1*(HHD*): receives PPM data from clocking circuit 668 of infrared and ultrasonic receivers 607, low levels of such data acting as interrupt requests;

AS: outputs an address strobe to latch 613;

E: outputs the system clock to EPLD 614, which in turn supplies it to PROM 611 and RAM 612;

R/W*: outputs a RAM read/write signal to RAM 612 via EPLD 614;

RST*: receives a reset signal from reset circuit 646 in reset and power backup circuitry 606;

NIMI*: receives a non-maskable interrupt from reset circuit 646 of reset and power backup circuitry 603 for powering down MDU 122;

STB*: receives the battery backup active signal from reset circuit 646 of reset and power backup circuitry 603 to place microprocessor 610 in a standby mode;

CHI (P10): receives a digital input on the channel 1 input of ADC 634 (from line 203)in probe/detector interface 601;

CHO (P11): receives a digital input on the channel 0 input of ADC 634 (from line 204) in probe/detector interface 601;

P12: outputs a control signal which selects data transfer with the T1, R1 ports of RS 232 driver 660 instead of with power line transceiver circuit 606;

P13: spare for RS 232 port 603;

P14: receives data from the R2 port of RS 232 driver 660;

P15: outputs data to the T2 port of RS 232 driver 660;

P16: receives a reset (RST.) signal from power monitor/watch dog circuit 645;

ADC/VFDO (P17): outputs display data to display driver of display and driver circuitry 604;

MUX OUT (P20): receives/outputs probe/detector data from/to analog multiplexers 628 and 629 in probe/detector interface 601

P21: a spare input/output port coupled to analog multiplexer 628 in probe/detector interface 601;

PLTxE (P22): outputs an enable signal to power line transceiver circuit 655;

PLRxD (P23): receives CDSU data from power line transceiver circuit 655;

PLTxD (P24): outputs data for CDSU 120 to power line transceiver circuit 655 and is coupled to the RST port via a zener diode.

Microprocessor 610 outputs 16-bit memory addresses to EPROM 611 and RAM 612. The lower order address bits A0–A7 are provided at the output of latch 613 from bi-directional ports AD0–AD7, while the higher order address bits A8–A15 are obtained directly from microprocessor 610. EPLD 320 receives 8-bit addresses from microprocessor 610 on its A inputs, the E signal and R/W. signals from microprocessor 610, and in response thereto, decodes the addresses signals and supplies the following signals for memory and system control: BSE, RCE*, OE*, PCE*, RW*, STA, STB and STC. BSE (in cooperation with gates 669 and signals output from addressable latch 615) provide three bits of address for RAM 612; R/W* is the memory read/write control signal; STA and STB are strobe signals for addressable latches 615 and 616, respectively; STC is a chip enable signal for timekeeper/memory controller 647. EPLD 320 supplies the E* input of EPROM 611 with the system clock signal OE*, and a chip select or output enable signal selecting either EPROM 611 or RAM 612 to the G* inputs of EPROM 611 and RAM 612. The E* input of RAM 612 is clocked from EPLD 614 via FET 670. FET 670 also acts to prevent a power drain from RAM 612 when it is not clocked. Both RAM 612 and microprocessor 610 are powered from a battery backup voltage M5V output by timekeeper/memory controller circuit 647 (output VCCO) in reset and power backup circuitry 603 (FIG. *6a*). Battery backup voltage M5V maintains the data in RAM 612 and the RAM in microprocessor 610 in the event of a power failure. Addressable latches 615, 616 output a control signal, supplied to the G. input by EPLD 614, on the respective output addressed by address bits A1–A3. Addressable latches 615, 616 thereby provide control signals set by microprocessor 610 to various circuits in MDU 122.

Analog multiplexers 626–629 in probe/detector interface 601 (FIG. *6b*) are coupled via connectors 620–625 to respective conductors 205*b,i,j*, 203*b,i,j*, 202*b,i,j*, and 204*b,i,j* of respective cables connected to respective probe/detectors. Analog multiplexer 626 is coupled to the ANALOG 2 conductor (203*b,i,j*) of each probe/detector cable, and analog multiplexer 627 is coupled to the ANALOG 1 conductor (204*b,i,j*) of each probe/detector cable. Analog multiplexer 628 is coupled to the DIGITAL 1 or DATA conductor (205*b,i,j*) of each probe/detector cable, and analog multiplexer 627 is coupled to the DIGITAL 2 conductor (202*b,i,j*) of each probe/detector cable. Addresses for analog multiplexers 626 and 627 are supplied by latch 630, and addresses for analog multiplexers 628 and 629 are supplied by latch 631 (lines LTH0-3) from MUX 0,1,2 signals output from addressable latch 616 (FIG. *6a*), and MUX 3 signal from addressable latch 6I5. ST2 and ST3 are strobe signals supplied by addressable latch 615 to flip-flop circuits 631 and 632, respectively. An output from analog multiplexer 626 and an output from analog multiplexer 627 respectively couple the ANALOG 2 and ANALOG 1 signals of the probe/detector selected by the MUX 0,1,2 address to the channel 0 and channel 1 analog inputs of ADC 634 or the digital signal on lines 203 and 204 from VCR probe/detector 126 directly to microprocessor ports P10 and P11. ADC 634 supplies the corresponding digital output corresponding to the analog input on line ADCC to addressable latch 616 (FIG. *6b*). An output from analog multiplexer 628 and an output from analog multiplexer 629 respectively couple the DIGITAL 1 and DIGITAL 2 signals of the probe/detector selected by the MUX 0,1,2 address to MUX OUT input (P20) of microprocessor 610. Tristate buffer 670 couples analog multiplexer 628 to MUX OUT, except when it is desired to provide the multiplexed output of analog multiplexer to the P21 port of microprocessor 610, at which time addressable latch 615 outputs the DIG EN signal to tristate buffer 670. In the presently preferred embodiment, port P21 is not utilized.

Analog multiplexers 626–629 are respectively coupled to the ANA A, ANA B, DIG A and DIG B outputs of RS 232 connector 661 (FIG. *6a*), which outputs may also be multiplexed to ADC 634 and microprocessor 610 depending on the particular address supplied to the respective multiplexer.

Each device coupled to CDSU 120 by the AC power lines has a hard coded address identification number which identifies itself to CDSU 120 as to its type, e.g., an MDU 122 of the type depicted in FIG. 6. In addition, each MDU in a household is uniquely identified by means of a unique analog voltage level generated by resistive divider 633 (FIG. *6b*) and switch 634 which has 16 possible switch configurations. As indicated above, up to 16 MDUs may be coupled to a single CDSU, and the combination of resistive divider circuit 633 and a specific configuration of switch 634 generate one of 16 possible unique voltage levels.

Power monitor/watchdog timer 645 of reset and power backup circuitry 603 (FIG. *6a*) detects when the +5 DC voltage (Vcc input) falls below 4.5 volts and when the strobe input (ST ) (ADCC output of ADC 634) is inactive for a predetermined time (1.2 sec.). When either condition is detected, circuit 645 activates its RST. output to port P16 of microprocessor 610 and to input "In" of power monitor 646. Power monitor 646 monitors the AC supply and detects an impending power failure prior to the regulated DC voltages going out of tolerance. Power monitor 646 receives AC voltage VUR from transformer 636 and provides the NMI* signal to microprocessor 610 to cause it to shutdown when VUR is out of tolerance, and provides the RST* signal and the STB signal (with gates 672, 673) to microprocessor 610 after the VUR signal returns to an acceptable level. Timekeeper/memory controller 647 provides the timekeeping function (available from D, Q ports and supplied to DO data port to microprocessor 610), memory control (OE. output) and power for RAM 612 and microprocessor 610 (M5V on output VCCO) in the event of a power failure. Battery 675 supplies the standby power to input BAT 1 of timekeeper/memory controller 647.

Display driver 651 (FIG. *6b*) of display and driver circuitry 604 receives a device select signal (VFDC) on its SCK input from addressable latch 616 (FIG. *6a*) and display data (ADC/VFDO) on its DAT input from microprocessor 610 (P17). A reset signal (DRST) output from addressable latch 615 is supplied to transistor 653, which supplies a reset signal to the POR input of display driver 651 in response thereto. Operation of display and driver circuitry is controlled by handset 134 and the interrupt sequence in microprocessor 610 activated by the HDD. signal on port IQl. DC power is supplied from the +5 volts DC supply to display driver 651 via input A, and AC power is supplied to display 650 and resistor array 652 from transformer 636.

Power line transceiver 605 (FIG. *6b*) transmits data to, and receives data from, CDSU 120 employing a frequency shift keyed (FSK) modulated signal which is superimposed on the domestic AC power supply in the household. Modem device 655 is enabled (pin 5) by the PLTxE signal from microprocessor 610 (P22 via gate 677). Data to be transmitted to CDSU 120 is supplied to pin 17 of modem device 655 from P24 (PLTxD) of microprocessor 610, and is output from modem device 655 to transformer 656 on pin 10. Receive data from CDSU 120 is received from transformer 656 on pin 10 of modem device 655 and transmitted from pin 12 of modem device 655 to P23 (PLRxD) of microprocessor 610. The FSK characteristics may be as follows: a modulation frequency of 117.5 KHz. and a mark/space frequency difference of plus or minus 2.5 KHz., respectively. An error checking protocol is provided for checking transmissions between MDU 122 and CDSU 120.

RS 232 driver 660 (FIG. *6a*) of RS 232 port 606 receives data to be transmitted on its T1 (pin 2) and T2 (pin 20) ports from microprocessor 610. Microprocessor input/output port P18 is dedicated to T2 data output to RS 232 driver 660, while microprocessor input/output port P24 is used to transmit data to power line transceiver circuit 606 (PLTxD) or T1 data to RS 232 driver 660 depending on the state of tristate buffer 680 which is controlled by input/output port P12 of microprocessor 610. The T1 and T2 outputs (pins 5 and 18, respectively) are coupled to connector 661. RS 232 driver 660 receives data from connector 661 on its R1 and R2 inputs (pins 4 and 19, respectively) and outputs that data on its R1 and R2 outputs (pins 3 and 1, respectively) to microprocessor 610. The R2 out line of RS 232 driver 660 is coupled directly to input/output port P14 of microprocessor 610, while the R1 out line is coupled to mioroprooessor input/output port P23 via tristate buffer 681, whose state is controlled by input/output port P23. Thus, input/output port P23 is time multiplexed to receive data either from RS 232 driver 660 or from power line transceiver circuit 606 (PLRxD). Tristate buffer 682 isolates power line transceiver circuit 660 from microprocessor port P23 when data is being supplied to microprocessor 610 by RS 232 driver 660. RS 232 port may be used for testing (see FIG. 1).

Figures 2, 2A, 3, 4, 5, 6, 7:
FIG. 7 is a block diagram of one embodiment of the central data storage unit (CDSU) of the system depicted in FIG. 1.

Central Data Storage Unit 120 (FIG. 7)

Referring to FIG. 7, CDSU 120 comprises AC to DC converter/battery charger 700, battery 702, DC to DC converter 704, power line transceiver 706, processor 708, real time clock 710, EPROM 712, RAM 714, telephone line modem 716 and telephone direct access arrangement 718.

AC to DC converter/battery charger 700 connects to the domestic AC power line and converts domestic AC power to +15 volts DC, which is supplied to power line transceiver 706, and +7 volts DC, which is supplied to DC to DC converter 704 and is used to charge battery 702. Power line transceiver 706 is coupled to the AC line through AC to DC converter/battery charger 700. Battery 702 provides backup power during power failures and out of tolerance voltages.

DC to DC converter 704 receives DC power from AC to DC converter/battery charger 700 or battery 702 and regulates it to provide several DC voltages which power various circuits in CDSU 120. One of these DC voltages is present at all times to maintain the data stored in RAM 714, similar to the M5V voltage generated in MDU 122. Some DC voltages are switched to minimize power consumption. DC to DC converter 704 also performs a battery monitoring function.

Power line transceiver 706 is an FSK half-duplex, current carrier modem, similar to power line transceiver 605 in MDU 122. Power line transceivers 706 and 605 communicate with each other under respective processor control.

Processor 708 includes a microprocessor, peripheral input/output circuitry, address decoding and I/O decoding. Program memory is stored in EPROM 712, and data relating to information collected by or through MDU 122 and information transmitted from central computer 104 (FIG. 1) is stored in RAM 714. Processor 708 controls operation of DC to DC converter 704, power line transceiver 706, telephone line modem 716 and telephone direct access arrangement 718. Processor 708 including EPROM 712 and RAM 714 may be generally similar to microprocessor section 600 in MDU 122.

Real time clock 710 includes a crystal-controlled oscillator and divider circuitry which provide basic timing for an approximate eight-second MDU polling cycle (from completion of communications to the next pole) and real-time time keeping for processor 708. Real time clock 710 commences a cycle by outputting a pulse to processor 708, which typically completes the cycle prior to the expiration of eight seconds, at which time processor 708 is placed in a standby mode awaiting the start of the next eight second cycle. Real time clock 710 and COU functions are maintained during an AC power failure, and real time clock 710 is used to update or set after a power failure the real time clock in each of the MDUs connected to CDSU 120. Thus, real time clock 710 is a master clock for the CDSU and MDUs in a household.

Telephone line modem 716 provides a 212A compatible telephone line modem capable of operating full-duplex at 300 bps and/or 1200 bps. Selection of modem operation at 1200 bps is controlled by processor 708. Telephone line modem 716 also provides tone dialing, pulse dialing and call progress monitoring.

Telephone direct access arrangement 718 conforms to Part 68 regulations and provides FCC registered isolation of the switched telephone line from the rest of CDSU 120. Telephone direct access arrangement 718 monitors a battery in the central office at which central computer 104 is located to determine if the telephone line thereto is in use before initiating a call, and may also monitor the household telephone 144 during a CDSU/central computer call for an off-hook condition, upon detection of which the CDSU/central computer call will be terminated within one second.

Telephone direct access arrangement 718 and telephone line modem 716 are capable of operating in an auto dial mode in which telephone line modem 716 calls central computer 104 during a pre-programmed time slot in order to effect the transfer of the data collected by CDSU 120 from MDU 122, and in an auto answer mode in response to a telephone call from central computer 104. The following parameters in telephone arrangement 718 and modem 116 may be made downloadable: start time; stop time; retry interval; telephone number; baud rate; lo on requirements; and log separation. This provides system 102 with excellent flexibility.

SETUP PROCEDURES

CDSU 120 receives and stores setup information in addition to data statements from MDU 122 relating to the status of the probe/detectors, video switches and audience information. Such setup information identifies what equipment is connected in the various viewer system 100/monitoring system 102 combinations, and how that equipment is connected in those system combinations. The setup information is stored in MDU 122 and also in CDSU 120, which in turn transmits that setup information to central computer 104. Should that setup information be lost by MDU 122 due to a power or other failure, it could be supplied to MDU 122 by CDSU 120 and/or by central computer 104 through CDSU 120. Setup procedures are performed for TV 106, VCR 108 and cable converter 114 by an installer who inputs information via a handset 134. MDU 122 is loaded with a program which prompts the installer to enter information via handset 134. Programs providing such prompts and conditioning MDU 122 to receive the requested information may be fabricated by those of skill in the art from the disclosure herein.

TV SetUp

The prescaler value for TV probe/detector 128 is determined during the TV setup routine. This setup routine permits monitoring system 102 to accommodate use of either a direct connect, loop connect, or close connect probe in TV probe/detector 128. Setup is required because direct connect probes, loop connect probes, and close connect probes may use a different prescaler value. In response to a prompt, the installer indicates the TV probe/connector type. (The probe 350 depicted in FIG. 3 is a direct connect probe and probe 400 depicted in FIG. 4 is a loop connect probe.) In the direct connect probe 350 of FIG. 3, the frequency of the signal picked up by the probe is divided by $2^{14}$ in binary divider 270. In the loop connect probe 400 of FIG. 4, the frequency of the signal picked up by the probe is divided by 2s in amplifier/divider 420 and by 2⁻in binary divider 422, for a total division of $2^{22}$. Since the frequency division between a direct connect probe and a loop connect probe differs by $2^8$, MDU 122 must be advised as to the type probe utilized. (Similar differences may exist with respect to a close connect probe.) Since the intermediate frequency "IF") of U.S. TVs is the same regardless of manufacturer, the channel to which the TV is tuned can be determined once the total frequency division of the signal supplied to MDU 122 is known. For a loop connect probe, the only frequency division is that performed in the probe. Thus, once MDU 122 is advised that the frequency division is $2^{22}$, it can calculate the channel to which TV 106 is tuned since MDU 122 also calculates the frequency of the incoming signal. MDU 122 then displays the calculated channel and prompts the installer for confirmation. When confirmation is received, MDU 122 logs in the probe as a loop connect. For a direct connect probe, which is connected to a prescaler circuit in TV 106, frequency division is performed by both the internal TV prescaler and by the direct connect probe. While the frequency division of $2^{14}$ performed by the direct connect probe is known, the frequency division of the TV internal prescaler is not, which must be determined by MDU 122. Typically, the frequency division of the TV internal prescaler is less than $2^8$, which is the frequency division difference between a loop connect and a direct connect probe. MDU 122 sequentially divides the frequency of the signal input by probe/detector 124 by $2^6$, $2^7$, $2^8$. For each frequency division, MDU 122 calculates a TV channel assuming that the internal prescaler division is the same as the division performed by MDU 122, and then displays the channel number and prompts the installer for confirmation. If the installer confirms that the displayed number is the channel to which the TV is tuned, then MDU 122 logs in, as the internal prescaler division, the power of 2 with which it divided the incoming signal. If there is not a confirmation, MDU 122 proceeds to divide by the next power of 2, and continues until it receives a confirmation.

Cable Converter Setup

1. Cable trunk polarity setup routine: Cable probe/detector 124 interacts with cable trunk switch 116 to provide MDU 122 with information indicating the input to which switch 116 is switched. This setup routine provides MDU 122 with information as to which position of cable trunk switch 116 is the A trunk and which is the B trunk. The same setup routine is carried out with respect to electronic cable trunk switch 117 and cable probe/detector 125. In response to a prompt, the installer simply enters the input to which the switch is switched.

2. Cable offset frequency setup routine: Unlike U.S. TVs, cable converters made by different manufacturers may have different IFs. However, the range in which such IFs lie is limited, and the IF for a given cable converter may be indirectly determined during setup and stored as an offset frequency ($F_{os}$) MDU 122 prompts the installer to tune the cable converter to a given channel, for example, channel 3. With the cable converter tuned to channel 3, MDU 122 measures the frequency of the cable converter LO, taking prescaling into consideration. MDU 122 assumes an IF for the cable converter and calculates the broadcast signal for the tuned channel . A frequency difference ($F_D$) between the calculated broadcast signal for the tuned channel and that of a given channel (e.g., channel 2) is noted, and a frequency offset ($F_{os}$) for the local oscillator signal of the tuned channel ($F_{LO}$) is determined as follows: $F_{os}=F_{LO}-F_D$. The $F_{os}$ is then stored by MDU 122 as part of the setup procedure. MDU 122 also stores a frequency map of frequency differences between other channels and the given channel (channel 2). For example, channel 2 is stored as 0, channel 3 as 6 MHz., etc. In operation, the channel tuned by the cable converter is determined as follows. The local oscillator frequency of the cable converter is measured (taking prescaling into consideration). The stored offset frequency ($F_{os}$) is subtracted to obtain a frequency difference ($F_D$). That frequency difference is then looked up on the stored table and converted to a channel, e.g., an $F_D$ of 6 MHz. is identified as channel 3. This procedure works regardless of broadcast standard (standard, HRC or IRC) used.

VCR Setup

The VCR setup is used to set up the following VCR probe/detector functions.

1. TV/VCR (bypass) switch setup: VCR probe/detector 126 may or may not be provided with a connector coupled to TV/VCR line 321 for monitoring the switch position of the TV/VCR switch 320 in VCR 108. This setup routine provides MDU 122 with information as to whether VCR probe/detector 126 has such a connector. In response to prompts by MDU 122, the installer enters information to indicate whether VCR probe/detector 126 includes a connector (not shown) for monitoring the TV/VCR switch 320. To ensure that that TV/VCR connector is connected properly, the MDU displays the switch position of the TV/VCR switch during setup. If the switch position does not agree with the display, the installer enters an appropriate response to make the display agree with the switch position. MDU 122 then stores a parameter indicating which switch position a logical high represents.

2. SCAN/PAUSE setup: VCR probe/detector 126 detects when VCR 108 is in the scan forward, scan reverse, and pause modes. To insure that VCR probe/detector 126 is in fact detecting those modes, VCR 108 is operated in those modes. If MDU 122 does not indicate that these VCR modes are being detected, the installer enters appropriate responses which adjust VCR probe/detector 126 to detect a different width of the field sync pulses during pause.

PATH Setup

The PATH setup routine is used to set the "video channel", typically channel 3 or channel 4, used to pass video from one piece of equipment to another and to input information into MDU 122 identifying how the various pieces of video equipment in viewing system 100 are connected together.

1. "Video channel" entry: MDU 122 displays the number of the current "video channel" number, which may be changed by the installer to any desired channel number.

2. TV video switch: This set up routine provides MDU 122 with information as to whether system 102 includes a video switch 119, and if so, with the identity of the particular pieces of equipment connected to TV video switch 119. System 102 accommodates connection of the following equipment to TV video switch 119: no connection of equipment; antenna; cable trunk A (cable ready); cable trunk B (cable ready) cable converter; VCR; video game; computer; satellite; microwave distribution system; and other equipment identified simply as auxiliary equipment.

3. VCR video switch: This setup routine provides information to MDU 122 as to whether there is a VCR video switch 118 connected in the system. If there is not, MDU 122 will prompt for the lowest UHF channel if a cable trunk option has been entered as an answer to any TV setup question. If there is a VCR video switch 118, the same information must be entered as for the TV video switch setup.

The following exemplary configurations define some possible video sources for, and video paths to, TV 106, and illustrate the need to supply configuration information to the system so that the video source may be identified.

Configuration 1: VCR 108 is off or is switched to TV mode (i.e., bypass), and VCR video switch 118 is switched to VHF antenna 110, which connects TV 106 to VHF antenna 110. TV 106 is tuned to channel 11. The video source of TV 106 is thus antenna 110 and the channel being viewed is channel 11.

Configuration 2: VCR 108 is off or is switched to TV mode (i.e., bypass), and VCR video switch 118 is switched to cable converter 114, which connects TV 106 to cable converter 114. TV 106 is tuned to channel 3 and cable converter 114 is tuned to channel 25 with video source cable A. The video source is now cable converter 114 and the channel being viewed is cable channel 25.

Configuration 3: VCR 108 is on and is switched to TV mode (i.e., bypass), and VCR video switch 118 is switched to VHF antenna 110, which connects TV 106 to VHF antenna 110. TV 106 is tuned to channel 7 and VCR 108 is tuned to and recording channel 5. The TV video source is antenna 110 and the channel being viewed is channel 7. The VCR video source is also antenna 110 and the channel being recorded is channel 5.

Configuration 4: VCR 108 is on and is switched to VCR mode, and VCR video switch 118 is switched to cable converter 114. TV 106 is tuned to channel 3, VCR 108 is tuned to and recording channel 3 and cable converter 114 is tuned to channel 25. The TV and the VCR video source is cable converter 114 and cable channel 25 is being viewed on TV 106 and recorded by VCR 108.

Down-Loadable and Up-Loadable Parameters

System 102 stores many parameters, some of which are determined and loaded into RAM memory during setup and others of which are loaded from PROM memory into RAM memory. These parameters may be changed in a subsequent setup, reloaded into MDU 122 by CDSU 120, or reloaded or changed from central computer 104. Also MDU 122 calculates and stores other parameters, and uploads some of those parameters to CDSU 120 for backup. If MDU 122 loses those parameters, CDSU 120 reloads them into MDU 122.

CDSU

- Household Identification Number
- Remote Polling Table
- Local Time Offsets (from EST)
- Starts of Research Day
- Test Mode Telephone Number
- Call Records (1 to 8)

MDU

- Household Members (identified by number during setup)
- Language selection (English, etc.)
- Handset Operation Parameters
- Guest Entry Parameters (entered by guests, e.g., no guests, no demographics, direct age entries, age range boundaries)
- Statement Logging (e.g., how long viewing must take place before viewing statement is generated)
- Monitor Display (e.g., frequency of reminder prompts)
- Voting
- Dummy
- VCR probe/Detector (e.g., setup and persistence parameters)
- Cable Converter (e.g., setup parameters)
- Video Values (e.g., field sync thresholds)
- Video Equipment configuration (e.g., video channel)
- TV Path Table (e.g., video sources)
- VCR Path Table (e.g., video sources)
- Socket (MDU Input)/Probe Type
- MDU Identification Number (e.g., revision or type number)
- Cable Converter Path Table (e.g., video sources)

Many of the down-loadable parameters relate to persistence values, i.e., the minimum time an event must persist before a statement for an event will be generated. The length of time that an event has persisted is checked by MDU microprocessor 610. The time (hour, minute, second) of a clock in microprocessor 610 is stored whenever an event is detected, and the time on the clock is checked in each processor cycle. If the event continues to be detected in subsequent cycles, the new time on the clock is checked to see if a time period has elapsed which exceeds the minimum persistence parameter value set in MDU 122. The persistence parameters are down-loadable and may be changed remotely from computer 104. For example, the following persistences are associated with VCR modes.

VCR Off Persistence

The VCR off mode is entered when the signal from the VCR probe/detector frame synchronization detector 217 remains at a constant level. This typically occurs when the VCR is off and there is not a video signal at the VCR VIDEO OUT jack line 213a. There are, however, certain kinds of video noise that produce this same effect and will cause the VCR probe/detector to enter the VCR off mode. Some VCRs kill the video out signal when they switch from standby to playback and this will also be identified as a VCR off mode. If the persistence is set too low, the VCR probe/detector will log VCR off statements when the VCR is switching between standby and playback. It does not seem likely that viewers will be switching their VCRs off and on in short periods of time; therefore, the persistence can be set to a high value.

Standby (VCR On)

This mode is entered when valid vertical syncs are detected by frame synchronization detector circuit 217 at the VCR VIDEO OUT jack line 213a and the VCR is not recording or playing back a tape. The VCR probe/detector detects the VC playback mode by adding a test signal at the VIDEO IN jack line 212a and looking for it at the VIDEO OUT jack line 213a. If the signal is not present, the VCR is in the playback mode. This test is referred to herein as "loop back" and as "off-air" video test. Under certain circumstances, the test signal may be detected at the VIDEO OUT jack even if the VCR is in playback. If the persistence is too low, the VCR probe/detector may log an erroneous standby statement while in playback.

Playback of Uncoded (Not Fingerprinted) Tape

This mode is entered when it is determined that the VCR is in playback (no test signal on the VIDEO OUT jack) and when encoded data is not detected by data decoder and amplifier 219. In some cases it is difficult to extract the encoded information each second. Teletext or poor video will cause the VCR probe/detector to miss encoded data. If the playback coded persistence is set too low, the VCR probe/detector may log playback of uncoded statements after missing encoded data. If the viewer is really watching an uncoded tape, then it is not important to catch short periods of playback. Therefore, the persistence may be set to a high value.

Playback of Coded (Fingerprinted) Tape—Start

This mode is entered if the VCR probe/detector detects encoded data on the tape. It is unlikely that this mode will be entered erroneously; therefore, the persistence may have a low value without generating incorrect statements. Typically, this persistence is low so that the VCR probe/detector may start processing of the encoded data to identify channel changes and time discontinuities. The persistence may be set to a higher value if it is desirable to reject short periods of playback that occur when a viewer is searching for a specific spot on the tape.

Recording Tape—Not Coding

This mode is entered when the VCR is recording a program from another VCR. It is detected when the erase head is on and the VCR probe/detector cable to the VIDEO IN jack has been removed to insert the cable to the other VCR. This mode will rarely occur, and when it does it is not important to catch it in a short period of time. Therefore, the persistence may be set to a high value to ensure that it will not occur erroneously.

Recording Coding

This mode is entered when the VCR is recording an offair program. It is detected when the erase head is on and the loop back test signal is detected at the video out jack. This persistence should be low so that the VCR probe/detector will start encoding information on the tape as soon as possible. A low persistence will not cause erroneous statement logging because the erase head is only on when the VCR is recording.

Scan/Pause

This mode is entered when the VCR probe/detector detects an abnormally long vertical sync pulse. It is usually important to catch a short scan/pause period because it makes interpretation of the statement log easier. The persistence should not be set too low because the VCR may generate abnormal vertical syncs when it is switching from standby to playback. Also, some kinds of video noise will look like scan/pause vertical syncs.

VCR Noise

This mode is entered when the signal from the field synchronization detector 217 is changing levels but no valid vertical syncs are found. This type of video signal may appear when a station goes off the air, the reception is poor, or when the VCR changes state. This mode does not carry important viewer information; therefore, the persistence may be set to a high value.

Playback of Coded (Fingerprinted) Tape—End

This mode is entered when a decoded time discontinuity is detected or when the VCR persists into another mode. The persistence is placed in the parameter to make the table consistent, but it is not actually used by the MDU.

Playback

This mode is entered when the VCR probe/detector first determines that the VCR is in playback. This mode must be entered before the MDU can determine if the VCR is in playback coded (fingerprinted) or uncoded (not fingerprinted).

Channel

This persistence determines how long a channel must remain constant before a channel change statement is generated. It is used for logging both real time channel changes and decoded channel changes. The channel persistence should be greater than the valid tape time persistence to insure that playback coded start and end statements are generated correctly when a tape time discontinuity with an associated channel change is encountered.

Valid Tape Time

The valid tape time is used in processing tape time discontinuities. When a recorded program ends and a new program starts, the new time must be validated before the playback coded end and start statements are generated. A new decoded time is considered valid if the time difference from the last decoded time is less than the decoded time discontinuity parameter. The valid tape time is the number of consecutive valid decoded times that must be detected before the new program is validated. If the valid tape time is too short, more playback coded end and start statements may be generated by poorly decoded data.

Valid Mode

In order to reduce the likelihood of entering an erroneous mode, the instantaneous VCR mode must remain constant several times before it is considered a valid mode. The valid mode persistence is the number of times the instantaneous mode must remain constant. All other mode persistence values (VCR off, standby, etc.) operate on the valid mode or, in other words, the persisted instantaneous mode.

Decoded Time Discontinuity

This is the minimum difference in two consecutive times decoded from the time information encoded on a tape recorded by the VCR that will generate playback coded end and start statements. This value is used to detect time gaps that occur because the VCR was paused during a commercial when the program was being recorded. It is also used to detect time gaps that occur when the viewer scans over a recorded commercial. This case may or may not have a scan/pause statement associated with the gap. It is also used to detect the end of a program which is recorded on top of another program with the same channel number. This number may be set to the minimum time gap that is to be logged by the MDU. If this number is too small, playback coded end and start statements will be generated when it is difficult to decode the data on the tape and several times are missed.

SYSTEM OPERATION

CDSU 120 controls communication between CDSU 120 and MDU 122, and in certain instances can initiate communications between CDSU 120 and central computer 104. MDU 122 controls operation of the system 102 as to monitoring operation of TV 106, VCR 108, cable converters 114, 115, cable trunk switches 116, 117, VCR video switch 118 and TV video switch 119. MDU 122 also controls entering of viewer and guest information and system setup information which are input by a viewer or a guest, or an installer, respectively, via a handset 134.

CDSU 120 receives and stores data statements from MDU 122 as to the status of the probe/detectors 124, 125, 126, and 128 connected to MDU 122 and as to the audience events entered into MDU 122 by handset 134. These data statements are then provided to central computer 104 by CDSU 120, central computer 104 also being supplied separately with program identification information. From that information, central computer 104 may determine the actual program being viewed on TV 106 at any given time. From setup and configuration information, central computer 104 identifies what program was viewed and its source; and from data decoded by VCR probe/detector 126, whether the program was played back from tape.

Figures 2, 2A, 3, 4, 5, 6, 7, 8:
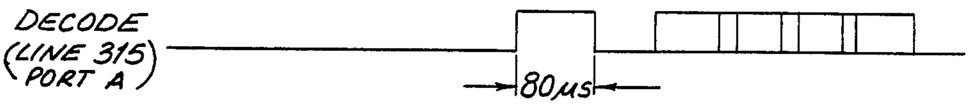
FIG. 8 is a flow chart of the main operational loop of the MDU.
Figure 3:
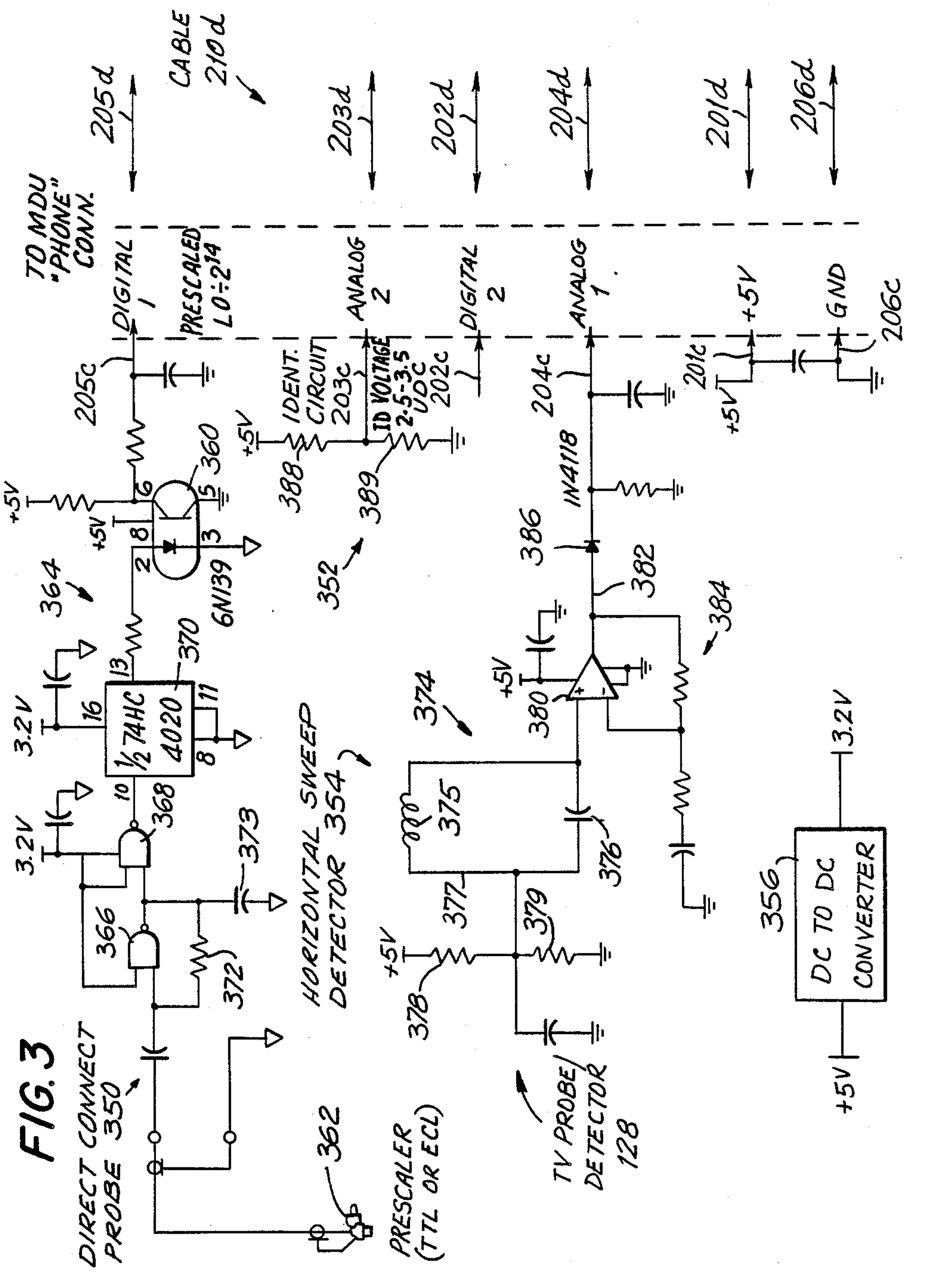
Figure 4:
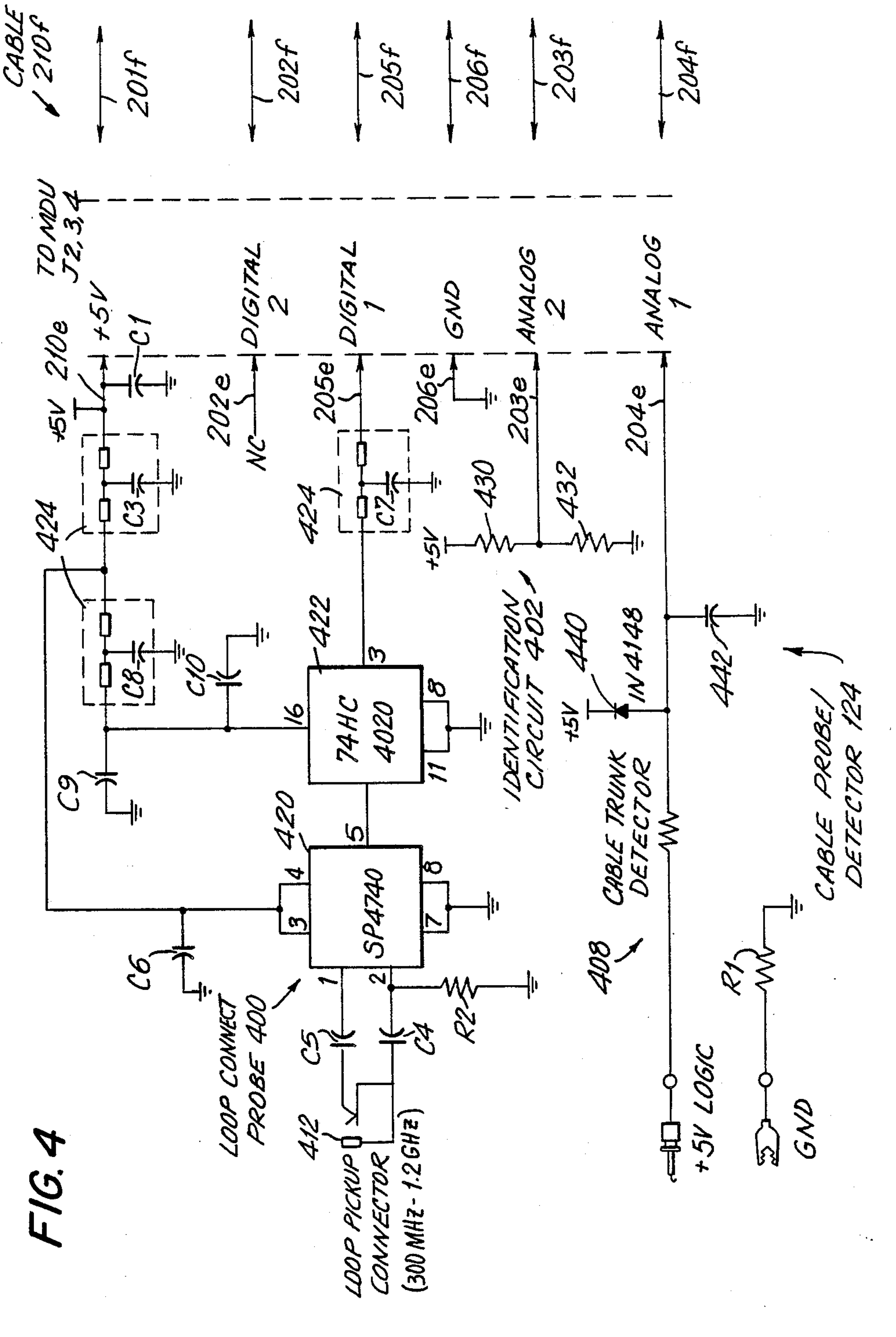
Figure 5:
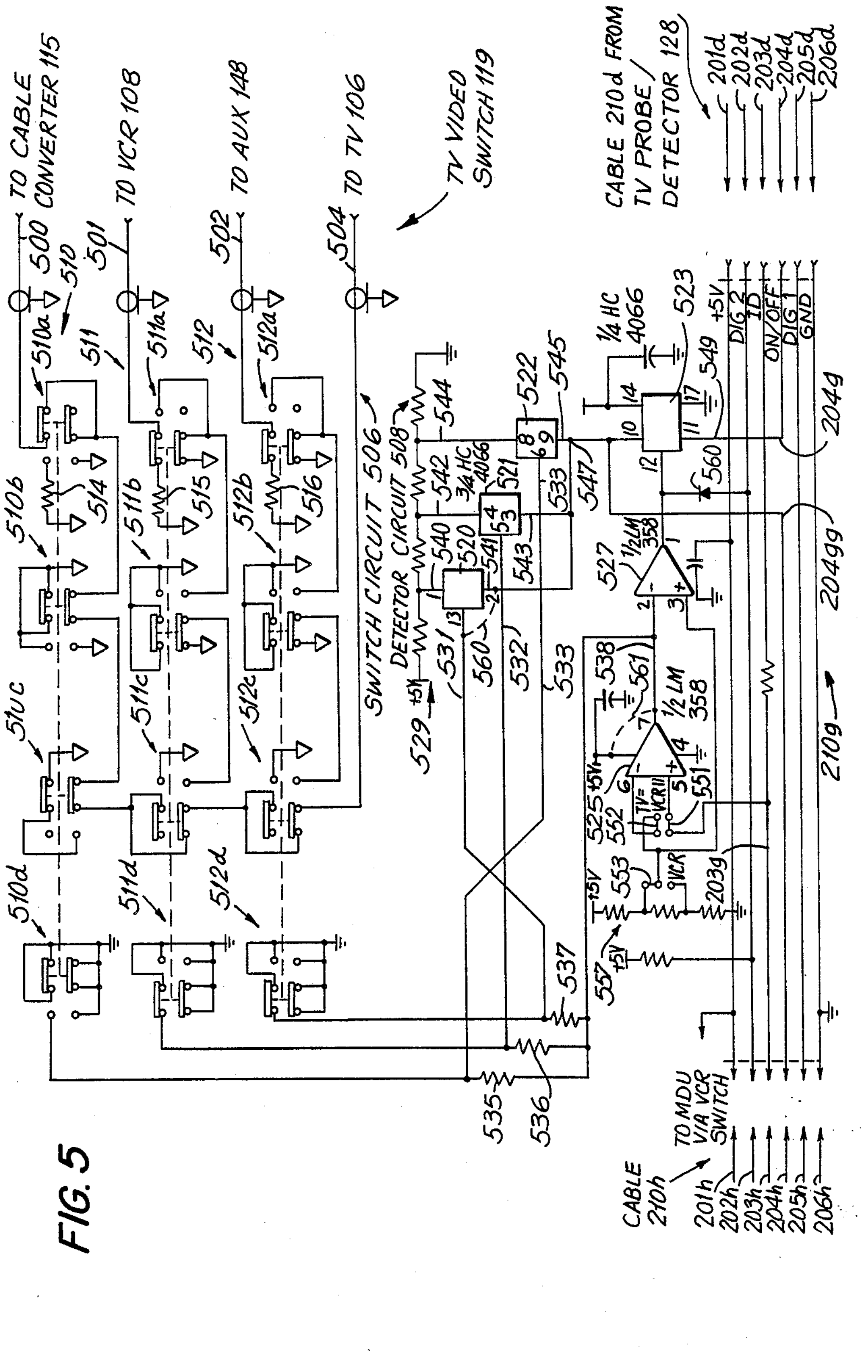

FIG. 8 is a flow chart of the main operational loop 800 of MDU 122. After self-testing and validation in routines 802 and 803 as to memory, time and other parameters, a number of coroutines (CLOCKSET, CLOCKCO, LOGGERCO, MESSAGECO, FMCO, CODISPLAY, COPERSIST, COMONITOR, VCRCO, and VCRCOMCO, see FIG. 9) are setup in a "create co-routines" routine 804. Routine 804 sets up the stacks, vectors, etc., necessary to carry out the coroutines identified in the resume loop flow chart 900 depicted in FIG. 9. After setup for those routines has been completed, MDU enters a STARTCO routine 805 which activates the resume loop 900 depicted in FIG. 9.

Figure 9:
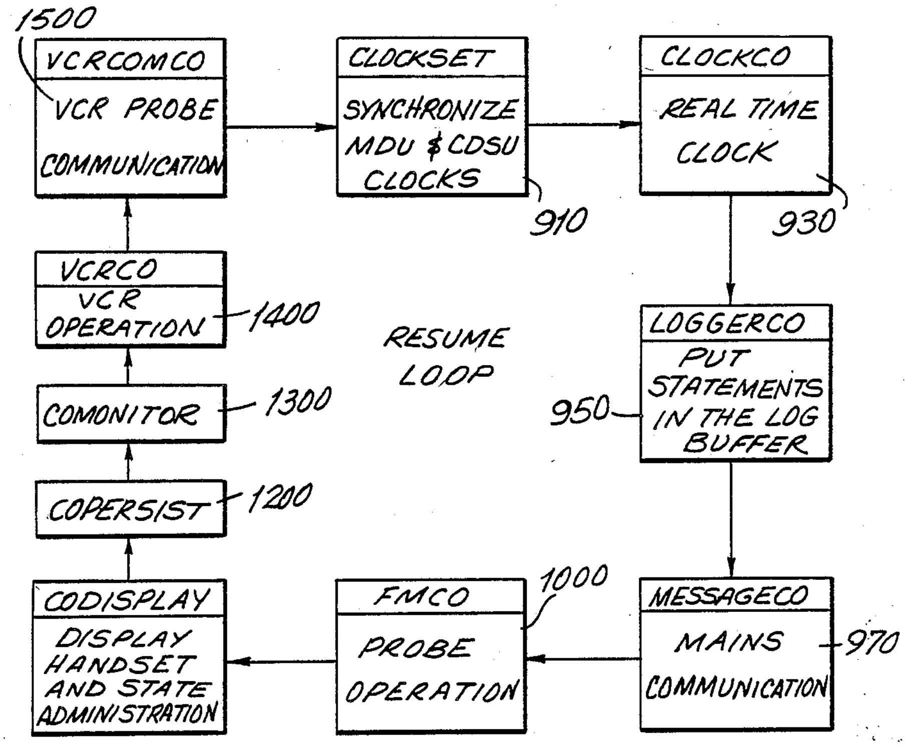
FIG. 9 is a flow chart of the resume loop of the MDU.
Figures 1, 10:
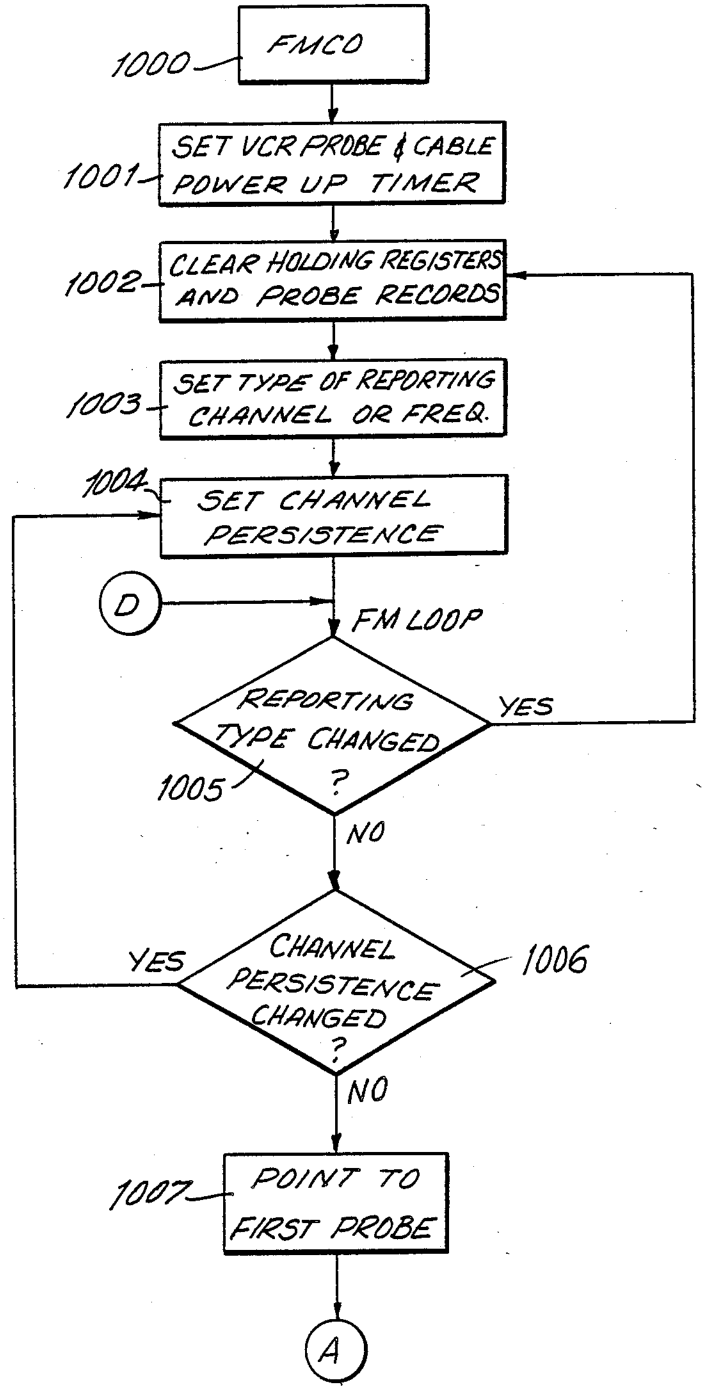
Figures 2, 10:
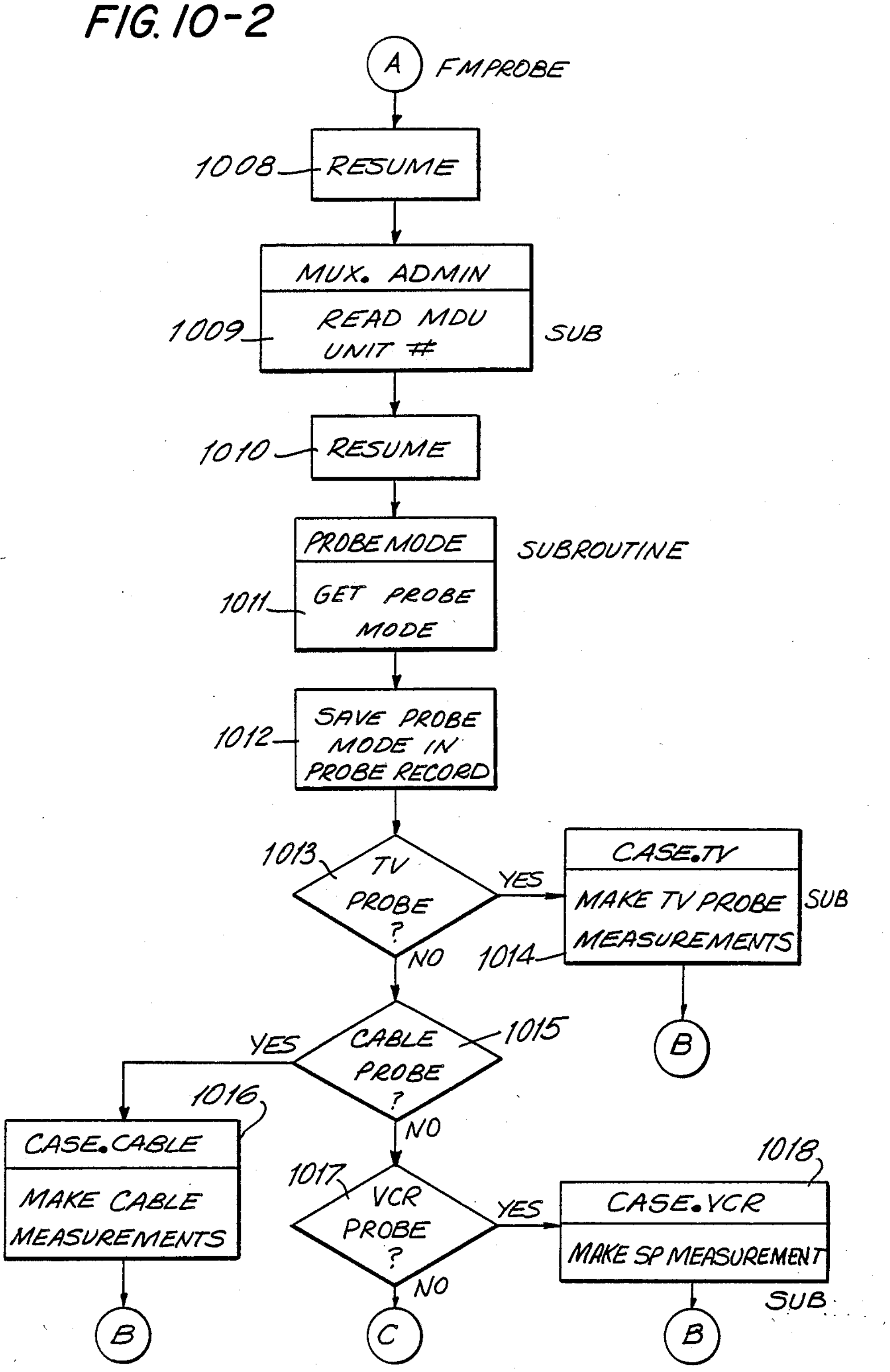
Figures 3, 10:
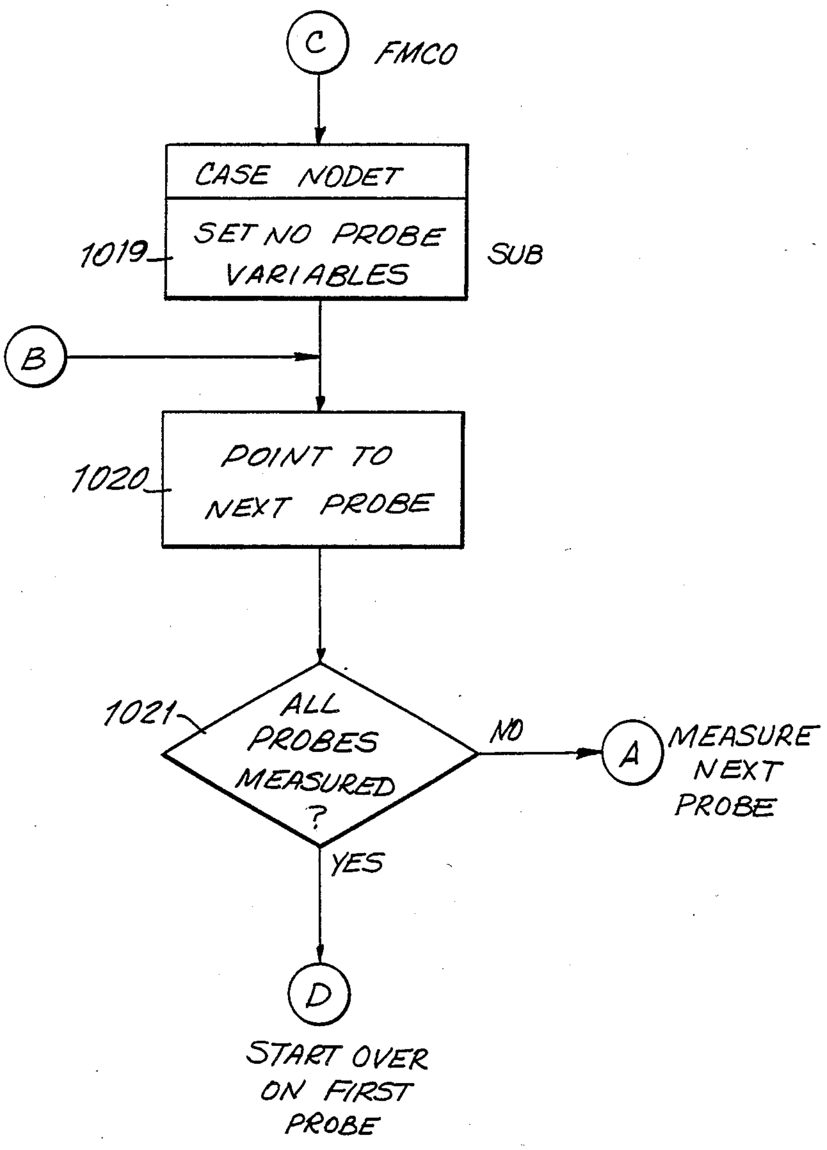
Figures 1, 11:
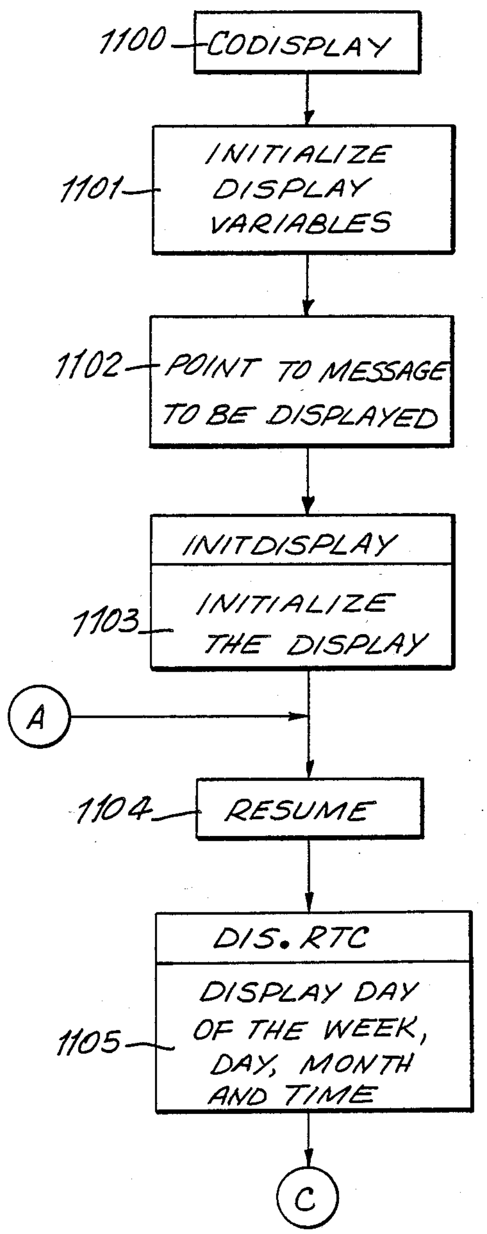
Figures 2, 11:
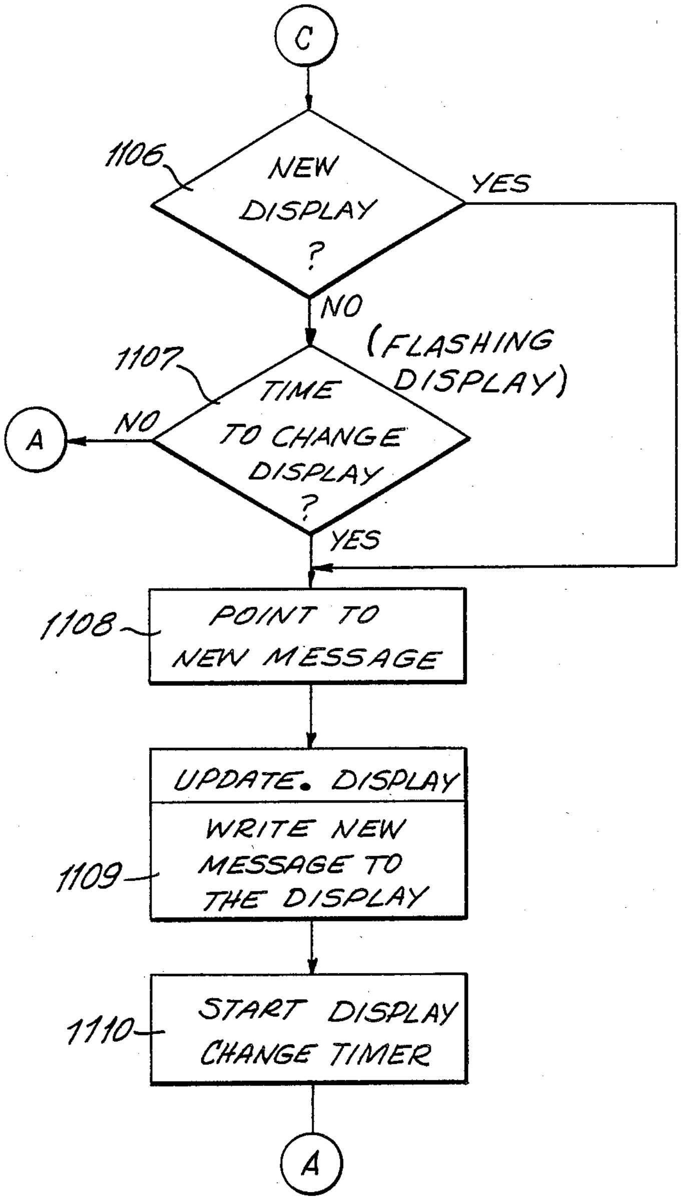
Figures 1, 12:
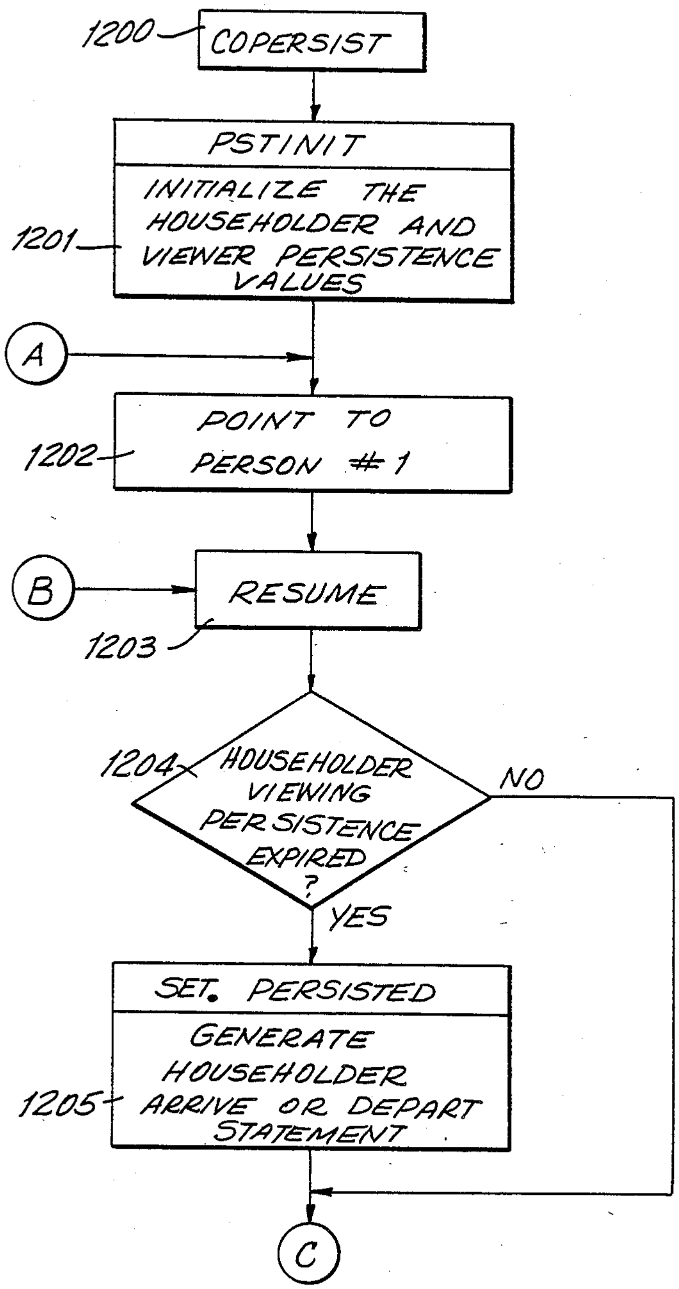
Figures 2, 12:
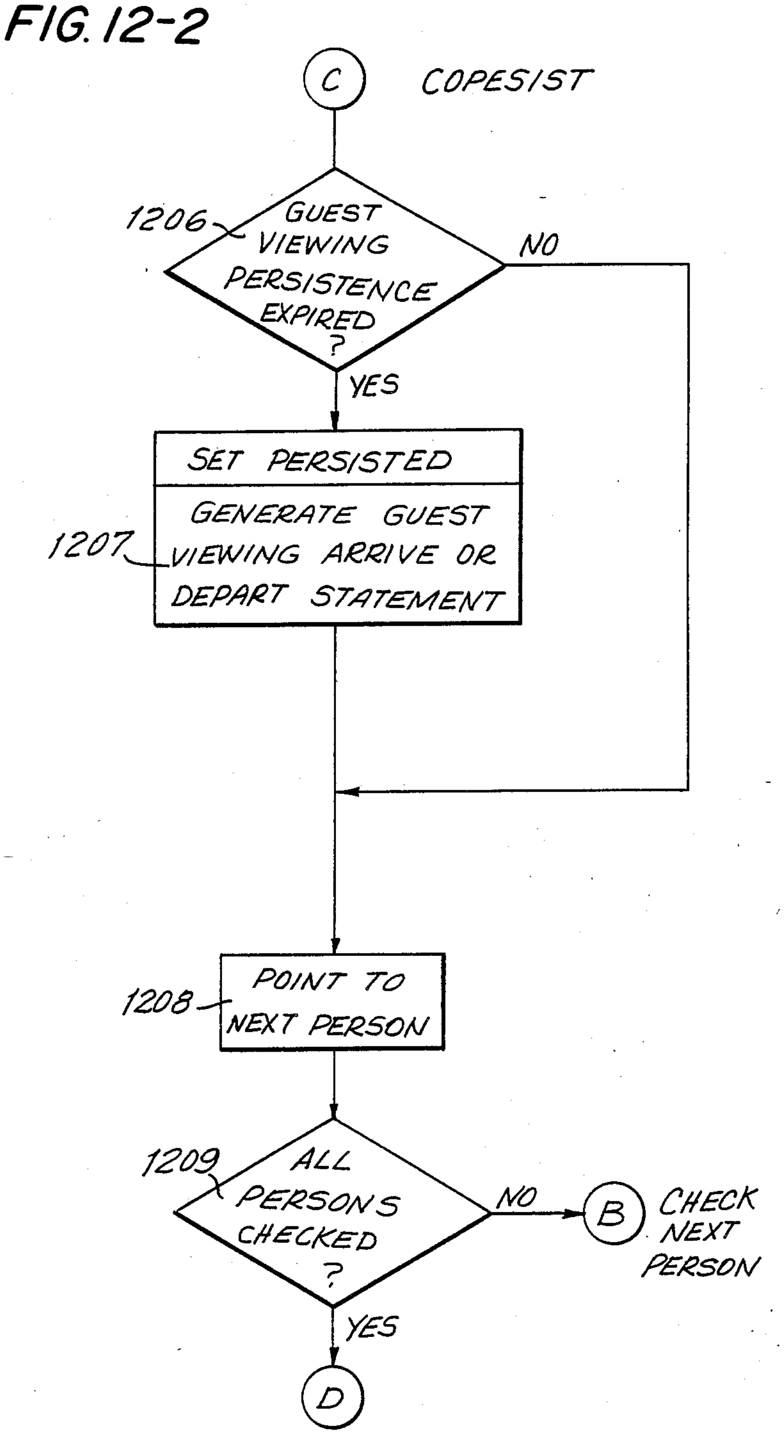
Figures 3, 12:
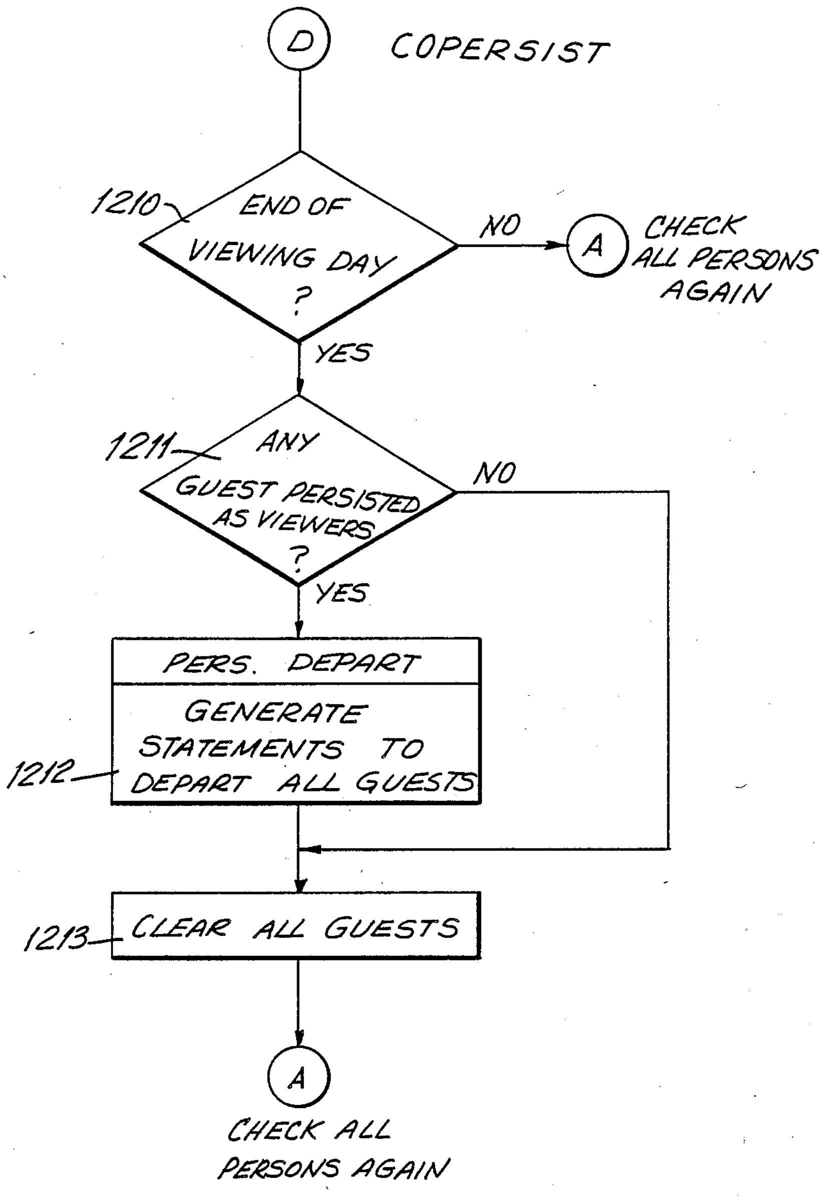
Figures 1, 13:
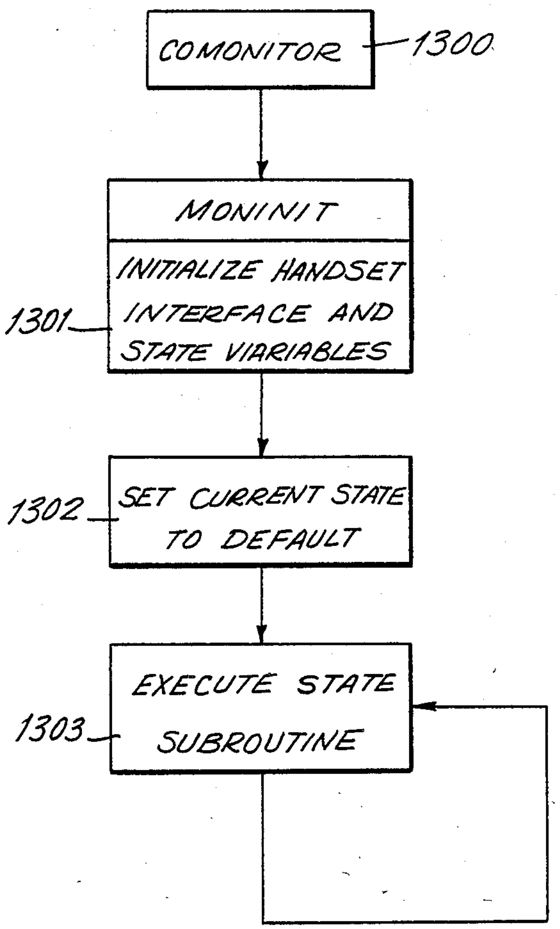
Figures 2, 13:
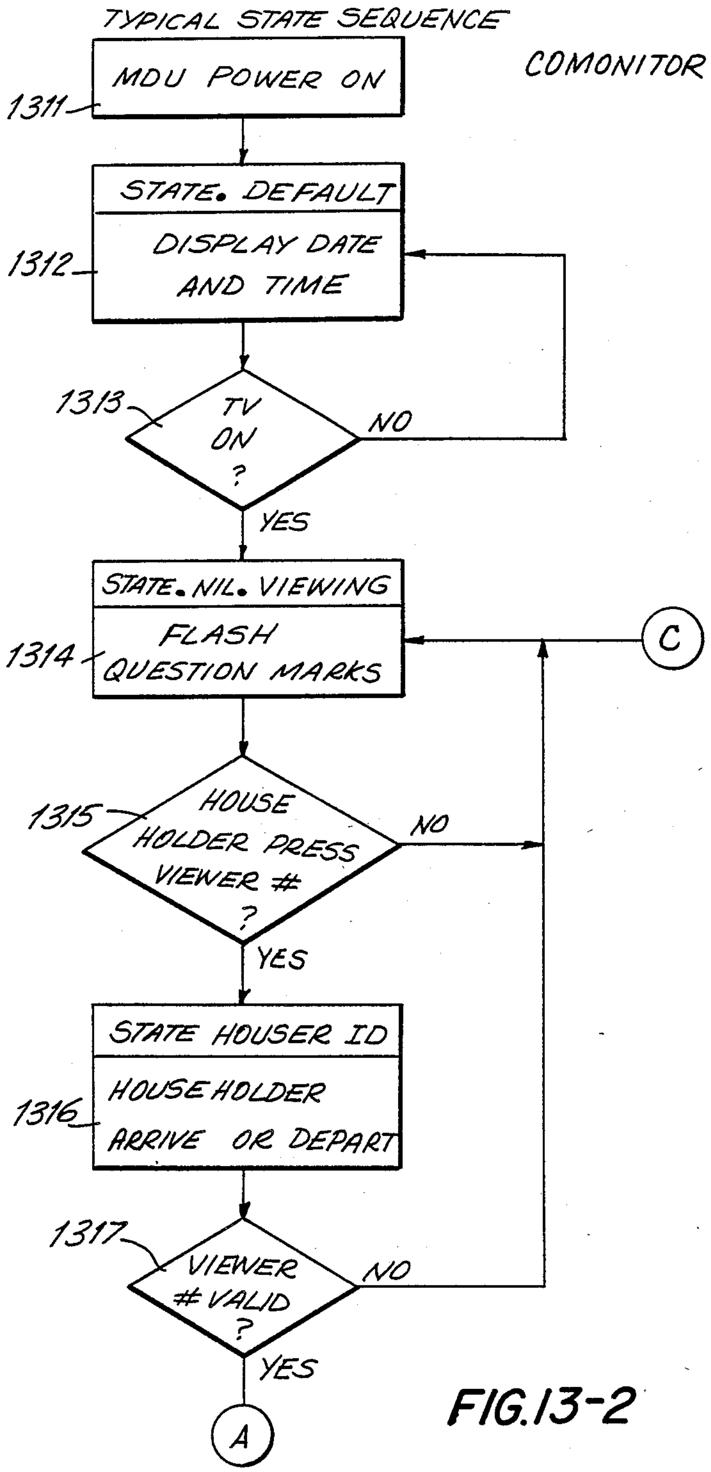
Figures 3, 13:
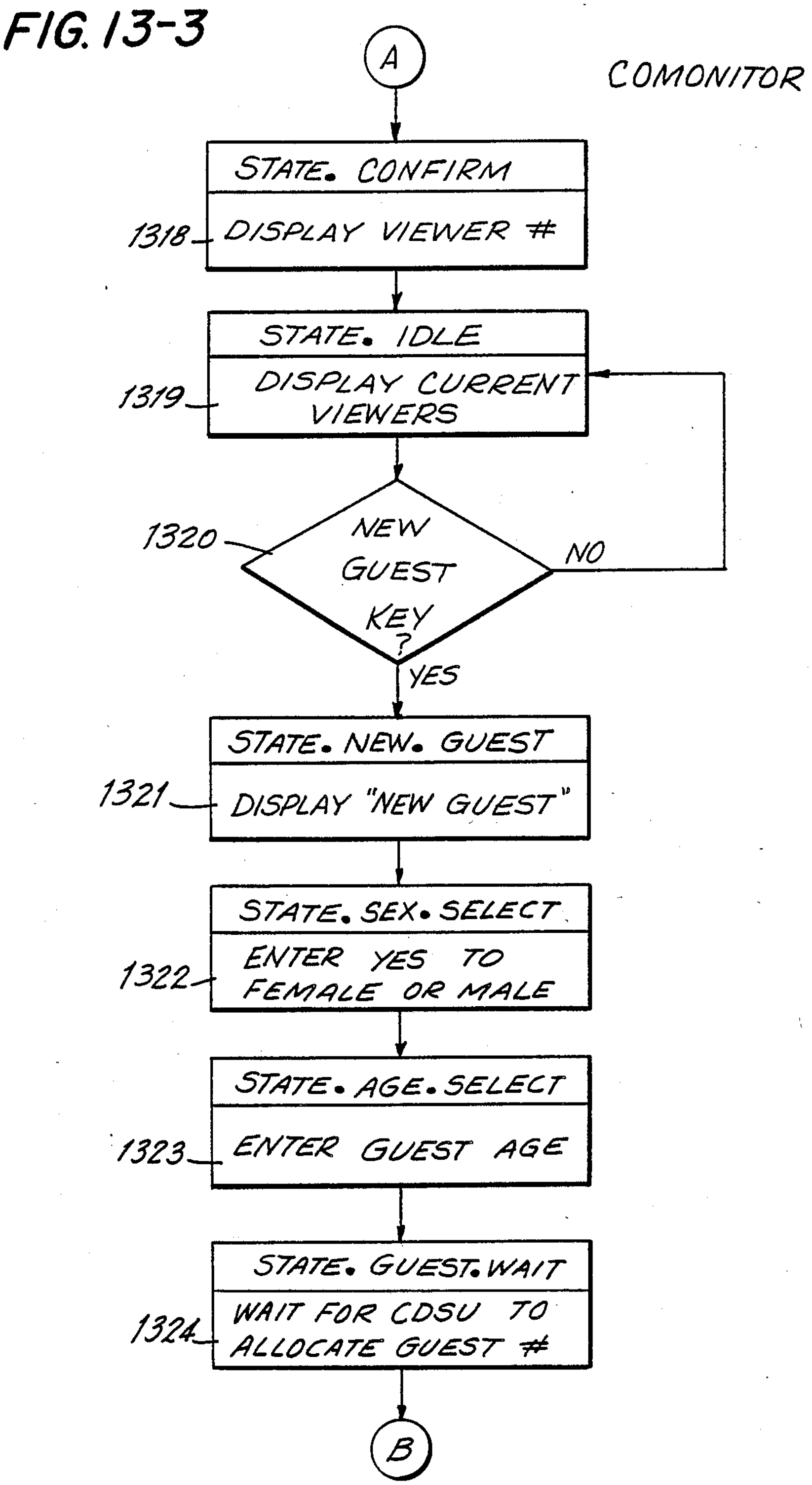
Figures 4, 13:
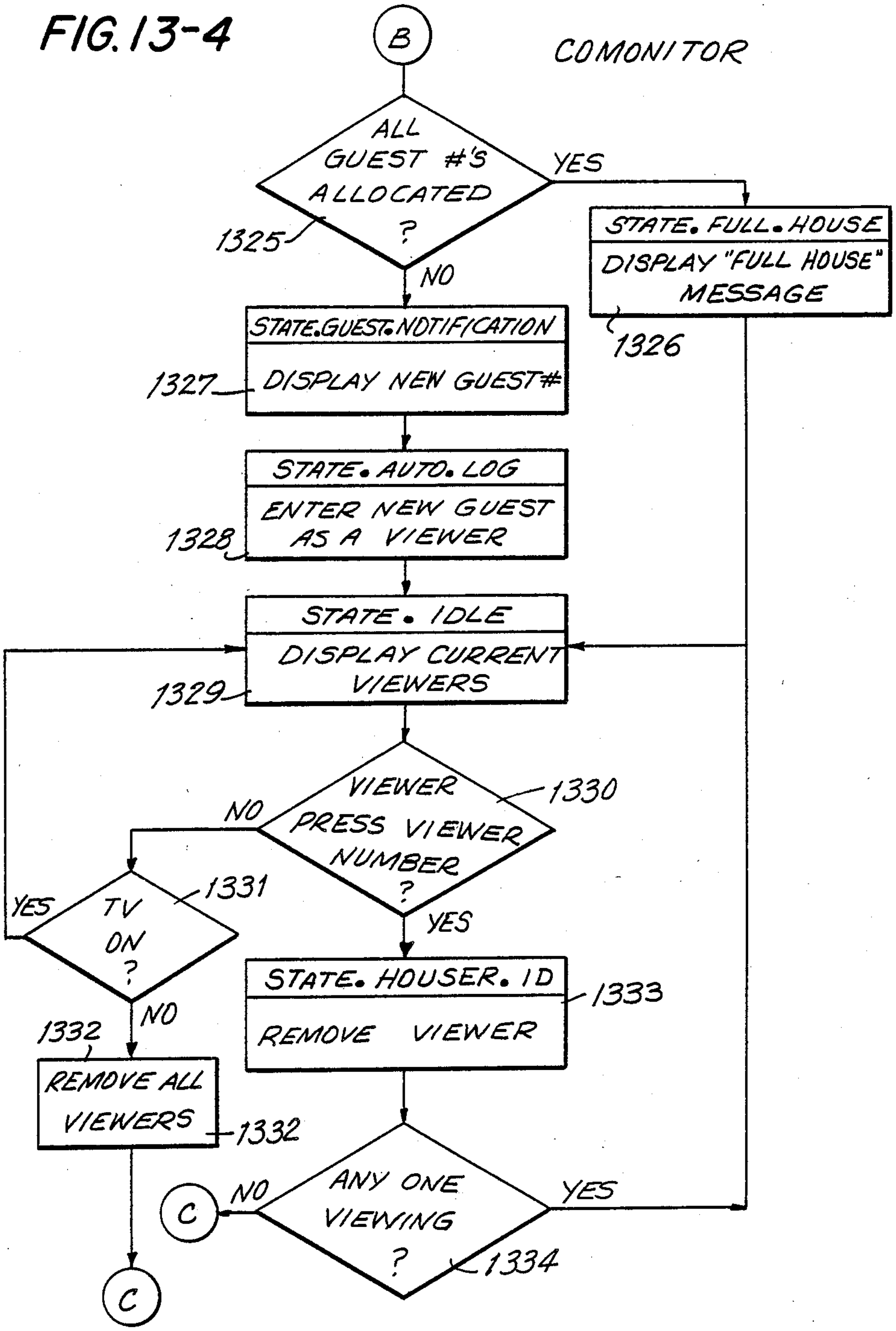
Figures 1, 14:
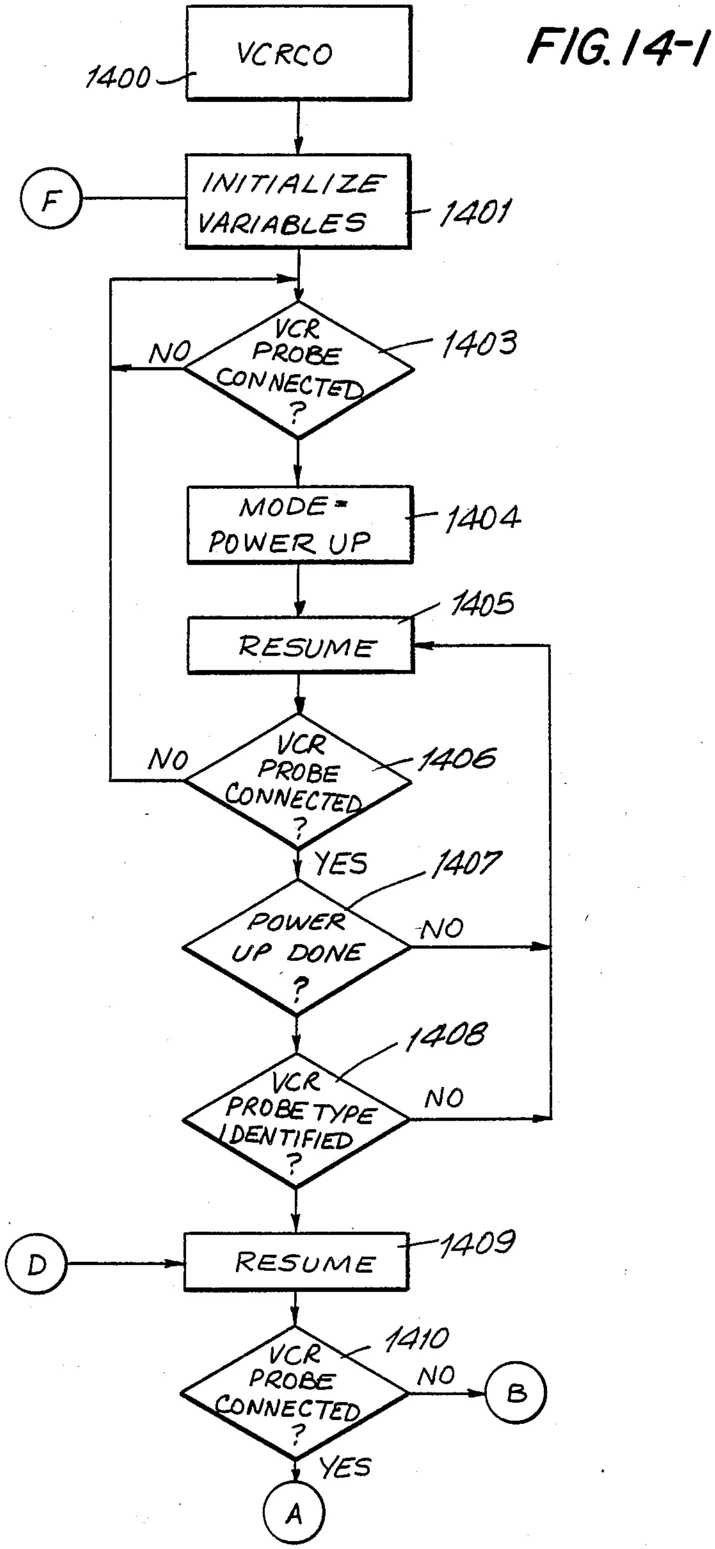
Figures 2, 14:
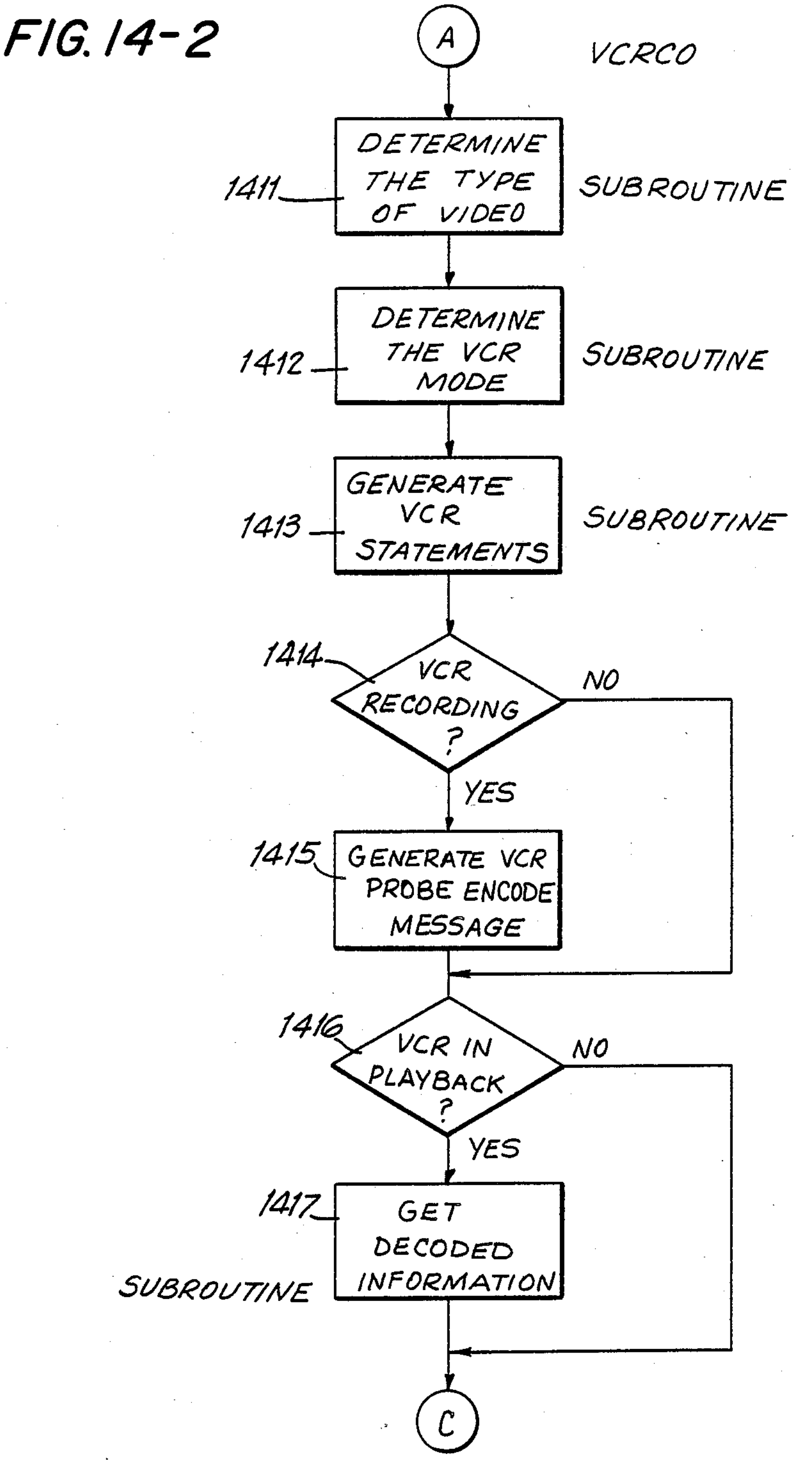
Figures 3, 14:
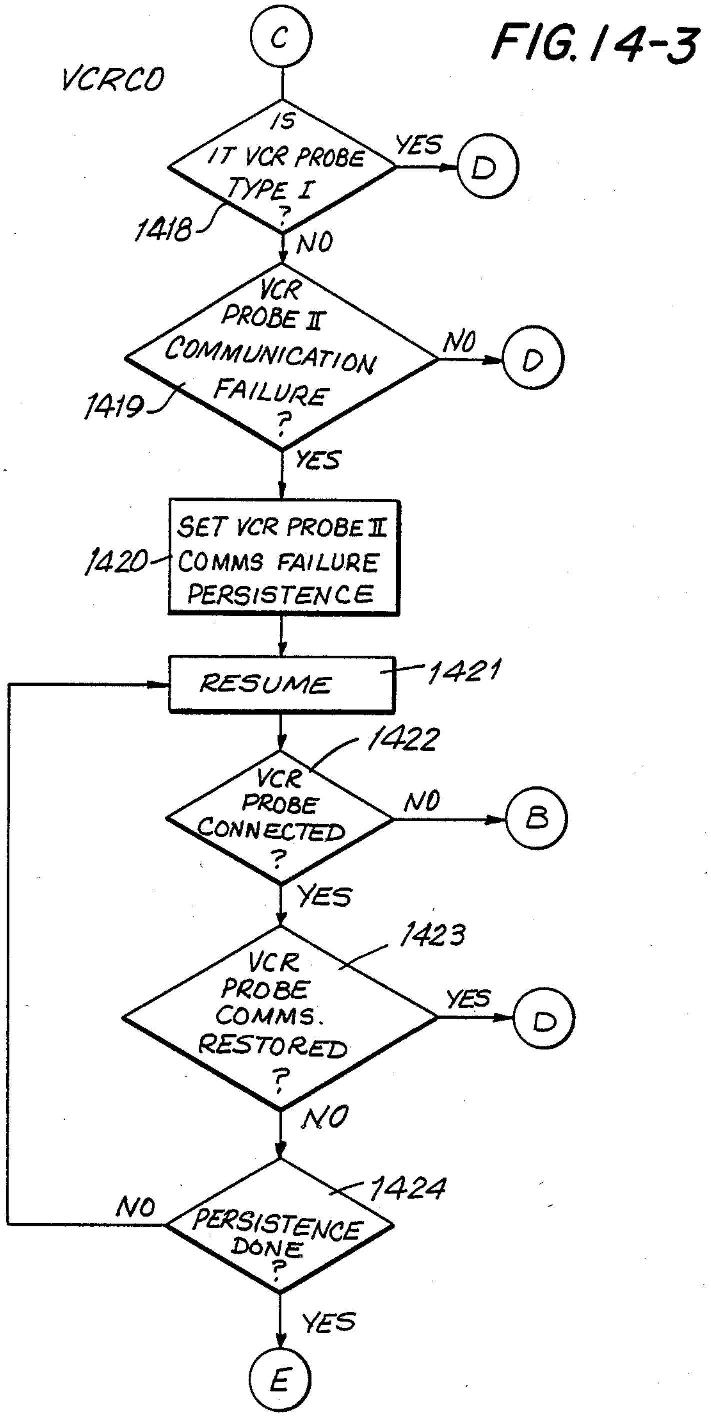
Figures 4, 14:
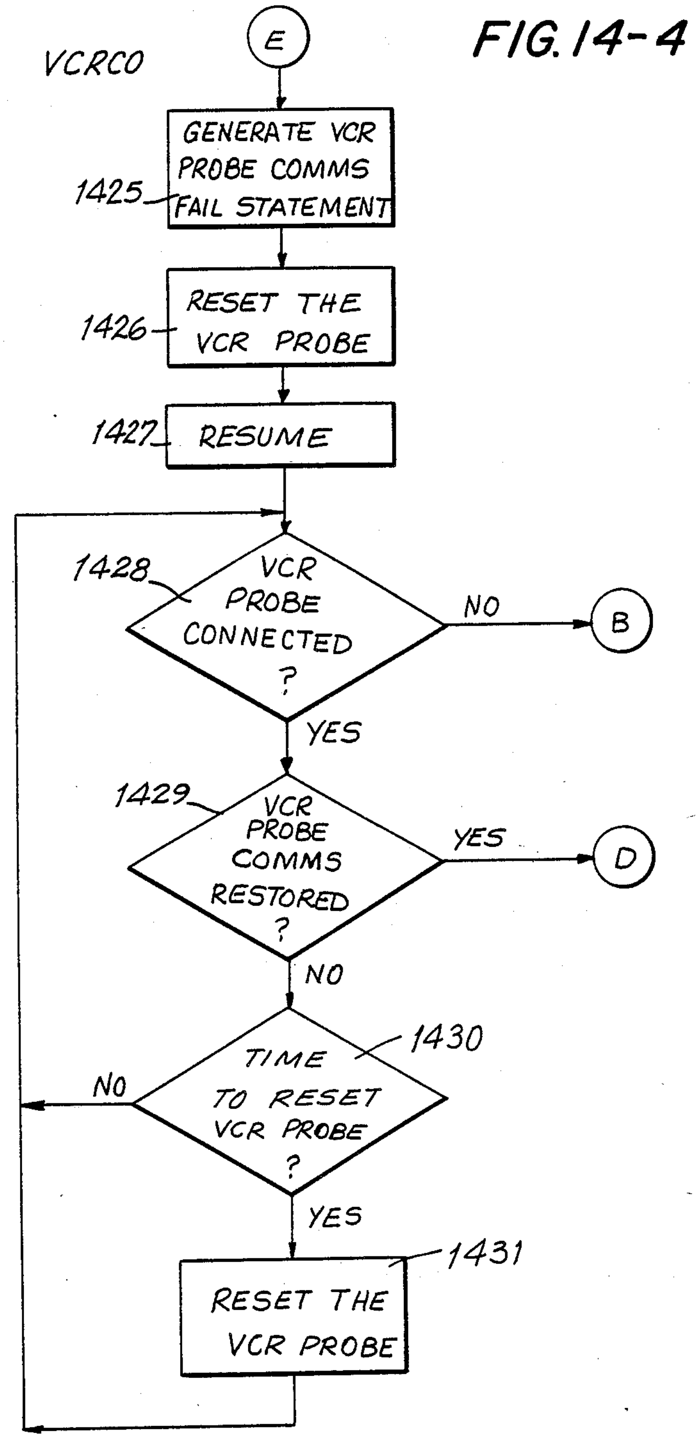
Figures 5, 14:
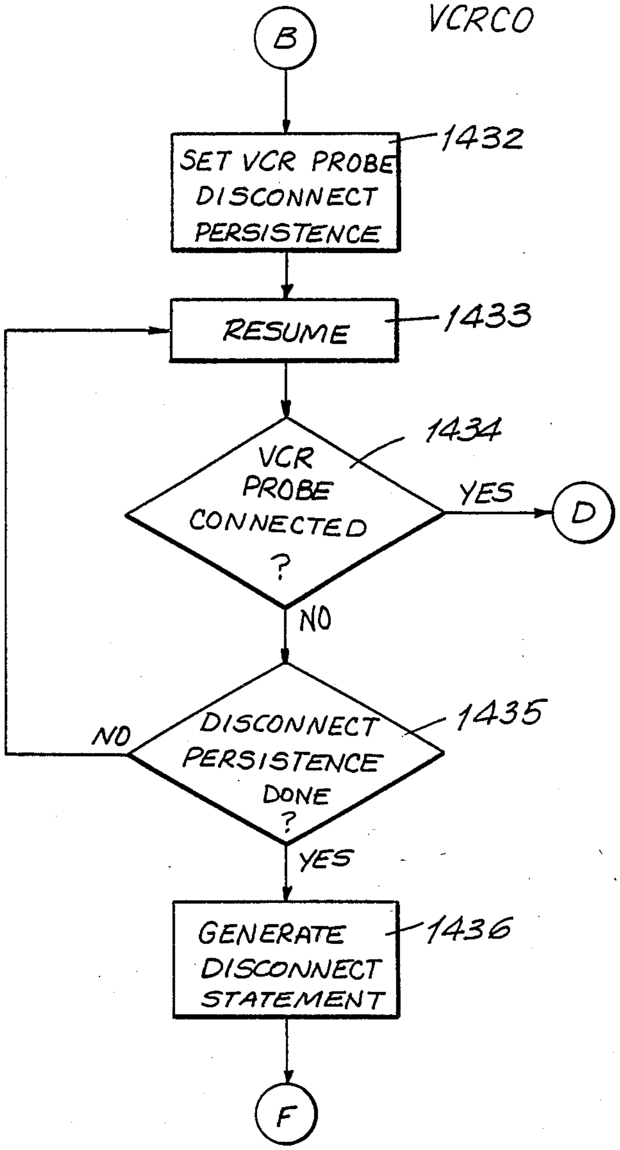
Figures 1, 14A:
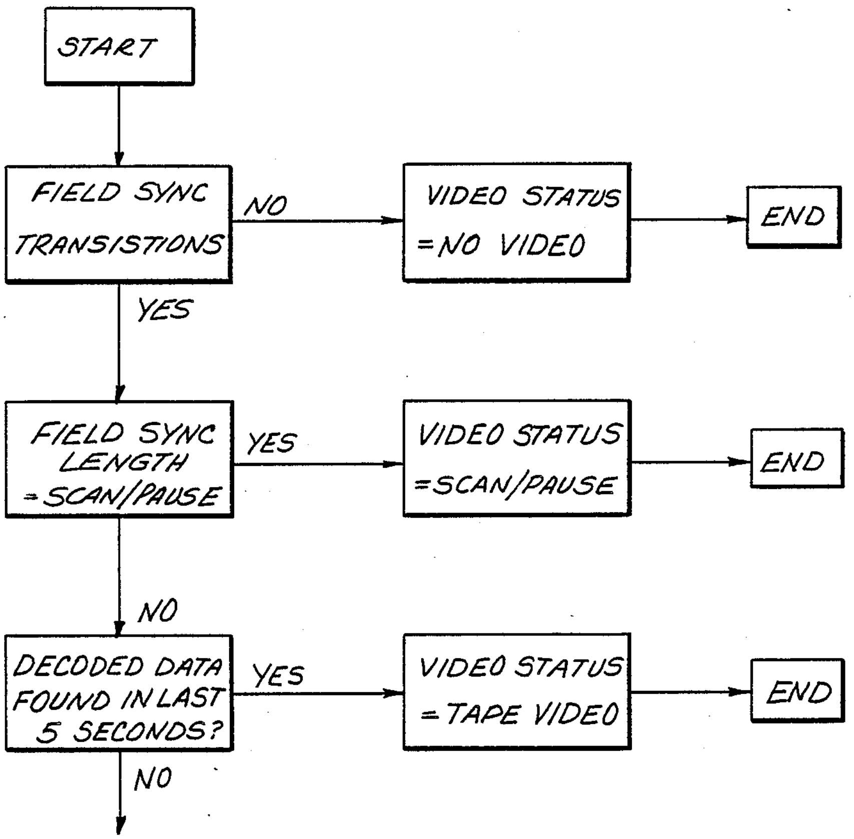
Figures 2, 14A:
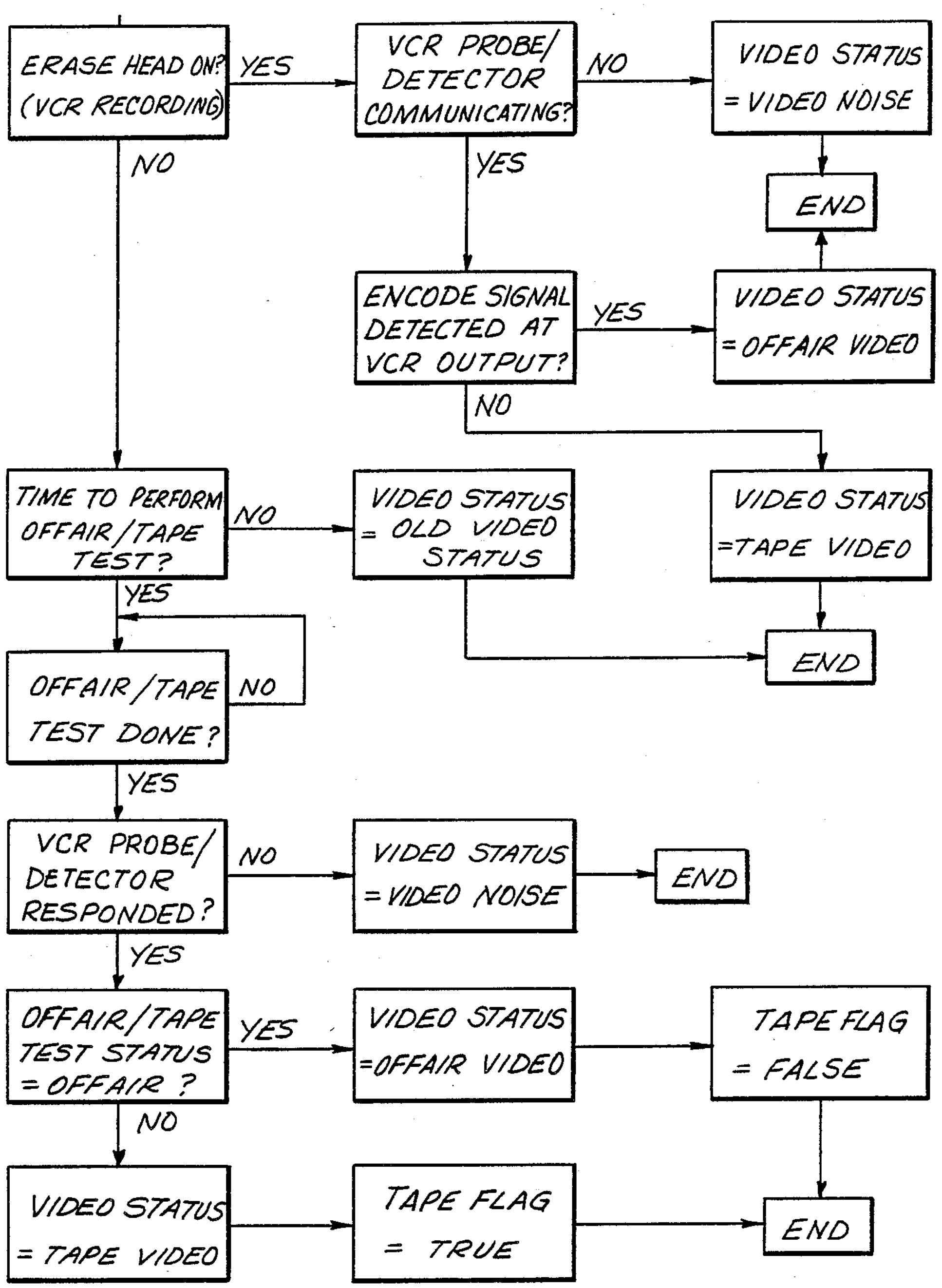
Figures 3, 14A:
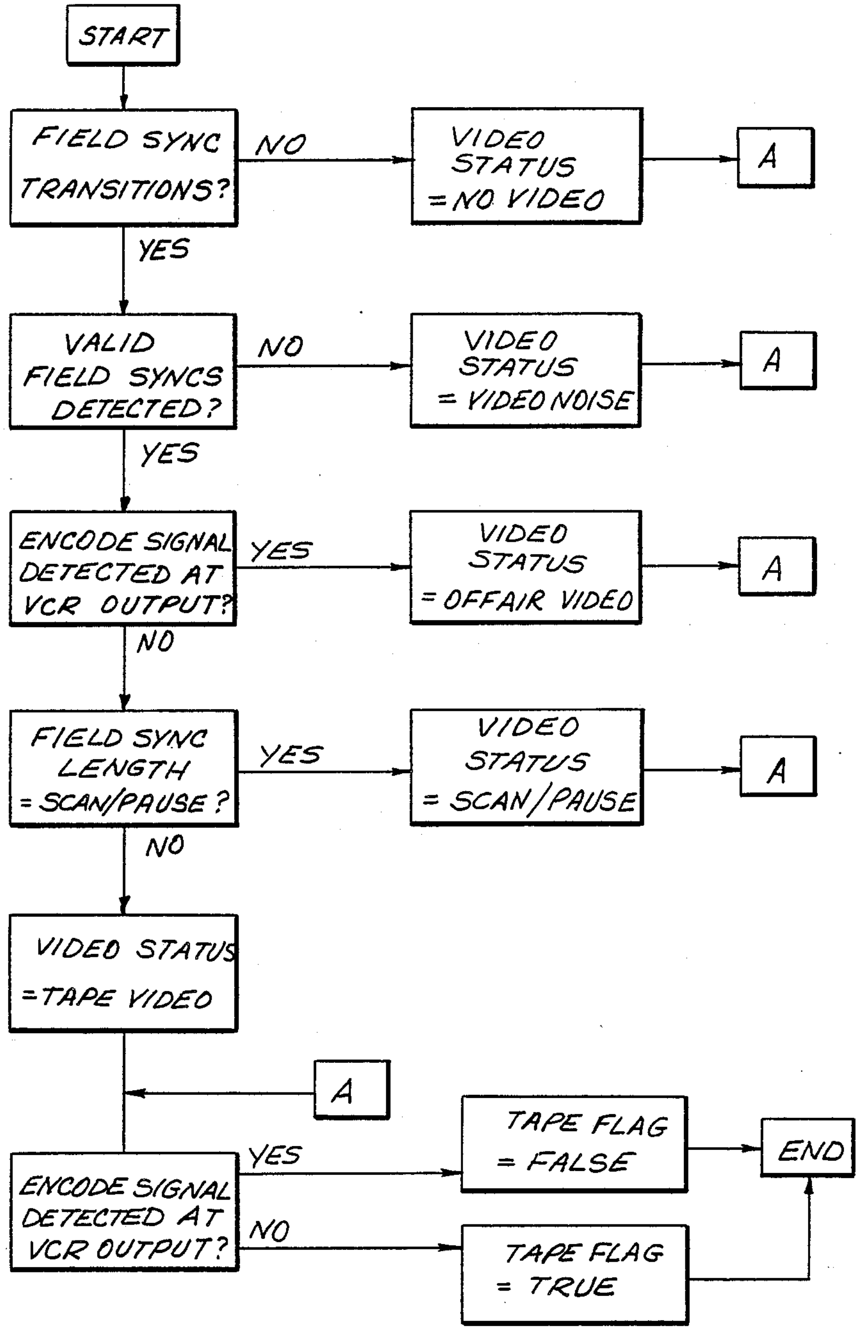
Figures 1, 14B:
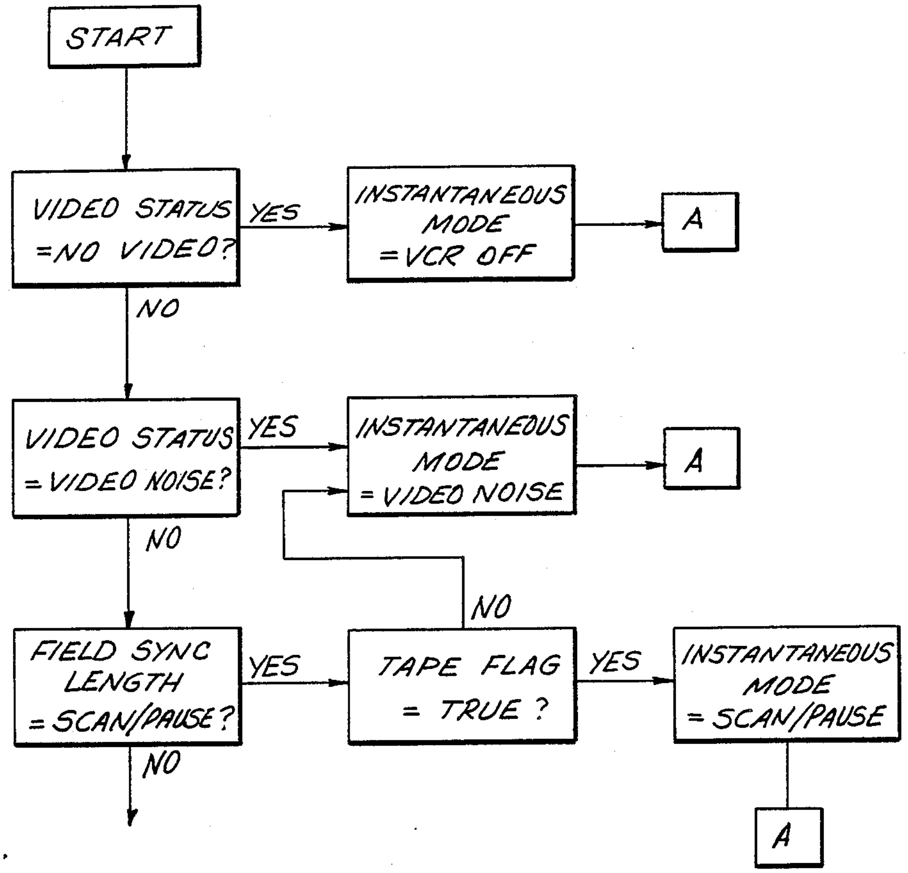
Figures 2, 14B:
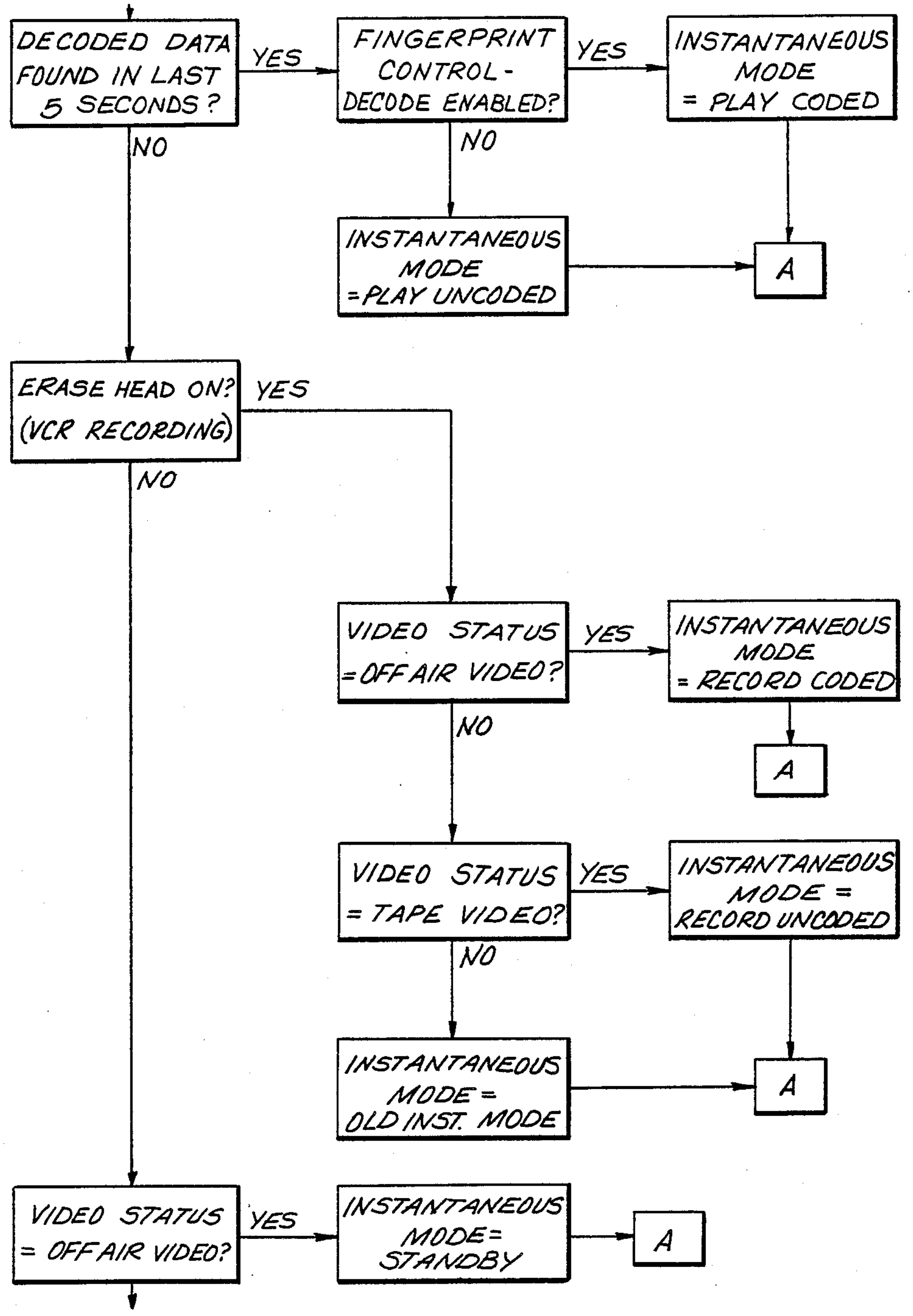
Figures 3, 14B:
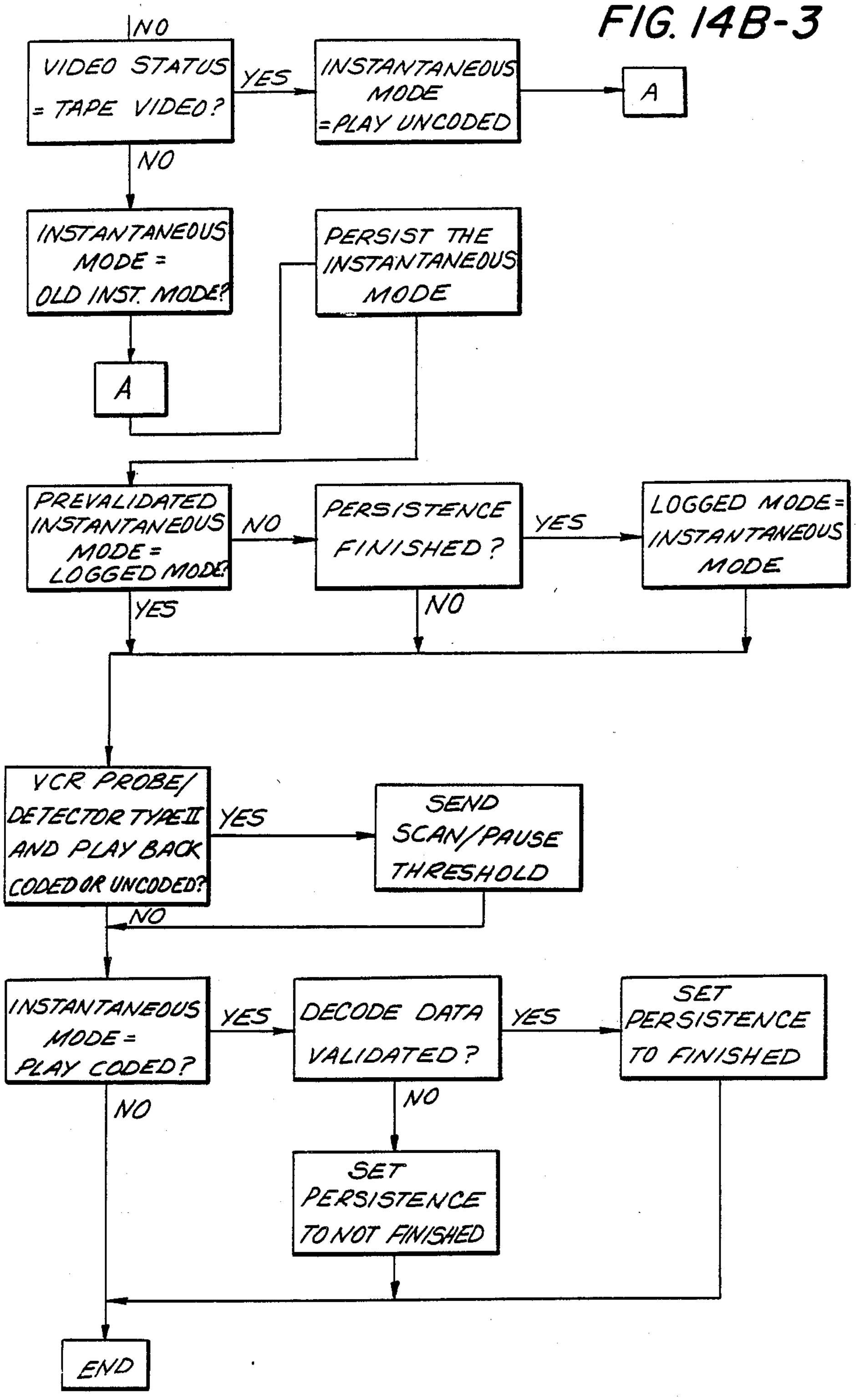
Figures 1, 15:
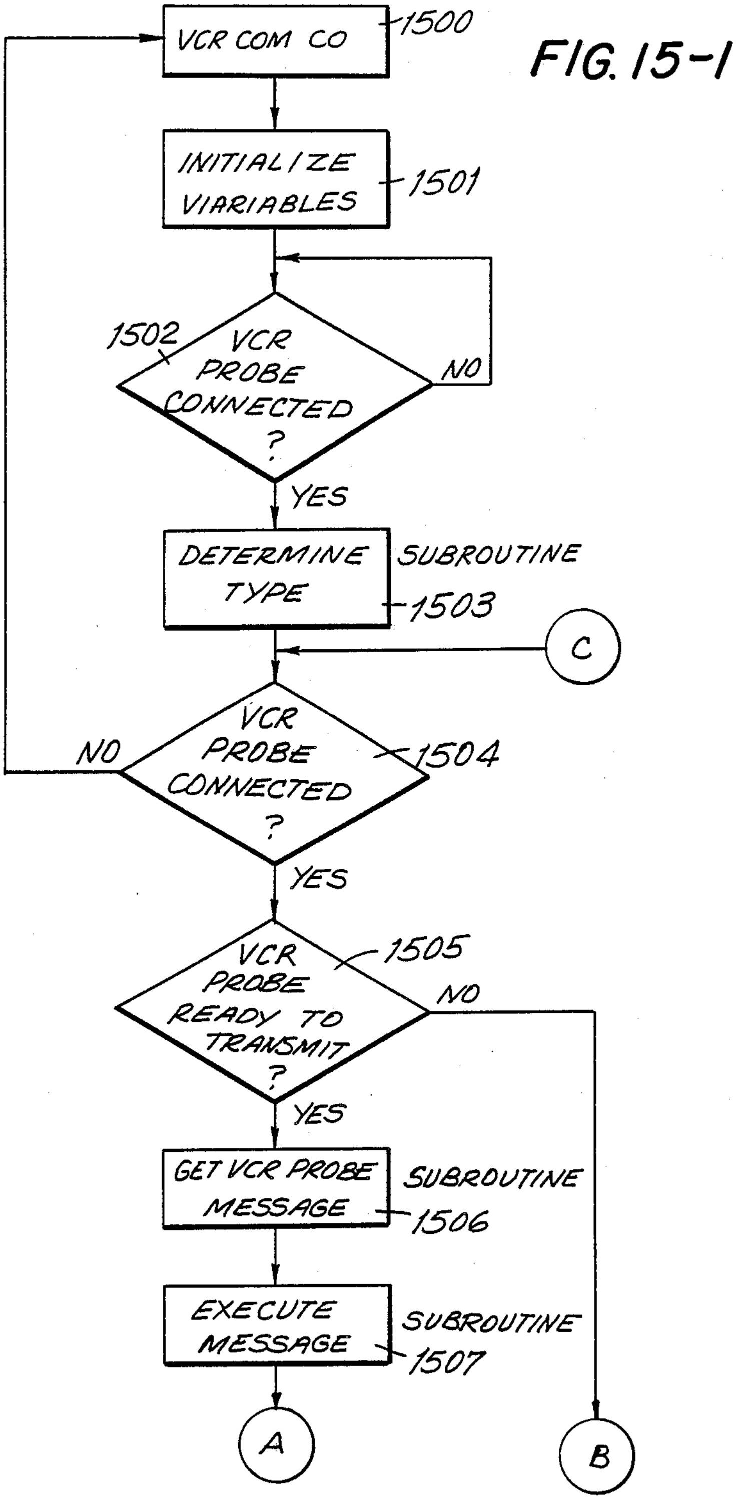
Figures 2, 15:
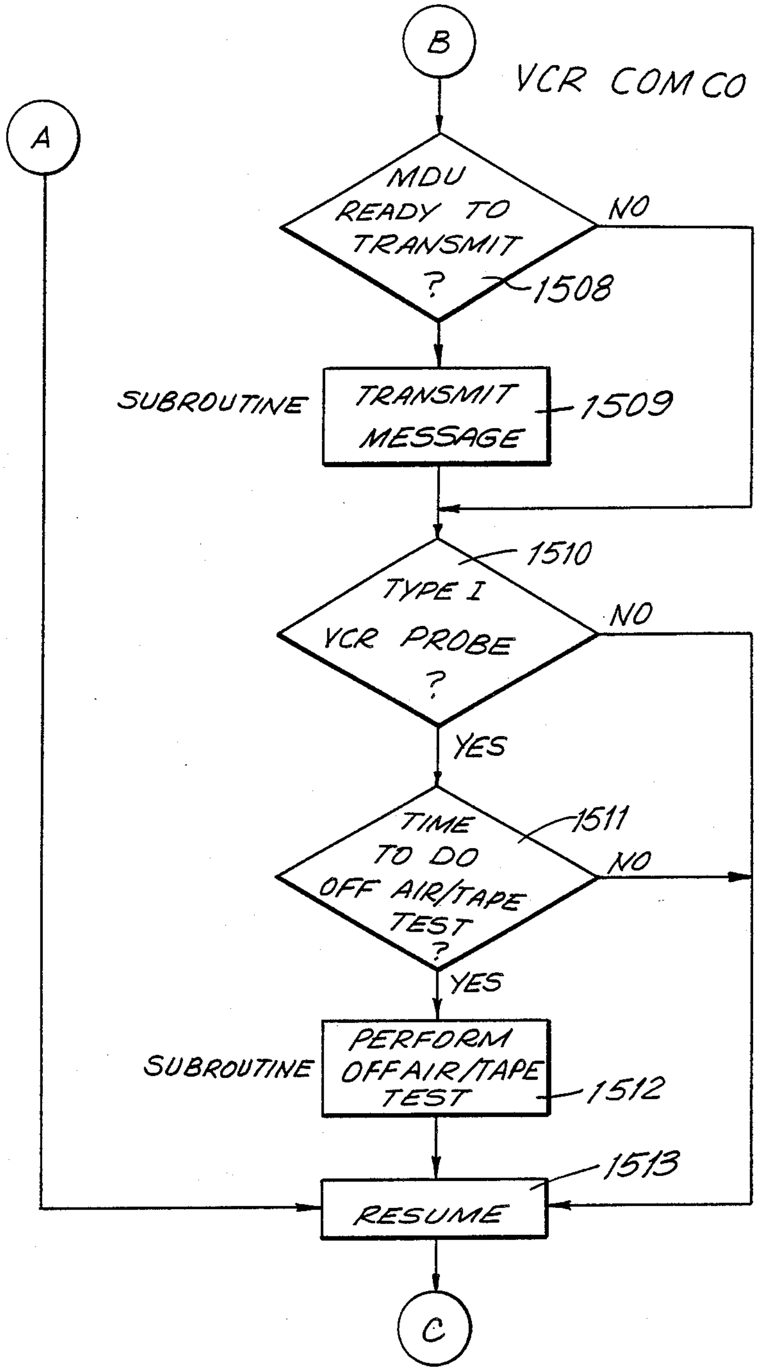

Referring to FIG. 9, CLOCKSET co-routine 910 synchronizes the real time clock in MDU 122 with the real time clock in CDSU 120. CLOCKCO co-routine 930 operates the real time clock in MDU 122. LOGGERCO co-routine 950 controls entry of data statements in RAM 612 of MDU 122. MESSAGECO co-routine 970 controls communication between MDU 122 and CDSU 120 over the AC power supply lines. CLOCKSET, CLOCKCO, and LOGGERCO co-routines 910, 930, and 950 may be fabricated by those of skill in the art from the disclosure herein. FMCO co-routine 1000, a flow chart of which is shown in FIG. 10, controls probe/detector operations. CODISPLAY co-routine 1100, a flow chart of which is shown in FIG. 11, controls data transfer from handset 134 and display of alphanumeric information by MDU 122. COPERSIST co-routine 1200, a flow chart of which is shown in FIG. 12, handles viewer and guest arrival, persistence and departion operations. COMONITOR co-routine 1300, a flow chart of which is shown in FIG. 13, monitors and handles viewer interactions. VCRCO co-routine 1400, a flow chart of which is shown in FIGS. 14, 14A, and 14B, monitors VCR operations and controls recording of time, date, and channel data on a tape being recorded on by VCR 108. VCRCOMCO co-routine 1500, a flow chart of which is shown in FIG. 15, controls communications between VCR probe/detector 128 and MDU 122.

FMCO co-routine 1000 (FIG. 10) monitors probe/detectors 124, 125, 126 and 128 and generates statements relating to data monitored or generated by the probe/detectors. FMCO co-routine 1000 is entered from the resume loop 900 (FIG. 9) after the MESSAGECO co-routine 970 is exited.

In step 1001, a powerup timer in microprocessor 610 of MDU 122 is set. During the powerup time period, no data or statements are recognized from the probe/detectors. After expiration of the powerup time period, registers in microprocessor 610 and storage locations in RAM 612 holding probe/detector records are cleared. MDU 122 may provide CDSU 120 with channel numbers of the channels to which the tuners in TV 106, VCR 108 and converters 115, 116 are tuned, or with frequency formation related to the LO of the respective tuners obtained from the probe/detectors. If channel information is provided by MDU 122, microprocessor 610 is loaded with a look up table routine for converting LO-related frequencies to channel numbers. In step 1003, the type of channel reporting--channel number or frequency—is set.

As described above, an event such as channel tuning must persist for a given time before it is reported in the form of a statement. In step 1004, the channel persistence (one of the down-loadable parameters included in the software load) is set. Steps 1005 and 1006 determine if there have been changes in channel tuning reporting and channel persistence during subsequent cycles of the FMCO co-routine 1000.

In step 1007, registers and storage are pointed to for receiving data from a fist probe/detector, and in step 1008 processing reverts to the resume loop 900. After re-entry from the resume loop subroutine 1009 is entered in which the MDU 122 identification number is read, analog multiplexers 626 and 627 are selected, and inputs from switch 632 and resistor array 633 are read. Processing then reverts to the resume loop in step 1010.

Upon reentering the FMCO co-routine from resume loop 900, the probe mode subroutine 1011 is entered which calls up the probe mode. That subroutine, which controls data transfer from the probe/detectors, is saved in step 1012. Steps/subroutines 1013, 1015 and 1017 then identify (by means of the identification voltage on conductor 203; see Table I) the probe/detector connected to the particular analog multiplexer in probe/detector interface 601 selected as the first probe/detector; and steps 1014, 1016 and 1018 call up subroutines which control data transfer from the TV, cable, and VCR probe/detector, respectively. Subroutine 1019 indicates that there is no probe/detector connected to the selected analog multiplexer. In step 1020, registers and storage are pointed to for receiving data from a next probe/detector. If all probe/detectors have not been selected (step 1021) processing reverts to step 1008 to obtain data from the other probe/detectors. If all probe/detectors were selected, processing reverts to step 1005.

The subroutines referred to in the FMCO co-routine flowcharted in FIG. 10, as well as subroutines referred to in the flow charts of FIGS. 11–16, may be fabricated by those of skill in the art form the disclosure herein.

FIG. 11 is a flow chart of the CODISPLAY co-routine 1100, which is entered from the resume loop 900 after the FMCO coroutine 1000. Initialization of display variable takes place in step 1101. In step 1102 registers and storage are pointed to for receiving data identifying a message to be displayed. In subroutine 1103, display and driver circuitry 604 (FIG. **6*b*) are initialized before processing reverts to the resume loop in step 1104. Upon re-entry into CODISPLAY co-routine 1100, time and date information is displayed according to subroutine 1105. Step 1106 determines if any button on handset 134 has been depressed, which would indicate that a new display is required, or if a new message is automatically to be displayed. If a new display is not required, processing proceeds to step 1107 to determine whether it is time to flash the existing display (some messages are flashed). If the message is not to be flashed or it is not time to flash it, processing reverts to step 1104. If it is to be flashed, a new message (i.e., a blank screen) is pointed to in step 1108. If a new message is required as determined in step 1106, that new message is pointed to in step 1108. A new message is displayed in accordance with subroutine 1109 and the display cycle timer for flashing is set in step 1110** (set to zero for a constant message).

FIG. 12 is a flow chart of the COPERSIST co-routine 1200 which generates household viewer and guest viewer persist arrive and depart statements. COPERSIST co-routine 1200 is entered from the resume loop 900 after the CODISPLAY co-routine 1100. After initialization in subroutine 1201, the first person, i.e., memory locations corresponding to the first household viewer, is pointed to in step 1202. If the household viewer had logged in and remained longer than the set persistence time period (step 1204) or logged out after remaining for the set persistence time period, a corresponding arrive or depart statement is generated in subroutine 1205. If the household viewer logs in and out before the expiration of the set persistence time period, no statement is generated and processing proceeds to step 1206. Step 1206 and subroutine 1207 relate to generation of guest statements, and steps 1208 and 1209 determine whether other household viewers or guests have to be checked.

FIG. 13 is a flow chart of the COMONITOR co-routine 1300 which monitors and handles viewer interactions. COMONITOR coroutine 1300 is entered from the resume loop 900 after the COPERSIST co-routine 1200. Subroutine 1301 initializes handset interface and state variables. The default state (e.g., TV 106 off and no one viewing) is set in step 1302 and state subroutines (e.g., TV 106 on and no one viewing, or household viewer No. 1 viewing, etc.,) are executed in step 1303. FIG. 13A is a flow chart of a typical state subroutine 1310 executed in step 1303. The "Nil Viewing" state (subroutine 1314) is TV 106 on and no one viewing. In step 1317, the viewer number entered is checked to see if it is valid, i.e,, a viewer number pressed as arriving twice without departing is not valid, and certain numbers are per se invalid (e.g., No. 3 pressed for a two-viewer household). In subroutine 1324, CDSU 120 allocates a number to a new guest and stores guest demographic information for transmittal to central computer 104. If additional guests can not be accommodated (step 1325), the new guest is not activated, a full house message is displayed (subroutine 1326) and processing proceeds to subroutine 1329. If the new guest can be accommodated, verification is displayed in subroutine 1327 and the new guest is entered in subroutine 1328. Subroutine 1329 displays the current viewing state and step 1330 prompts for verification. If no Viewer responds, processing proceeds to step 1331 to determine if TV 106 is on. If it is not, all viewers who have not responded in step 1330 are removed in step 1332 and processing reverts to subroutine 1312. Step 133 determines if all viewers have been removed. If they have, processing reverts to subroutine 1329. If they have not, processing reverts to subroutine 1312. The audience states listed below in Table II are possible.

TABLE II

| LIST OF AUDIENCE MONITOR STATES |
|---|
| STATE.DEFAULT - TV off |
| STATE.NILL.VIEWING - TV on, no viewers |
| STATE.HOUSER.ID - TV on, house holder arriving or departing |
| STATE.IDLE - TV on with viewers |
| STATE.NEW.GUEST - TV on, press "new guest" key |
| STATE.SEX.SELECT - TV on, enter gender of new guest |
| STATE.AGE, SELECT - TV on, enter age of new guest |
| STATE.GUEST. WAIT - TV on, wait for CDSU to allocate new guest number |
| STATE.GUEST.NOTIFY - TV on, display new guest member |
| STATE.AUTO.LOG - TV on, enter new guest as viewer |
| STATE.CONFIRM - TV on, flash viewer number |
| STATE.FULL.HOUSE - TV on, all guest numbers allocated |
| STATE.GUEST.SELECT - TV on, press "guest" key |
| STATE.GUEST.ID - TV on, enter guest number |
| STATE.UNKNOWN.GUEST - TV on, invalid guest number |
| STATE.HOL.QUERY - TV off, press "holiday" key |
| STATE.HOL.WAIT - TV off, wait for all statements to be sent to the CDSU |
| STATE.HOL.CONFIRM - TV off, family on vacation |
| STATE.TEST.MODE - installer test functions |

FIG. 14 is a flow chart of the VCRCO co-routine 1400 which handles VCR operations. VCRCO co-routine 1400 is entered from the resume loop 900 after the COMONITOR co-routine 1300. Variables such as VCR mode, persistence values, interrupts, etc. are initialized in step 1401. The type VCR probe/detector is determined in steps 1403–1410. (There may be different embodiments of a VCR probe/detector connected in the system.) In step 1403, MDU 122 determines whether VCR probe/detector 126 is connected by handshaking with VCR probe/detector 126 via the DATA (204) and ACKNOWLEDGE (203) lines. Upon detection of a connected VCR probe/detector 126, the VCRCO co-routine enters a powerup mode in step 1404 which allows MDU 122 to identify what is connected in the system. The powerup mode is timed by CDSU 120 and lasts for 10 seconds, for example. During the powerup delay, control is passed back to the resume loop in step 1405. When the resume loop again comes to VCRCO co-routine 1400, MDU 122 again determines (step 1406) whether a VCR probe/detector 126 is connected and checks to see if the powerup delay has elapsed (step 1407). When elapse of the powerup delay has been detected, step 1408 checks to see if the VCR probe/detector that is connected is of the type which communicates with MDU 122 periodically (i.e., a type II VCR probe/detector 126 as described herein) or of the type which only communicates with MDU 122 when it has information to report (type I, not described herein). The subroutine which makes this determination is in the VCRCOMCO coroutine 1500. Thereafter, control is again passed to the resume loop (step 1409) and a determination again made upon return to the VCRCO co-routine (step 1410) as to whether VCR probe/detector 126 is connected. If it is not connected, processing proceeds to the "VCR probe/detector disconnected" routine defined by steps 1432–1436.

processing next proceeds to a subroutine (step 1411) in which the type of video is detected, e.g., no video, off-air, playback, noise, scan/pause. Subroutine 1411 is flow charted in FIG. 14A for types I and II VCR probe/detectors. In each of these subroutines, PIC processor 200 analyzes field sync pulses generated by field synchronization detector 217 from signals on VIDEO OUT line 213, which signals may represent TV signals including vertical synchronization pulses, noise, and other signals. From an analysis of such field sync pulses, whether generated from valid vertical synchronization pulses or noise, the subroutines flow charted in Fib. 14A determine various video statuses, e.g., "no video", "scan/pause", "tape video", "video noise", "off-air video", etc. As mentioned above, the threshold for detecting field sync pulse widths may be adjusted during setup to better detect various VCR modes.

In subroutine 1412, the VCR mode is determined using the video type determined in subroutine 1411. Subroutine 1412 is flow charted in FIG. 14B. In this subroutine, the video statuses determined in subroutine 1411 are used to determine the VCR mode, e.g.,"VCR off", "video noise", "scan/pause", "play coded (fingerprinted) tape", "play uncoded (not fingerprinted) tape", "offair video", "tape video", etc.

Data statements defining the current VCR mode are then regenerated in subroutine 1413. A determination is made in step 1414 as to whether VCR !08 is recording (see VCR probe/detector flow chart in FIG. 16). If VCR 108 is recording, an encode message (including time, date, channel) is generated (step 1415) and placed in a buffer for later transmission to VCR probe/detector 126 for encoding. If VCR probe/detector 126 is the playback mode (step 1416), decoded data is obtained from VCR probe/detector 126 (see FIG. 16). Such decoded data identifies the video source of the program and the date and time that it was recorded by VCR probe/detector 126. Playback is determined by the "loop back" or "off-air video test" in which VCR probe/detector 126 injects a modulated signal on its VIDEO IN line 212 and checks to see if the modulated signal is detected on its VIDEO OUT line 213 by data decoder and amplifier 219. If the modulated signal is not detected, then VCR probe/detector 126 is in the playback mode. If the signal is "loop back" to VCR 108 and detected, then VCR 108 is in the record mode (TV/VCR bypass switch set to VCR).

The VCR probe/detector type is checked again in step 1418. If it is not the type depicted in FIG. 2, i.e., Type II, then processing reverts to the resume loop in step 1409 Step 1419 determines whether communications are periodically being received from VCR probe/detector 126. If they are, indicating that VCR probe/detector 126 is communicating properly, processing reverts to the resume loop in step 1409. If they are not, indicating a possible communications failure, processing proceeds through steps 1420–1425 to ensure that VCR probe/detector 126 is connected. If it is and VCR probe/detector communications are resolved (step 1423), processing reverts to the resume loop in step 1409. If the VCR probe/detector is not connected (step 1422), processing proceeds to a routine defined by steps 1432–1436. If the VCR probe/detector is connected and VCR probe/detector communications are not restored, then a communication failure statement is generated (step 1425).

In step 1426, VCR probe/detector 126 is reset, and in step 1427, processing reverts to the resume loop. Upon returning from the resume loop processing enters and remains in a loop defined by steps 1428–1431 until communication from VCR probe/detector 126 is restored (step 1429) or a determination made that VCR probe/detector 126 is disconnected (step 1428). The VCR probe/detector routine defined by steps 1432–1436 sets a time delay in step 1432 longer than a VCR probe/detector disconnect persistence. This delay allows the VCR probe/detector to initialize itself after being reconnected. If after the delay (step 1435) the VCR probe/detector still is not connected, a disconnect statement is generated in step 1436.

FIG. 15 is a flow chart of the VCRCOMCO co-routine 1500. Steps 1501–1504 initialize variables, determine if VCR probe/detector 126 is connected, and determine the type of VCR probe/detector as generally described above with respect to other co-routines. Steps 1505–1509 handle message transmission. Steps 1510–512 cause a Type II VCR probe/detector (FIG. 2) to perform the "loop back" or off-air tape test described above.

Figures 1, 16:
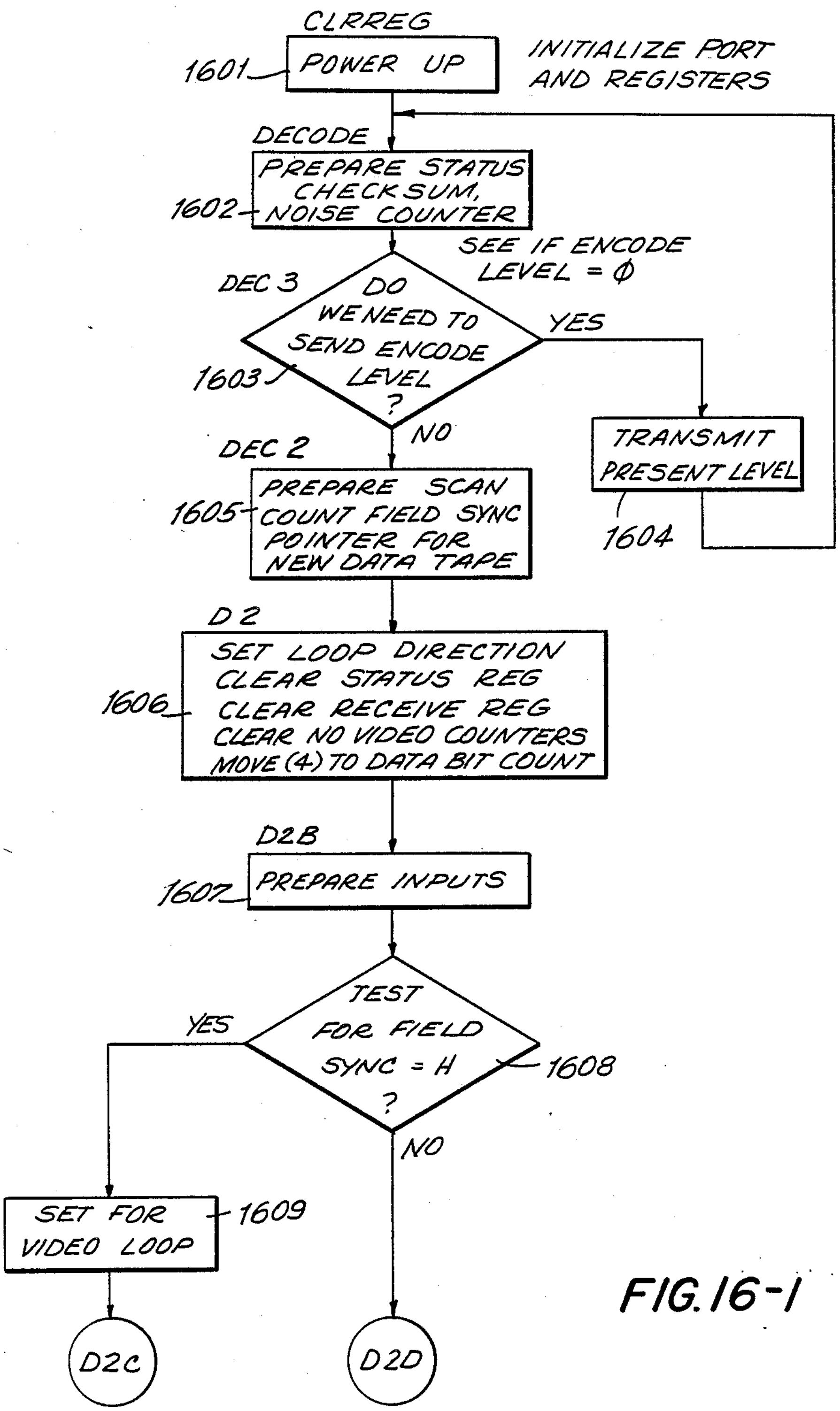
FIG. 16 is a flow chart of the main operating loop of VCR probe/detector 128.
Figures 2, 16:
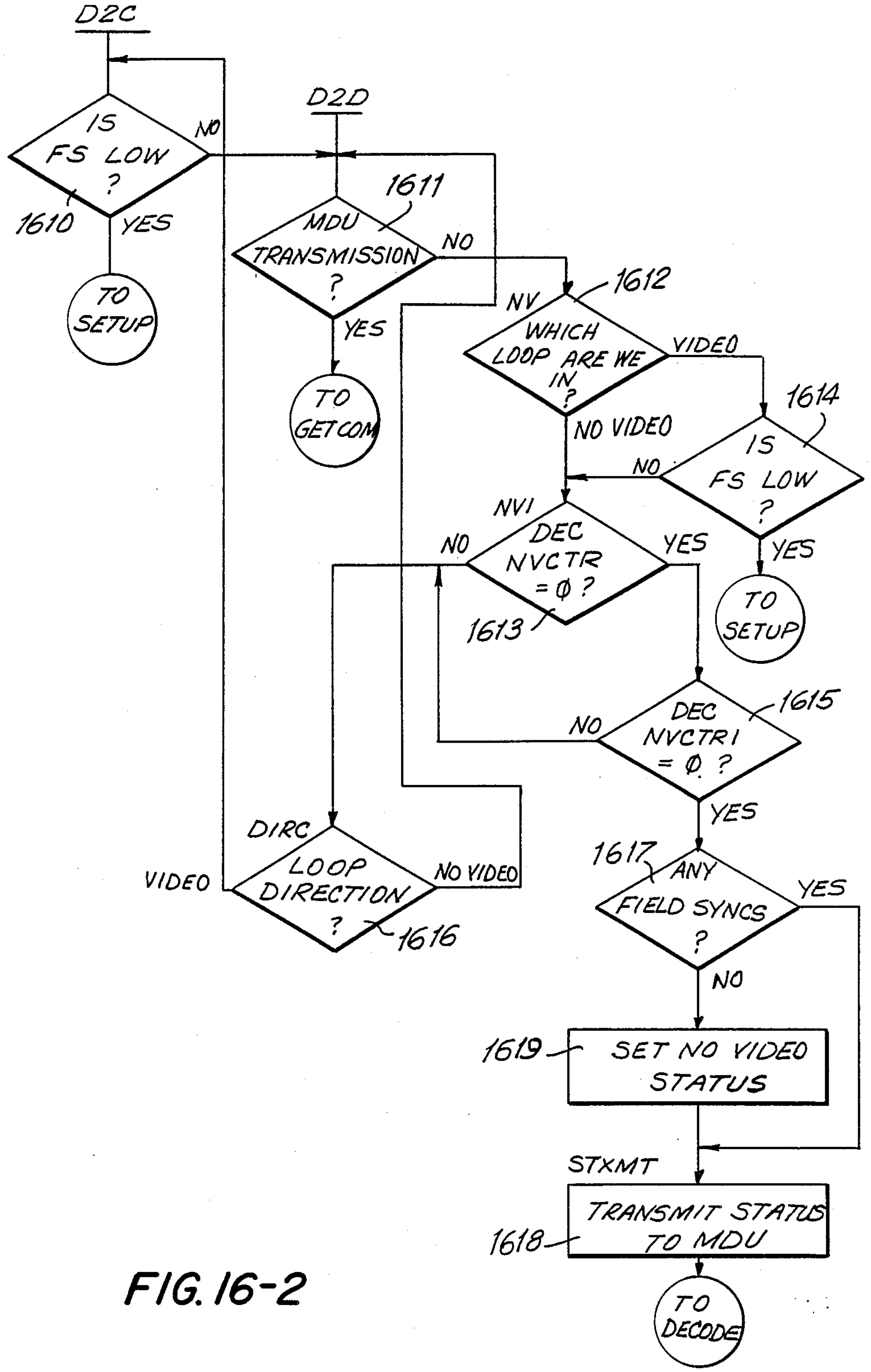
Figures 3, 16:
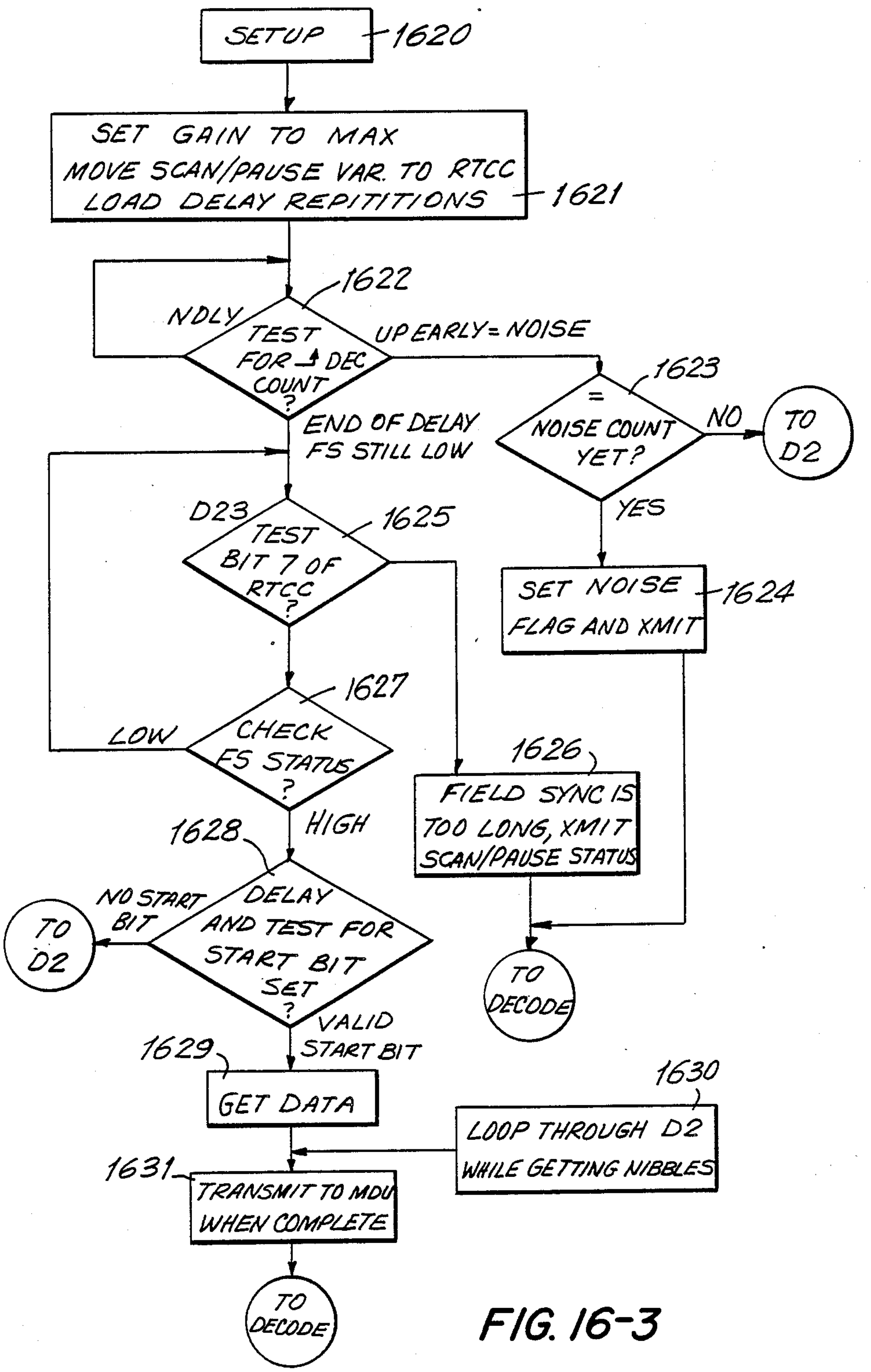
Figures 4, 16:
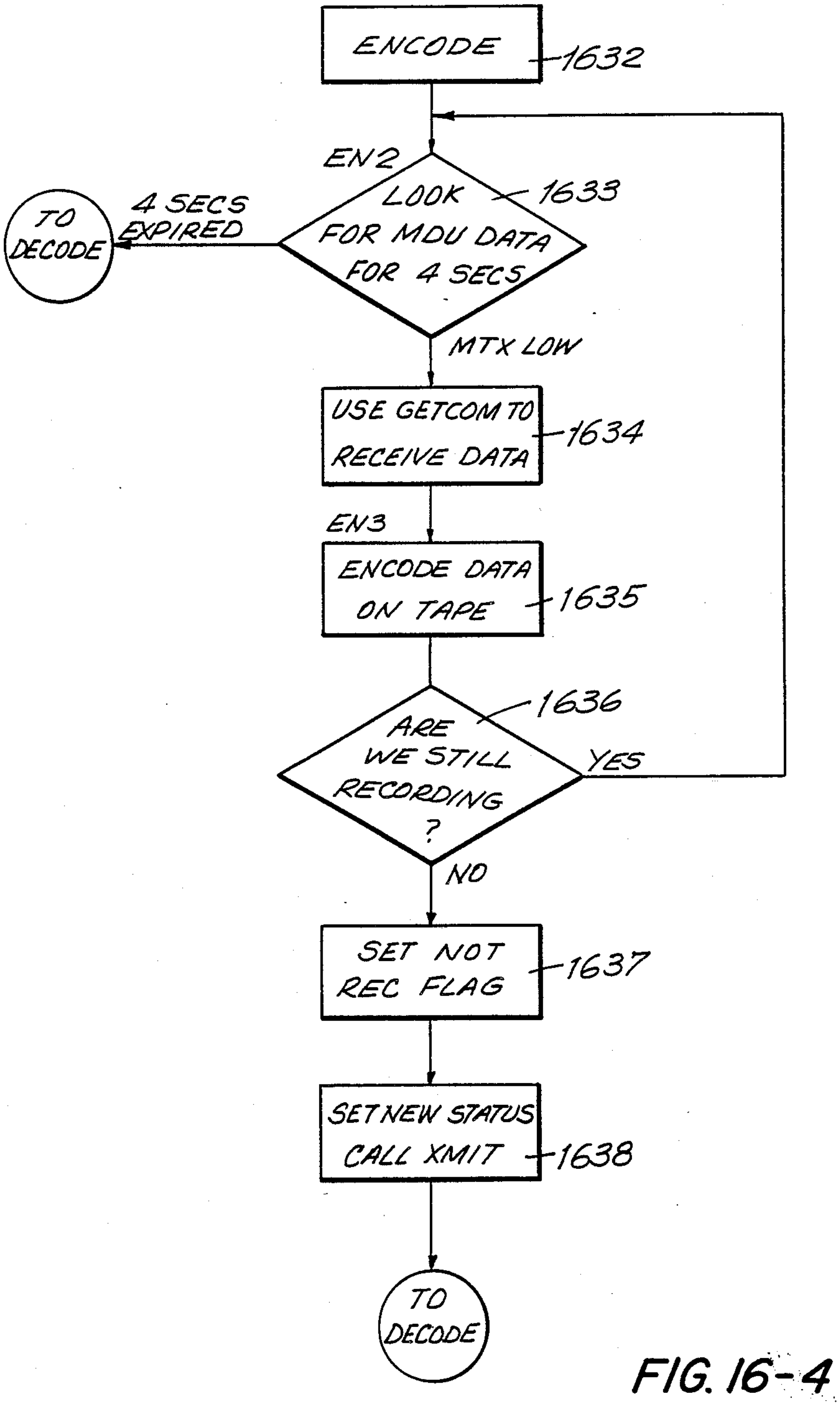

FIG. 16 is a flow chart of the main operational loop 1600 of VCR probe/detector 126, i.e., the program executed by PIC processor 200 (FIG. 2). The subroutines of loop 1600 may be fabricated by those of skill in the art from the disclosure herein. During power up in step 1601, PIC processor 200 initializes its ports and registers, then in step 1602, PIC processor 200 prepares status requirements, the checksum for data transmission to MDU 122, and sets the noise counter which is used in a determination of whether the video received by VCR probe/detector 126 is in fact video or whether it is noise. Steps 1603 and 1604 define a subroutine which sets the encoding level of the data encode and automatic level setting circuitry 218. If data decoder and amplifier circuit 219 (FIG. 2) does not detect an encoded signal, then the present encode level is transmitted in step 1604 and the loop returns to step 1602. This is repeated and the encoding level output by PIC processor 200 to resistors 285 is increased until data decoder and amplifier circuit 219 detects and decodes a signal encoded by data decoder and amplifier circuit 219. This subroutine is similar to the loop back test described above, except that the encoding level is also set. In subroutine 1605, MDU 122 sends PIC processor 200 a scan count which indicates the expected length of a VCR scan or pause. PIC processor 200 then verifies whether good FIELD SYNC pulses are being input to PIC processor 200 or whether VCR 108 is in the scan/pause mode. Subroutine 1605 also sets PIC processor 200 RAM memory pointers at which new data decoded from a tape being played by VCR 108 will be stored.

In subroutine 1606, loop direction parameters are set, loop direction referring to a "video" or a "no video" loop direction taken in decision step 1616 later in the flow chart. Also, registers such as the following are cleared: status registers for indicating the status of VCR modes (e.g. noise, video, record, scan/pause, etc.); receive registers which temporarily receive data decoded from tape being played by VCR 108; and "no video" counters which indicate the presence of noise. A data bit counter in PIC processor 200 is set to indicate the number of data bits which PIC processor 200 may receive from MDU 122 Initially, this counter is set to 4.

PIC processor 200 prepares its inputs in step 1607 and in step 1608 checks the field sync setting made in step 1605. If high, indicating that FIELD SYNC pulses were detected by frame synchronization detector 217, the loop direction is set to "video" in step 1609, and then detection of FIELD SYNC pulses is checked again in step 1610. If FIELD SYNC pulses are being detected (FS=low) in step 1608, then processing proceeds to a setup routine starting with step 1620. If the field sync setting is not high (step 1608), processing proceeds to step 1611 to determine whether MDU 120 is transmitting, which would account for a low field sync setting. If MDU 120 is transmitting, processing proceeds to a getcom routine starting with step 1638. If MDU 120 is not transmitting, a loop determination is made in step 1612. If in the "no video" or "noise" loop, processing proceeds to step 1613. If in the video loop, then another FIELD SYNC test is made in step 1614 similar to the test in step 1610. If FIELD SYNC pulses are detected (FS=low), processing proceeds to the setup routine (step 1620) If FIELD SYNC pulses are not detected, processing proceeds to step 1613.

In step 1613, the first stage of a two-stage no video counter (NVCTR) in PIC processor 200 is checked. If the count is zero, the second stage (NVCTR 1) of the counter is checked in step 1615. A non-zero count in both stages of the noise counter indicates that noise is being detected by frame synchronization detector 217 (FIG. 2), and processing continues to determine the video mode of VCR 108 by proceeding to step 1616 where the loop direction ("video" or "no video") is determined. If in the "no video" loop, processing reverts to step 1611. If in the video loop, processing reverts to step 1610. If the count in both stages of the noise counter is zero, indicating the possible presence of FIELD SYNC pulses, then detection of FIELD SYNC pulses is checked in step 1617. The detection of FIELD SYNC pulses results in a determination that VCR 108 is in the video mode, and that status is transmitted to MDU 122 in step 1618. If no FIELD SYNC pulses are detected, a determination that VCR 108 is in the no video mode is made, set in step 1619, and transmitted in step 1618. Thereafter, processing reverts to "decode", step 1602.

The setup routine is entered in step 1620 which validates detection of FIELD SYNC pulses to insure that noise or a pause/scan were not detected. In step 1621, the gain of amplifier 289 (in data decoder and amplifier 219) is set to maximum, the length of a scan/pause time period during which valid FIELD SYNC pulses may be detected is moved to a real time clock counter in PIC processor 200, and a time out period during which the presence of FIELD SYNC pulses are checked is loaded in PIC processor 200. A delay is introduced in step 1622 during which the noise counter is incremented if noise is detected during the delay. If noise has been detected, the count in the noise counter is checked in step 1623. If the count is less than a predetermined count (e.g., 80) at which a noise determination would be made, processing reverts to step 1606 (D2). If the count in the noise counter is equal to the predetermined count, indicating the presence of noise, the noise flag is set in step 1624 and processing reverts to step 1602 (decode). When the delay in step 1622 times out without the detection of noise, processing proceeds to step 1625 where bit 7 (128) of the real time clock counter is checked. If it is high indicating a FIELD SYNC which is too long, a determination is made in step 1626 that VCR 108 is in the scan/pause mode, that status is transmitted to MDU 122, and processing reverts to step 1602 (decode). Further processing to determine if there are discontinuities in date and time data from a tape being played back reveals whether the scan/pause was scan forward or scan reverse. If bit 7 is low, the field sync status (detection of positive transitions) is checked in step 1627. If the field sync status is low, processing reverts to step 1625. If it is high, processing proceeds to step 1628 which tests for a valid start bit (see FIG. 2A) in data decoded by data decoder and amplifier 219. If no start bit is detected, processing reverts to step 1606 (D2). If a valid start bit is detected, data is loaded into PIC processor 200 in step 1629. During loading, one nibble (4 bits) is loaded per field synch, and processing loops through step 1606 (D2) while the next FIELD SYNC pulse is awaited and 11 bytes of data have been loaded. Upon completion of loading 11 bytes of data into PIC processor 200, that data is transmitted to MDU 122 in step 1631, and processing reverts to step 1602 (decode)

VCR probe/detector 126 encodes data to be recorded on tape by VCR 108 with a program being recorded by VCR 108 in an encode routine entered in step 1632. With an erase pickup detected by tone decoder 243 (indicating a VCR record mode), step 1633 looks for data from MDU 122 during a four second period. If no data is detected during that four second time period, processing reverts to step 1602 (decode). If data from MDU 122 is detected, the getcom routine (step 1638) is entered to obtain the data, and that data is encoded in step 1635 on the video signal by data encode and automatic level setting circuitry 218. Upon completion of recording (step 1636), a not recording flag is set in step 1637 and in step 1638 a new status is set and a transmit routine called which sends the data to MDU 122. Thereafter, processing reverts to step 1602 (decode).

VCR probe/detector 126 receives data from MDU 122 in accordance with the getcom routine entered in step 1638. Step 1639 is a receive character sub-routine which controls receipt of serial data from MDU !22 one byte at a time. Step 1640 determines whether a received word is valid. If it is not, VCR probe/detector 126 provides a delay and then an acknowledgement to MDU 122 and processing reverts to step 1602 (decode). If the word is valid, further words are received, checked and acknowledged in steps 1643–1647. Step 1648 determines whether the received data is to be encoded. If it is, the encode routine (step 1632) is entered. If it is not, processing reverts to step 1602 (decode).

Presently preferred embodiments have been shown and described herein. It is not intended that the claims be limited to covering only such preferred embodiments which are meant to be illustrative rather than exhaustive or limiting. Therefore, certain changes and modifications to the preferred embodiments herein, and to the operation thereof, should be construed as falling within the spirit and scope of the invention disclosed herein.

What is claimed is:

1. A system for monitoring a television viewing system which includes a TV and a VCR coupled thereto, said monitoring system comprising:

first means for obtaining a signal related to the frequency of the channel to which a tuner in said television viewing system is tuned;

second means including a first programmed processor and associated memory for receiving said signal and processing it to obtain information related to the channel to which said tuner is tuned; and third means including a second programmed processor and associated memory for generating a fingerprinting signal for recording in the vertical blanking interval of a TV signal tuned by said tuner and being recorded by said VCR, said third means comprising:

means coupled to receive a TV signal corresponding to said TV signal being recorded by said VCR;

means for receiving channel information from said second means and generating said fingerprinting signal including channel information encoded therein for recording by said VCR in the vertical blanking interval of said TV signal being recorded by said VCR; and means for generating a timing signal related to the timing of said TV signal being recorded by said VCR, said timing signal being used to generate said fingerprinting signal in the vertical blanking interval of said TV signal being recorded by said VCR;

said system further comprising means for coupling said fingerprinting signal generated by said third means to a point in said VCR where it is mixed with said TV signal being recorded by said VCR and recorded therewith in the vertical blanking interval thereof.

2. The system according to claim 1 wherein said third means includes means for detecting said fingerprinting signal in a TV signal, said third means being coupled to receive a TV signal being played back by said VCR, said third means including means for generating a timing signal related to the timing of the TV signal being played back by said VCR, said timing signal being used by said means for detecting to detect said fingerprinting signal previously recorded with said TV signal recorded by said VCR.

3. The system according to claim I wherein said third means is coupled to receive a TV signal played back by said VCR, said third means including means for detecting said fingerprinting signal in a TV signal, said timing signal generated by said timing signal generating means being used by said means for detecting to detect said fingerprinting signal in the vertical blanking interval of said TV signal played back by said VCR.

4. The system according to claim 3 wherein said third means is coupled to the VIDEO OUT terminal of said VCR for receiving said TV signal being played back by said VCR and to a circuit point upstream of the video recording heads of said VCR at which said fingerprinting signal and said TV signal to be recorded may be mixed.

5. The system according to claim 4 wherein said third means is coupled to the VIDEO IN terminal of said VCR and couples said fingerprinting signal thereto, said third means including means for preventing said VCR from switching signals to the record heads thereof due to coupling at said VIDEO IN terminal.

6. The system according to claim 3 wherein at least one of said programmed processors includes a real time clock for generating real time information, said third means including means for encoding said fingerprinting signal with information including said real time information supplied to said means for encoding.

7. The system according to claim 3 wherein said third means includes means for decoding said fingerprinting signal in said TV signal played back by said VCR to obtain said channel information therefrom.

8. The system according to claim 6 wherein said third means includes means for decoding a fingerprinting signal in said TV signal played back by said VCR to obtain said real time information therefrom.

9. A system for monitoring a television viewing system which includes a TV and a VCR coupled thereto, said monitoring system including:

first means including a first programmed processor and associated memory coupled to receive information relating at least to the channel to which a tuner in said television viewing system is tuned and provide a signal containing at least channel tuning information of said tuner;

second means including a second programmed processor and associated memory coupled to said VCR to receive a TV signal corresponding to a TV signal being recorded by said VCR and coupled to said first means to receive said signal which includes a least said channel tuning information, said second means generating a fingerprinting signal including channel tuning information for recording in the vertical blanking interval of said TV signal being recorded by said VCR, said second means including means for generating a timing signal related to the timing of said TV signal being recorded by said VCR, said timing signal being used to generate said fingerprinting signal in the vertical blanking interval of said TV signal being recorded by said VCR;

third means for coupling said fingerprinting signal generated by said second means to a point in said VCR upstream of video recording heads in said VCR where it is mixed with said TV signal being recorded by said VCR and recorded therewith in the vertical blanking interval thereof;

said second means being coupled to the VIDEO OUT terminal of said VCR to receive a TV signal played back by said VCR, said second means including means for detecting said fingerprinting signal in a TV signal, said timing signal generated by said timing signal generating means being used by said means for detecting to detect said fingerprinting signal in the vertical blanking interval of said TV signal played back by said VCR.

10. The system according to claim 9 wherein said second means is coupled to the VIDEO IN terminal of said VCR and couples said fingerprinting signal thereto, said second means including means for preventing said VCR from switching signals to the record heads thereof due to coupling at said VIDEO IN terminal.

11. The system according to claim 9 including a real time clock for generating real time information, said second means being coupled to receive said real time information and including means for encoding said fingerprinting signal with real time information.

12. The system according to claim 11 wherein said second means includes means for decoding said fingerprinting signal in said TV signal played back by said VCR to obtain said real time information therefrom.

13. The system according to claim 9 wherein said second means includes means for decoding said fingerprinting signal in a TV signal played back by said VCR to obtain said channel tuning information therefrom.

14. A system for fingerprinting a TV signal being recorded by a video recorder/player comprising:

first means including a first programmed processor and associated memory for supplying one or more information signals which include information related to either or both the channel to which a tuner is tuned and real time information;

second means including a second programmed processor and associated memory for generating a fingerprinting signal to be recorded by said video recorder/player on the same tape as said TV signal being recorded by said video recorder/player, said second means being coupled to receive said information signal and a signal corresponding to said TV signal being recorded by said video recorder/player, said second means including means which cause said fingerprinting signal to be generated with said information relating to either or both the tuned channel or real time therein for recording in a predetermined time interval of said TV signal being recorded by said video recorder/player so as not to be apparent to a viewer; and means for coupling said fingerprinting signal generated by said second means to a point in said video recorder/player where it is mixed with said TV signal being recorded by said video recorder/player and recorded therewith.

15. The system according to claim 14 wherein said second means includes means for generating a timing signal related to timing of the TV signal being recorded by said video recorder/player, said timing signal being used to generate said fingerprinting signal in the vertical blanking interval of the TV signal being recorded by said video recorder/player.

16. The system according to claim 14 wherein said second means includes means for detecting said fingerprinting signal in a TV signal, said second means being coupled to receive a TV signal being played back by said video recorder/player, said second means including means for generating a timing signal related to timing of the TV signal being played back by said video recorder/player, said timing signal being used by said means for detecting to detect said fingerprinting signal previously recorded with said TV signal by said video recorder/player.

17. The system according to claim 15 wherein said second means is coupled to receive a TV signal played back by said video recorder/player, said second means including means for detecting said fingerprinting signal in a TV signal, said timing signal generated by said second means being used by said means for detecting to detect said fingerprinting signal in the vertical blanking interval of said TV signal.

18. The system according to claim 17 wherein said second means is coupled to a circuit point upstream of the video recording heads of said video recorder/player at which point said fingerprinting signal and a TV signal to be recorded may be mixed.

19. The system according to claim 17 wherein said video recorder/payer is a VCR and said second means is coupled to the VIDEO OUT terminal of said VCR for receiving a TV signal being played back by said VCR and to a circuit point upstream of the video recording heads of said VCR at which point said fingerprinting signal and a TV signal to be recorded may be mixed.

20. The device according to claim 19 wherein said second means is coupled to the VIDEO IN terminal of said VCR and couples said fingerprinting signal thereto, said second means including means for preventing said VCR from switching signals to the record heads thereof due to coupling at said VIDEO IN terminal.

21. The system according to claim 17 wherein said video recorder/player is a VCR and said second means includes means for encoding said fingerprinting signal with said information.

22. The system according to claim 21 wherein said second means includes means for decoding said fingerprinting signal in a TV signal played back by said VCR to obtain said information therefrom.

23. The system according to claim 14 wherein said second means includes means for decoding a fingerprinting signal played back by said video recorder/-player to obtain said information therefrom.

24. The system according to claim 1 wherein said tuner is either that of said TV or said VCR.

25. The system according to claim 1 wherein said television viewing system includes a cable converter and wherein said tuner is that of said cable converter.

26. The system according to claim 9 wherein said tuner is either that of said TV or said VCR.

27. The system according to claim 9 wherein said television viewing system includes a cable converter and wherein said tuner is that of said cable converter.

28. The system according to claim 14 wherein said video recorder/player includes a tuner and is coupled in a television viewing system including a TV, and wherein said tuned tuner is that of said Tv or said video recorder/player.

29. The system according to claim 14 wherein said video recorder/player includes a tuner and is coupled in a television viewing system including a TV and a cable converter, and wherein said tuned tuner is that of said TV, video recorder/player or cable converter.

30. A system monitoring a television viewing system which includes a TV and a VCR coupled thereto, said monitoring system comprising:

first means for obtaining a signal related to the frequency of the channel to which a tuner is said television viewing system is tuned;

second means for receiving said signal and processing it to obtain information related to the channel to which said tuner is tuned; and third means for generating a fingerprinting signal for recording in the vertical blanking interval of a TV signal tuned by said tuner and being recorded by said VCR, said third means comprising:

means coupled to the VIDEO OUT terminal of said VCR for receiving a TV signal corresponding to said TV signal being recorded by said VCR;

means for receiving channel information from said second means for generating said fingerprinting signal including channel information encoded therein for recording by said VCR in the vertical blanking interval of said TV signal being recorded by said VCR; and means for generating a timing signal related to the timing of said TV signal being recorded by said VCR, said timing signal being used to generate said fingerprinting signal in the vertical blanking interval of said TV signal being recorded by said VCR;

said third means being coupled to the VIDEO IN terminal of said VCR for coupling said fingerprinting signal thereto, said third means including means for preventing said VCR from switching signals to the record heads thereof due to coupling at said VIDEO IN terminal of said third means.

* * * * *